(12) United States Patent
Polk, Jr. et al.

(10) Patent No.: US 8,091,314 B2
(45) Date of Patent: Jan. 10, 2012

(54) LOAD BEARING ASSEMBLY

(75) Inventors: Dale E. Polk, Jr., Titusville, FL (US); James R. Franks, Gibsonia, PA (US)

(73) Assignee: LRM Industries International, Inc.

( * ) Notice: Subject to any disclaimer, the term of this patent is extended or adjusted under 35 U.S.C. 154(b) by 438 days.

(21) Appl. No.: 12/327,042

(22) Filed: Dec. 3, 2008

(65) Prior Publication Data

US 2009/0183455 A1    Jul. 23, 2009

Related U.S. Application Data

(60) Provisional application No. 61/022,378, filed on Jan. 21, 2008.

(51) Int. Cl.
*E04C 2/00* (2006.01)
(52) U.S. Cl. .................. 52/571; 52/783.1; 52/582.1
(58) Field of Classification Search .............. 52/506.01, 52/506.04, 506.08, 507, 508, 580, 783.1, 52/796.1, 581, 570, 571, 572; 446/108, 115, 446/117, 118, 120, 121, 124
See application file for complete search history.

(56) References Cited

U.S. PATENT DOCUMENTS

| | | | |
|---|---|---|---|
| 3,349,924 A | 10/1967 | Maurer et al. | |
| 3,986,462 A | 10/1976 | Heft | |
| 4,074,635 A | 2/1978 | Stauble | |
| 4,099,358 A | 7/1978 | Compaan | |
| 4,319,792 A | 3/1982 | Britt et al. | |
| 4,330,969 A | 5/1982 | Quaney | |
| 4,349,995 A | 9/1982 | Dowler et al. | |
| 4,355,781 A | 10/1982 | Stolpin | |
| 4,467,927 A | 8/1984 | Nathan | |
| 4,557,091 A | 12/1985 | Auer | |
| 4,617,772 A * | 10/1986 | Hassell | 52/461 |
| 4,843,975 A | 7/1989 | Welsch et al. | |
| 4,901,490 A | 2/1990 | Zinniel et al. | |
| 4,964,350 A | 10/1990 | Kolvites et al. | |
| 5,052,164 A | 10/1991 | Sandow | |
| 5,092,385 A | 3/1992 | Beaulieu | |
| 5,111,627 A * | 5/1992 | Brown | 52/126.5 |
| 5,157,892 A | 10/1992 | Ryther | |
| 5,188,246 A | 2/1993 | Maxworthy | |
| 5,190,803 A | 3/1993 | Goldbach et al. | |
| 5,250,606 A * | 10/1993 | Guest et al. | 524/504 |
| 5,250,608 A * | 10/1993 | Orton et al. | 524/548 |
| 5,278,314 A * | 1/1994 | Winter et al. | 548/259 |
| 5,390,467 A * | 2/1995 | Shuert | 52/783.14 |
| 5,391,103 A * | 2/1995 | Mak | 446/125 |
| 5,555,690 A * | 9/1996 | Cosentino | 52/506.08 |
| 5,644,870 A | 7/1997 | Chen | |
| 5,651,225 A * | 7/1997 | Leeks | 52/461 |
| D383,554 S | 9/1997 | Hart | |
| 5,718,441 A | 2/1998 | Kern et al. | |
| 5,776,582 A | 7/1998 | Needham | |
| 5,860,257 A * | 1/1999 | Gerhaher et al. | 52/235 |

(Continued)

*Primary Examiner* — Eileen D Lillis
*Assistant Examiner* — Alp Akbasli
(74) *Attorney, Agent, or Firm* — Michael A. Ervin; M. A. Ervin & Associates

(57) ABSTRACT

A load bearing assembly (300, 452) that includes at least one molded plastic panel (1) and/or at least one molded plastic panel assembly (3), a first support (303) and optionally a second support (306), is described. Each panel (1) of the load bearing assembly (300) includes a first external portion (17) and a second external portion (20), each having a plurality of reinforcing structures (49, 79) having sidewalls (52, 82) that define a plurality of external portion recesses (64, 98).

16 Claims, 31 Drawing Sheets

U.S. PATENT DOCUMENTS

| | | |
|---|---|---|
| 5,896,709 A | 4/1999 | Pope |
| 5,904,019 A | 5/1999 | Kooij et al. |
| 5,937,767 A | 8/1999 | Togawa et al. |
| 6,050,428 A | 4/2000 | Hollander |
| 6,079,339 A | 6/2000 | Houk, Jr. et al. |
| 6,089,941 A | 7/2000 | Glickman et al. |
| 6,101,777 A * | 8/2000 | Bodine et al. ............. 52/506.06 |
| 6,148,740 A | 11/2000 | Jackel et al. |
| 6,190,084 B1 | 2/2001 | Ibanez |
| 6,216,410 B1 | 4/2001 | Haberman |
| 6,401,944 B1 | 6/2002 | Kircher et al. |
| 6,467,118 B2 * | 10/2002 | Dumlao et al. .................. 14/73 |
| 6,539,879 B1 | 4/2003 | Current et al. |
| 6,568,142 B2 * | 5/2003 | Yoshida ....................... 52/582.1 |
| 6,719,551 B2 | 4/2004 | Polk, Jr. |
| 6,769,217 B2 * | 8/2004 | Nelson ........................ 52/582.1 |
| 6,824,851 B1 * | 11/2004 | Locher et al. .................. 428/76 |
| 6,869,558 B2 | 3/2005 | Polk, Jr. et al. |
| 6,892,993 B2 | 5/2005 | Palmer |
| 6,900,547 B2 | 5/2005 | Polk, Jr. et al. |
| 6,932,537 B2 | 8/2005 | Witcher |
| 6,988,761 B1 | 1/2006 | Stidham et al. |
| 7,208,219 B2 | 4/2007 | Polk, Jr. et al. |
| 7,210,876 B2 | 5/2007 | Moralez et al. |
| 7,303,800 B2 | 12/2007 | Rogers |
| 7,413,374 B2 * | 8/2008 | Rogers et al. .................... 404/35 |
| 8,006,458 B1 * | 8/2011 | Olofsson et al. ............. 52/582.1 |
| 2003/0192275 A1 * | 10/2003 | He ............................... 52/403.1 |
| 2004/0253430 A1 | 12/2004 | Polk, Jr. et al. |
| 2005/0144875 A1 * | 7/2005 | Lenhard-Backhaus et al. ......................... 52/506.01 |
| 2006/0008967 A1 | 1/2006 | Polk, Jr. et al. |
| 2009/0044484 A1 * | 2/2009 | Berger ........................ 52/783.1 |

* cited by examiner

LOAD BEARING ASSEMBLY

CROSS REFERENCE TO RELATED PATENT APPLICATION

The present non-provisional patent application is entitled to and claims, under 35 U.S.C. §119(e), the benefit of U.S. Provisional Patent Application Ser. No. 61/022,378, filed Jan. 21, 2008, which is hereby incorporated herein by reference in its entirety.

FIELD OF THE INVENTION

The present invention relates to a load bearing assembly that includes at least one molded panel having first and second external portions that engage interlockingly with a first and optionally a second support. The first and second external portions each have extensions that define a plurality of external portion recesses. Each support has a plurality of extensions that are received within the external portion recesses of the panel, thereby attaching the molded panel and the supports together. The invention also relates to a load bearing assembly that includes a panel assembly formed from a plurality of molded panels having overlapping external portions that interlockingly attach the panels together. The panel assembly also includes first and second free external portions that engage interlockingly with first and second supports.

BACKGROUND OF THE INVENTION

Load bearing assemblies may be used in a number of applications, such as walkways, catwalks, flooring (e.g., temporary aircraft runways), shelving, and interior and/or exterior walls of containers and dwellings. In many applications, the components (e.g., the individual panels and supports) of a load bearing assembly are fabricated at one location, and then transported to a distant point of use where they are later assembled. Alternatively, fabrication and assembly of the individual panels and supports may be conducted at the same location, followed by shipping the final assembled load bearing article to a distant point of use and optionally further assembly.

As transportation of either the individual components or the assembled load bearing assembly to a point of use and/or further assembly is typically required, reducing the weight of the individual components and/or the load bearing assembly is generally desirable for purposes of reducing shipping related fuel costs. Weight reduction is also desirable for purposes of improving the ease of handling the individual components, and the final assembled load bearing assembly.

Weight reduction may be achieved by fabricating individual components from plastic, rather than heavier materials, such as wood and metals. The individual plastic components, and in particular assemblies thereof, typically must, however, possess physical properties, such as strength and load bearing properties (e.g., static and non-static load bearing properties), that are at least equivalent to those of the original components (e.g., metal panels and metal supports). Molded plastic load bearing assemblies are typically prone to failure at the points where the panels themselves and/or the panels and the supports are joined together. Failure typically occurs when the plastic load bearing assemblies are subjected to loads, and in particular non-static loads, such as oscillating loads. To improve physical properties and to reduce the occurrence of load related joint failures, the individual molded plastic panels of the load bearing assembly are typically fabricated so as to weigh at least as much as the original panels (e.g., metal panels) they were designed to replace. To further improve physical properties, the molded plastic load bearing assemblies typically include a redundancy of fasteners, such as screws and/or bolts, at the points where the panels alone and/or the panels and the supports are joined together.

It would be desirable to develop molded plastic load bearing assemblies that have reduced weight relative to equivalent load bearing assemblies fabricated from heavier materials, such as metals. It would be further desirable that such newly developed molded plastic load bearing assemblies also possess physical properties, such as static and non-static load bearing properties, that are at least equivalent to those of equivalent load bearing assemblies fabricated from heavier materials, such as metals. Still further, it would be desirable that such newly developed molded plastic load bearing assemblies be easily and efficiently assembled.

SUMMARY OF THE INVENTION

In accordance with the present invention, there is provided a single panel embodiment of a load bearing assembly comprising:
(a) at least one molded panel comprising,
   (i) a center portion of plastic material having a first side and a second side, said second side of said center portion comprising a plurality of plastic center reinforcing structures defining a plurality of center portion apertures,
   (ii) a first external portion of plastic material having a first side having a first surface and a second side having a second surface, said second side of said first external portion comprising a plurality of plastic first reinforcing structures having sidewalls having interior surfaces and exterior surfaces, the interior surfaces of at least some of said sidewalls defining a plurality of first external portion apertures, the exterior surfaces of the sidewalls of each first reinforcing structure together with the exterior surfaces of the sidewalls of at least one neighboring first reinforcing structure defining a plurality of first external portion recesses, and
   (iii) a second external portion of plastic material having a first side having a first surface and a second side having a second surface, said second side of said second external portion comprising a plurality of plastic second reinforcing structures having sidewalls having interior and exterior surfaces, the interior surfaces of at least some of said sidewalls defining a plurality of second external portion apertures, the exterior surfaces of the sidewalls of each second reinforcing structure together with the exterior surfaces of at least one neighboring second reinforcing structure defining a plurality of second external portion recesses,
wherein,
   said center portion residing between and being continuous with each of said first external portion and said second external portion, and said center portion, said first external portion and said second external portion together defining a continuous unitary structure,
   said first side of said center portion, said first side of said first external portion and said first side of said second external portion together defining a first side of said panel, said first side of said panel being a substantially even surface, and
   said second side of said center portion extends beyond each of the second side of said first external portion and the second side of said second external portion, said second side of said center portion, said second side of said first external portion and said second side of said second external portion together defining a second side of said panel, said second side of said panel being an uneven surface;

(b) a first support comprising a first side having an upper surface, said first side comprising a plurality of extensions defining a plurality of apertures, at least a portion of said first side of said first support abutting said second side of said first external portion, and at least some of said extensions of said first support being fittingly received within at least some of said first external portion recesses of said first external portion and forming a first set of support interlocks, said first set of support interlocks attaching said molded panel and said first support together; and (c) optionally a second support comprising a first side having an upper surface, said first side comprising a plurality of extensions defining a plurality of apertures, at least a portion of said first side of said second support abutting said second side of said second external portion, and at least some of said extensions of said second support being fittingly received within at least some of said second external portion recesses of said second external portion and forming a second set of support interlocks, said second set of support interlocks attaching said molded panel and said second support together.

As used herein and in the claims, the term "single panel embodiment" and similar terms (e.g., single molded panel embodiment) with regard to the load bearing assembly of the present invention refers to those embodiments as summarized above in which one or more single (or lone) molded panels each interlockingly engage with a first support and/or a second support.

In further accordance with the present invention, there is provided a molded panel assembly embodiment of a load bearing assembly comprising:

(a) a molded panel assembly comprising a plurality of panels comprising at least a first molded panel and a second molded panel, wherein each molded panel is as described above, and further wherein, the second side of the first external portion of said first panel abuts a portion of said second side of said center portion of said second panel, some of said center plastic reinforcing structures of said second panel being fittingly received within at least some of said first external portion recesses of said first panel, and together forming a first set of panel interlocks, said first set of panel interlocks attaching said first panel and said second panel together, the second side of the first external portion of said second panel abuts a portion of said second side of said center portion of said first panel, some of said center plastic reinforcing structures of said first panel being fittingly received within at least some of said first external portion recesses of said second panel, and together forming a second set of panel interlocks, said second set of panel interlocks further attaching said first panel and said second panel together, the first side of said first panel being substantially even with the second side of the center portion of said second panel, and together defining at least a portion of a first side of said molded panel assembly, and the first side of said second panel being substantially even with the second side of the center portion of said first panel, and together defining at least a portion of a second side of said molded panel assembly, said molded panel assembly having a first terminal molded panel and a second terminal molded panel each being as described with regard to said molded panel, said first terminal molded panel having a first free external portion, said first free external portion being as described with regard to said first external portion of said molded panel, said second terminal molded panel having a second free external portion, said second free external portion being as described with regard to said second external portion of said molded panel, said first free external portion and said second free external portion each being free of interlocking engagement with the center plastic reinforcing structures of a neighboring molded panel;

(b) a first support comprising a first side having a first surface, said first side comprising a plurality of extensions defining a plurality of apertures, at least a portion of said first side of said first support abutting said second side of said first free external portion of said panel assembly, and at least some of said extensions of said first support being fittingly received within at least some of said first external portion recesses of said first free external portion of said panel assembly and forming a first set of support interlocks, said first set of support interlocks attaching said molded panel assembly and said first support together; and (c) optionally a second support comprising a first side having a first surface, said first side comprising a plurality of extensions defining a plurality of apertures, at least a portion of said first side of said second support abutting said second side of said second free external portion of said molded panel assembly, and at least some of said extensions of said second support being fittingly received within at least some of said recesses of said second external portion recesses of said second free external portion of said molded panel assembly and forming a second set of support interlocks, said second set of support interlocks attaching said molded panel assembly and said second support together.

As used herein and in the claims, the term "molded panel assembly embodiment" and similar terms (e.g., "panel assembly embodiment") with regard to the load bearing assembly of the present invention refers to those embodiments as summarized above in which one or more molded panel assemblies (each composed of at least two interlocked panels) interlockingly engage with a first support and/or a second support.

In accordance with the present invention, there is still further provided a structure (e.g., a walkway, shelf, temporary ground covering or wall) comprising the molded load bearing assembly or assemblies as described above.

The features that characterize the present invention are pointed out with particularity in the claims, which are annexed to and form a part of this disclosure. These and other features of the invention, its operating advantages and the specific objects obtained by its use will be more fully understood from the following detailed description and accompanying drawings in which preferred embodiments of the invention are illustrated and described.

As used herein and in the claims, terms of orientation and position, such as "upper", "lower", "inner", "outer", "right", "left", "vertical", "horizontal", "top", "bottom", and similar terms, are used to describe the invention as oriented in the drawings. Unless otherwise indicated, the use of such terms is not intended to represent a limitation upon the scope of the invention, in that the invention may adopt alternative positions and orientations.

Unless otherwise indicated, all numbers or expressions, such as those expressing structural dimensions, quantities of ingredients, etc. used in the specification and claims are understood as modified in all instances by the term "about".

BRIEF DESCRIPTION OF THE DRAWINGS

In FIGS. 1 through 31, like reference numerals designate the same components and structural features, unless otherwise indicated.

DETAILED DESCRIPTION OF THE INVENTION

Figure 1:
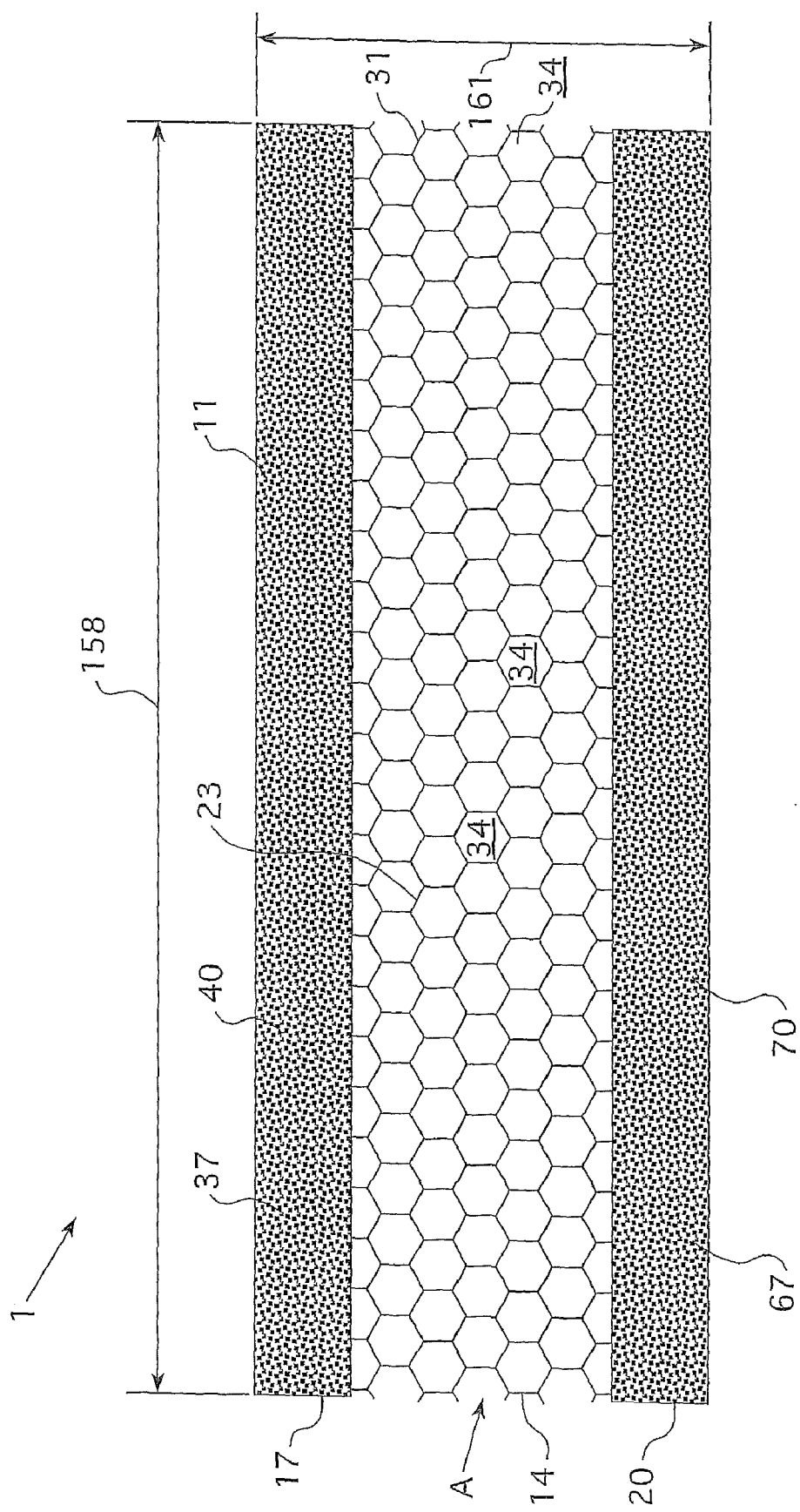
FIG. 1 is a representative top plan view of the first side of a single molded panel of the load bearing assembly according to the present invention.
Figure 2:
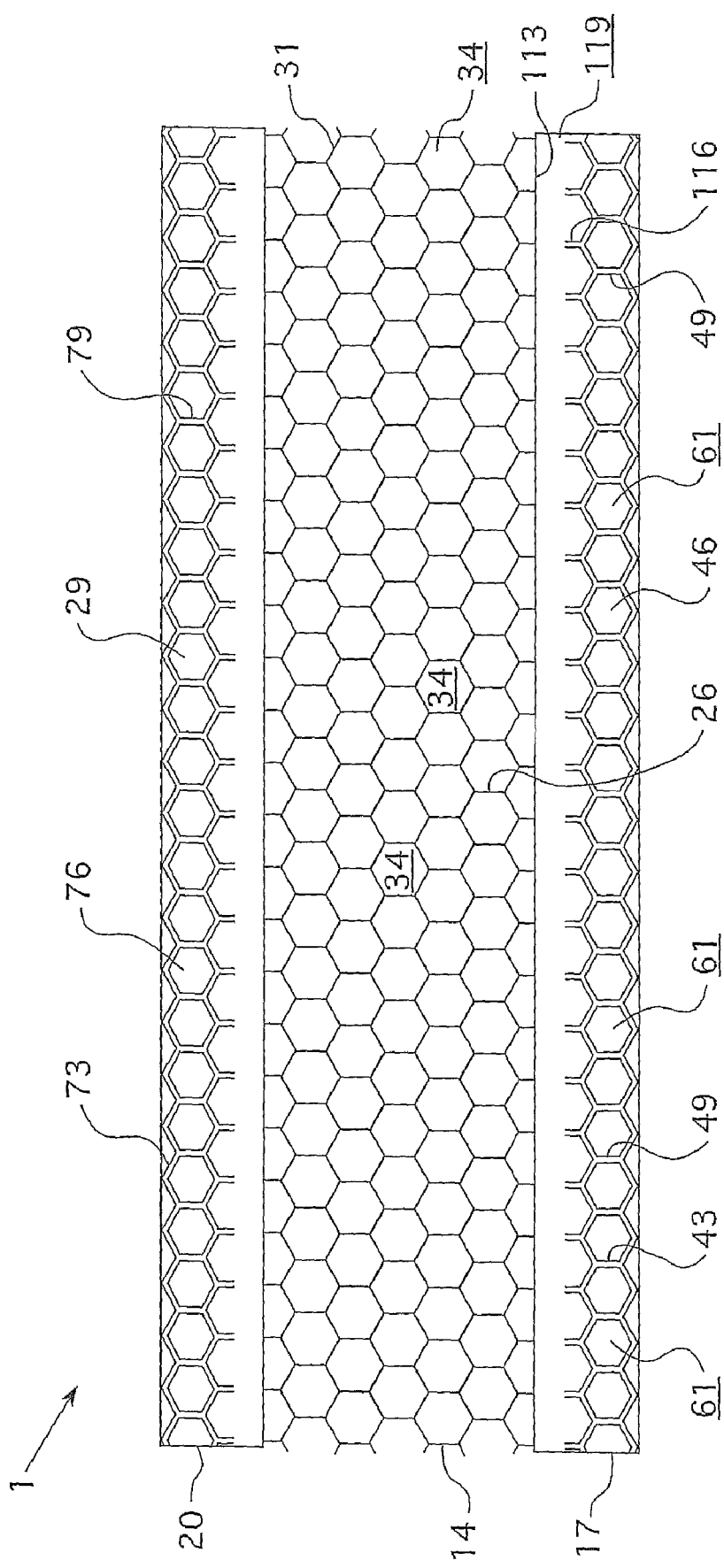
FIG. 2 is a representative bottom plan view of the second side of the molded panel of FIG. 1.

With reference to FIGS. 1-6 of the drawings there is depicted a molded panel 1 that forms part of a load bearing assembly according to the present invention. In FIG. 1, a plan view of the first (or upper) side 11 of molded panel 1 is depicted. A plan view of the second (or lower) side 29 of molded panel 1 is shown in FIG. 2. Molded panel 1 includes a center portion 14 of plastic material, a first external portion 17 of plastic material, and a second external portion 20 of plastic material. Center portion 14 resides between and is continuous with each of first external portion 17 and second external portion 20, and the three portions together define a continuous unitary structure (i.e., molded panel 1).

Figure 3:
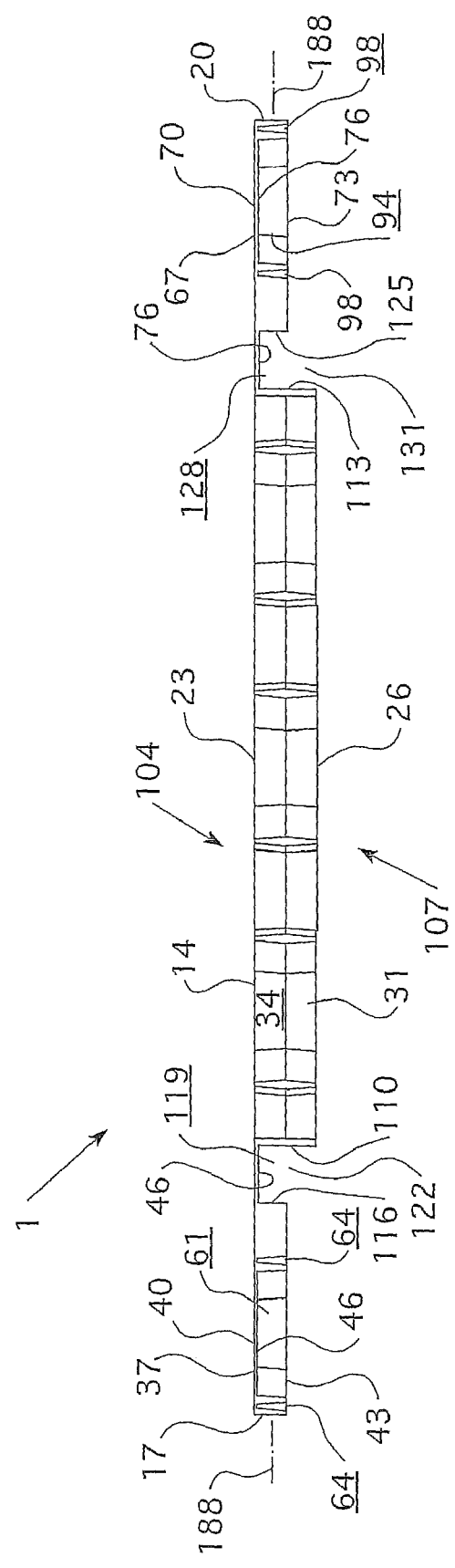
FIG. 3 is a representative side elevation view along side A of the molded panel of FIG. 1, showing the relative thickness of the center portion and the first and second external portions thereof.

The molded panel of the load bearing assembly of the present invention may have any suitable shape. For example, the molded panel may have shapes selected from, but not limited to, longitudinally arcuate shapes, transversely arcuate shapes, angular shapes (e.g., with the first external portion and/or the second external portion angled up and/or down relative to the center portion), and combinations thereof. Typically, the center portion, first external portion and second external portion together reside substantially within a common plane. With reference to FIG. 3, center portion 14, first external portion 17 and second external portion 20 together reside substantially within a common plane represented by lines 188.

Center portion 14 has a first side 23 and a second side 26. See, for example, FIG. 3. Second side 26 of center portion 14 includes a plurality of reinforcing structures 31 that define a plurality of center portion apertures 34. More particularly, second side 26 of center portion 14 is defined by second terminal portions (or surfaces) 33 of each reinforcing structure 31. See FIGS. 5 and 6. First side 23 of center portion 14 may be a closed surface, such as a substantially continuous surface (not shown). In an embodiment of the present invention, first side 23 of center portion 14 is an open (or non-continuous) surface (as depicted in the drawing figures), and accordingly center portion apertures 34 extend from first side 23 to second side 26 (and equivalently from second side 26 to first side 23) of center portion 14. More particularly, when first side 23 of center portion 14 is an open surface, first side 23 is defined by first terminal portions (or surfaces) 32 of each reinforcing structure 31. See FIGS. 5 and 6.

Figure 5:
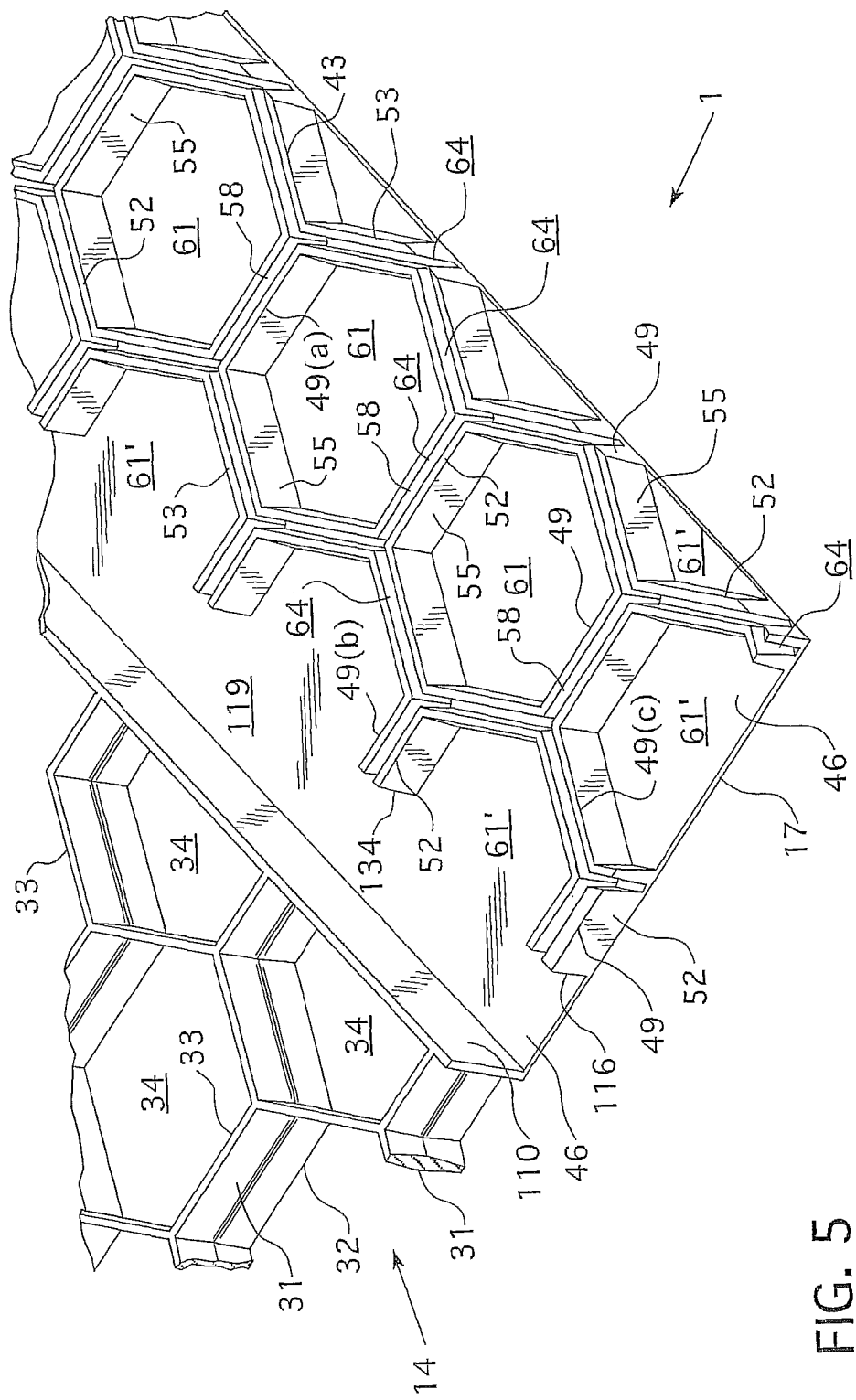
FIG. 5 is a representative perspective view of a portion of the second side of the molded panel of FIG. 1, showing the first reinforcing structures associated with the second side of the first external portion thereof.

First external portion 17 has a first side 37 having a first surface 40, and a second side 43 having a second surface 46. Second side 43 of first external portion 17 includes a plurality of first reinforcing structures 49. More particularly, first reinforcing structures 49 extend away from second surface 46 of first external portion 17, and include sidewalls 52 having interior surfaces 55 and exterior surfaces 58. Each sidewall 52 of first reinforcing structures 49 has a terminal portion or surface 53 (FIG. 5). Second side 43 of first external portion 17 is, more particularly, defined by the terminal portion (or surface) 53 of each sidewall 52 of first reinforcing structures 49 thereof.

The interior surfaces 55 of at least some of sidewalls 52 of first reinforcing structures 49 define a plurality of first external portion apertures 61. See, for example, FIG. 5. As used herein and in the claims, the term "first external portion apertures" refers to: (i) fully enclosed first external portion apertures, in which sidewalls 52 substantially fully encompass the apertures; and/or (ii) partially enclosed first external portion apertures, in which sidewalls 52 do not fully encompass the apertures. With particular reference to FIG. 5, sidewalls 52 of first reinforcing structures 49 may define fully enclosed first external portion apertures (e.g., 61) and/or partially enclosed first external portion apertures (e.g., 61').

First surface 40 (and correspondingly second surface 46) of first external portion 17 may be a substantially closed surface, such as a substantially continuous surface, as depicted in the drawing figures. When first surface 40 (and correspondingly second surface 46) of first external portion 17 is a closed surface, first external portion apertures 61 do not extend from first side 37 to second side 43 of first external portion 17, but rather are only open on second side 43. Alternatively, first surface 40 (and accordingly second surface 46) of first external portion 17 may be a partially open (or non-continuous) surface (not shown), in which case at least some of first external portion apertures 61 may extend from first side 37 to second side 43 of first external portion 17.

Each first reinforcing structure has at least one neighboring first reinforcing structure. With reference to FIG. 5, first reinforcing structure 49 has at least one neighboring first reinforcing structure, e.g., 49(*a*), 49(*b*) and/or 49(*c*). The exterior surfaces 58 of the sidewalls 52 of each first reinforcing structure 49, together with the exterior surfaces 58 of the sidewalls 52 of at least one neighboring first reinforcing structure 49 (e.g., a plurality of neighboring first reinforcing structures) define a plurality of first external portion recesses 64.

First external portion recesses 64 may have any suitable form and shape. Since first external portion recesses 64 are defined by the exterior surfaces 58 of sidewalls 52 of neighboring first reinforcing structures (49), the first external portion recesses are typically in the form of slotted recesses. The first external portion slotted recesses may have shapes selected from, for example, circular slotted recesses, oval slotted recesses, polygonal slotted recesses (e.g., triangular, square, rectangular, pentagonal, hexagonal, heptagonal, octagonal, etc. slotted recesses), irregular slotted recesses, and combinations thereof. Typically, the first external portion recesses are in the form of polygonal slotted recesses, and in a particular embodiment in the form of hexagonal slotted recesses 64 as depicted in the drawing figures (e.g., FIG. 5).

Figure 6:
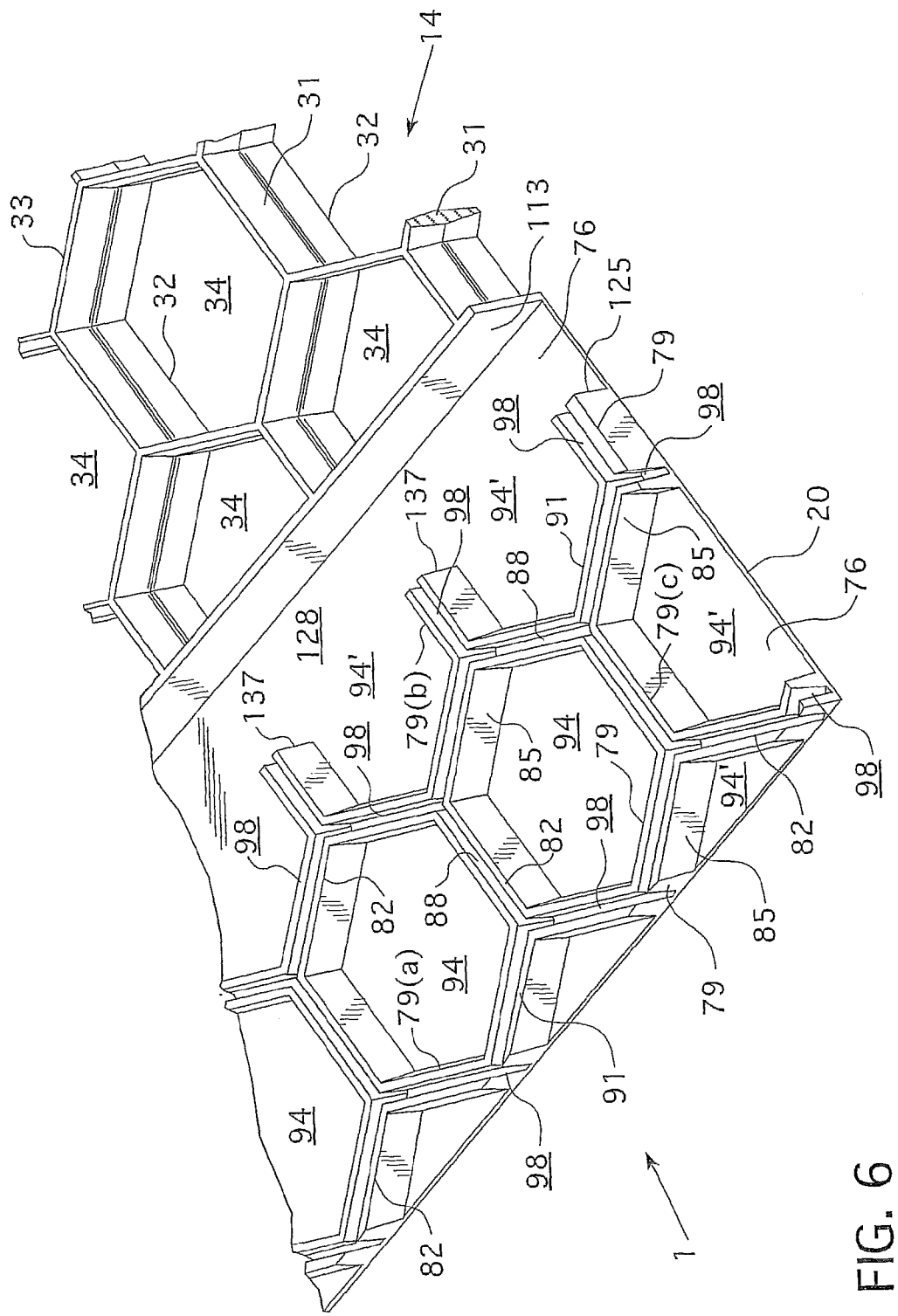
FIG. 6 is a representative perspective view of a portion of the second side of the molded panel of FIG. 1, showing the second reinforcing structures associated with the second side of the second external portion thereof.

Second external portion 20 has a first side 67 having a first surface 70, and a second side 73 having a second surface 76. Second side 73 of second external portion 20 includes a plurality of second reinforcing structures 79. More particularly, second reinforcing structures 79 extend away from second surface 76 of second external portion 20, and include sidewalls 82 having interior surfaces 85 and exterior surfaces 88. Each sidewall 82 of second reinforcing structure 79 has a terminal portion or surface 91 (FIG. 6). Second side 73 of second external portion 20 is, more particularly, defined by the terminal portion (or surface) 91 of each sidewall 82 of second reinforcing structures 79 thereof.

The interior surfaces 85 of at least some of sidewalls 82 of second reinforcing structures 79 define a plurality of second external portion apertures 94. See, for example, FIG. 6. As used herein and in the claims, the term "second external portion apertures" refers to: (i) fully enclosed second external portion apertures, in which sidewalls 82 substantially fully encompass the apertures; and/or (ii) partially enclosed second external portion apertures, in which sidewalls 82 do not fully encompass the apertures. More particularly, with reference to FIG. 6, sidewalls 82 of second reinforcing structures 79 may define fully enclosed second external portion apertures (e.g., 94), and/or partially enclosed second external portion apertures (e.g., 94').

First surface 70 (and correspondingly second surface 76) of second external portion 20 may be a substantially closed surface, such as a substantially continuous surface, as depicted in the drawing figures. When first surface 70 (and correspondingly second surface 76) of second external portion 20 is a closed surface, second external apertures 94 do not extend from first side 67 to second side 73, but rather are only open on second side 73. Alternatively, first surface 67 (and correspondingly second surface 73) of second external portion 20 may be a partially open (or non-continuous) surface (not shown), in which case at least some of second external portion apertures 94 may extend from first side 67 to second side 73 of second external portion 20.

Each second reinforcing structure has at least one neighboring second reinforcing structure in the molded panel of the present invention. With reference to FIG. 6, second reinforcing structure 79 has at least one neighboring second reinforcing structure, e.g., 79(*a*), 79(*b*) and/or 79(*c*). The exterior surfaces 88 of the sidewalls 82 of each second reinforcing structure 79, together with the exterior surfaces 88 of at least one neighboring second reinforcing structure 79 (e.g., a plurality of neighboring second reinforcing structures) define a plurality of second external portion recesses 98.

As with first external portion recesses 64, second external portion recesses 98 may independently have any suitable form and shape. Since second external portion recesses 98 are defined by the exterior surfaces 88 of sidewalls 82 of neighboring second reinforcing structures (79), the second external portion recesses are typically in the form of slotted recesses. The second external portion slotted recesses may have shapes selected from, for example, circular slotted recesses, oval slotted recesses, polygonal slotted recesses (e.g., triangular, square, rectangular, pentagonal, hexagonal, heptagonal, octagonal, etc. slotted recesses), irregular slotted recesses, and combinations thereof. Typically, the second external portion recesses are in the form of polygonal slotted recesses, and, in a particular embodiment, in the form of hexagonal slotted recesses 98 as depicted in the drawing figures (e.g., FIG. 6).

With reference to FIG. 3, first side 23 of center portion 14, first side 37 of first external portion 17, and first side 67 of second external portion 20 together define a first side 104 of molded panel 1 of the present invention. First side 104 of molded panel 1 is a substantially even surface, relative to a side elevation view of an end of the molded panel in which the full width of center section 14 is exposed, as depicted in FIG. 3.

With further reference to the side elevation view of FIG. 3, second side 26 of center section 14 extends beyond each of second side 43 of first external portion 17 and second side 73 of second external portion 20. Second side 26 of center section 14, second side 43 of first external portion 17 and second side 73 of second external portion 20 together define a second side 107 of molded panel 1. Second side 107 of molded panel 1 is an uneven surface, relative to a side elevation view of an end of the molded panel in which the full width of center section 14 is exposed, as depicted in FIG. 3.

The center apertures 34, the first external portion apertures 61 and the second external portion apertures 94 of each molded panel 1 may each independently, in an embodiment of the present invention, have shapes selected from circles, ovals, polygons (e.g., triangles, squares, rectangles, pentagons, hexagons, heptagons, octagons, etc.), irregular shapes and combinations thereof. As discussed previously herein, center apertures 34 are defined by the center reinforcing structures 31, first external portion apertures 61 are defined by interior surfaces 55 of sidewalls 52 of first reinforcing structures 49, and second external portion apertures 94 are defined by interior surfaces 85 of sidewalls 82 of second reinforcing structures 79. In an embodiment of the present invention, center apertures 34, the first external portion apertures 61 and the second external portion apertures 94 may each independently have polygonal shapes, and in particular hexagonal shapes (as depicted in the drawings).

The load bearing assembly of the present invention also includes a first support and optionally a second support, each having a plurality of surfaces (e.g., 3, 4, 5, 6, 7, 8 or more surfaces) and a plurality of extensions extending outwardly from at least one surface thereof, that form support interlocks with the external portion recesses of the first and/or second external portions (or free external portions) of the molded panel (or panel assembly, as will be discussed in further detail herein). While the second support is optional, the load bearing assembly of the present invention typically includes both the first and second supports.

With reference to FIGS. 20 through 23 of the drawings, load bearing assembly 300 includes first support 303 and second support 306. First support 303 includes a first side 309 having an upper surface 312, a second side 315, and a plurality of extensions 318 extending outwardly (e.g., upwardly) from upper surface 312. More particularly, first support 303 may be described as having a base 304, which has an upper surface 312 and a second side 315, with extensions 318 extending outwardly/upwardly from base 304. Extensions 318 have terminal portions (or surfaces) 321 that together define first side 309 of first support 303. Extensions 318 define a plurality of apertures 324 (e.g., first support apertures 324). See, for example, FIG. 18. While some or all of the first support apertures 324 may extend from first side 309 to second side 315 of first support 303, apertures 324 more typically are open on first side 309 and closed at (or by) first surface 312.

At least some of extensions 318 of first support 303 are fittingly received within at least some of the first external portion recesses 64 of first external portion 17 of the molded panel (e.g., molded panel 1) thereby forming a first set of support interlocks 327. See, for example, FIGS. 21, 22 and 23. First set of support interlocks 327 serve to attach (e.g., fixedly or reversibly) the molded panel (e.g., molded panel 1) and the first support 303 together.

Extensions 318 of first support 303 may have any suitable shape, provided they are dimensioned for receipt within at least some of first external portion recesses 64 of the first external portion 17 of the molded panel (or the first free external portion of the molded panel assembly—discussed further herein). For example, extensions 318 of first support 303 may have (or form) shapes selected from circular shapes, oval shapes, polygonal shapes, irregular shapes and combinations thereof. Typically, extensions 318 of first support 303 have (or form) polygonal shapes, and, in a particular embodiment, hexagonal shapes (as depicted in the drawings, e.g., FIG. 18). In an embodiment, extensions 318 of first support 303 and first external portion recesses 64 have matching and mating shapes, and, in particular, matching and mating polygonal shapes. In a particular embodiment, the extensions of the first support are in the form of hexagonal extensions (e.g., 318), and the first external portion recesses (into which the extensions are received) are in the form of first external portion hexagonal slotted recesses (e.g., 64). See for example FIGS. 5, 18 and 20.

First support 303 may also include further extensions extending outwardly from at least one surface other than upper surface 312 (e.g., from two or more surfaces of base 304 thereof). For example, in addition to extensions 318 extending outwardly from upper surface 312, first support 303 may also include further extensions extending outwardly from second side 315 and/or first terminal edge 356 (not shown in the drawing figures). Extensions extending outwardly from more than one surface of the base, allows the first support to be interlocked with more than one molded panel or molded panel assembly. For example, the first support may be in the form of an upright corner post of a structure, such as a dwelling, having extensions extending outwardly from two adjoining surfaces of its base portion that share a common corner (e.g., upper surface 312 and first terminal edge 356, with first terminal edge 356 having a width similar to that of upper surface 312—not shown).

Figure 19:
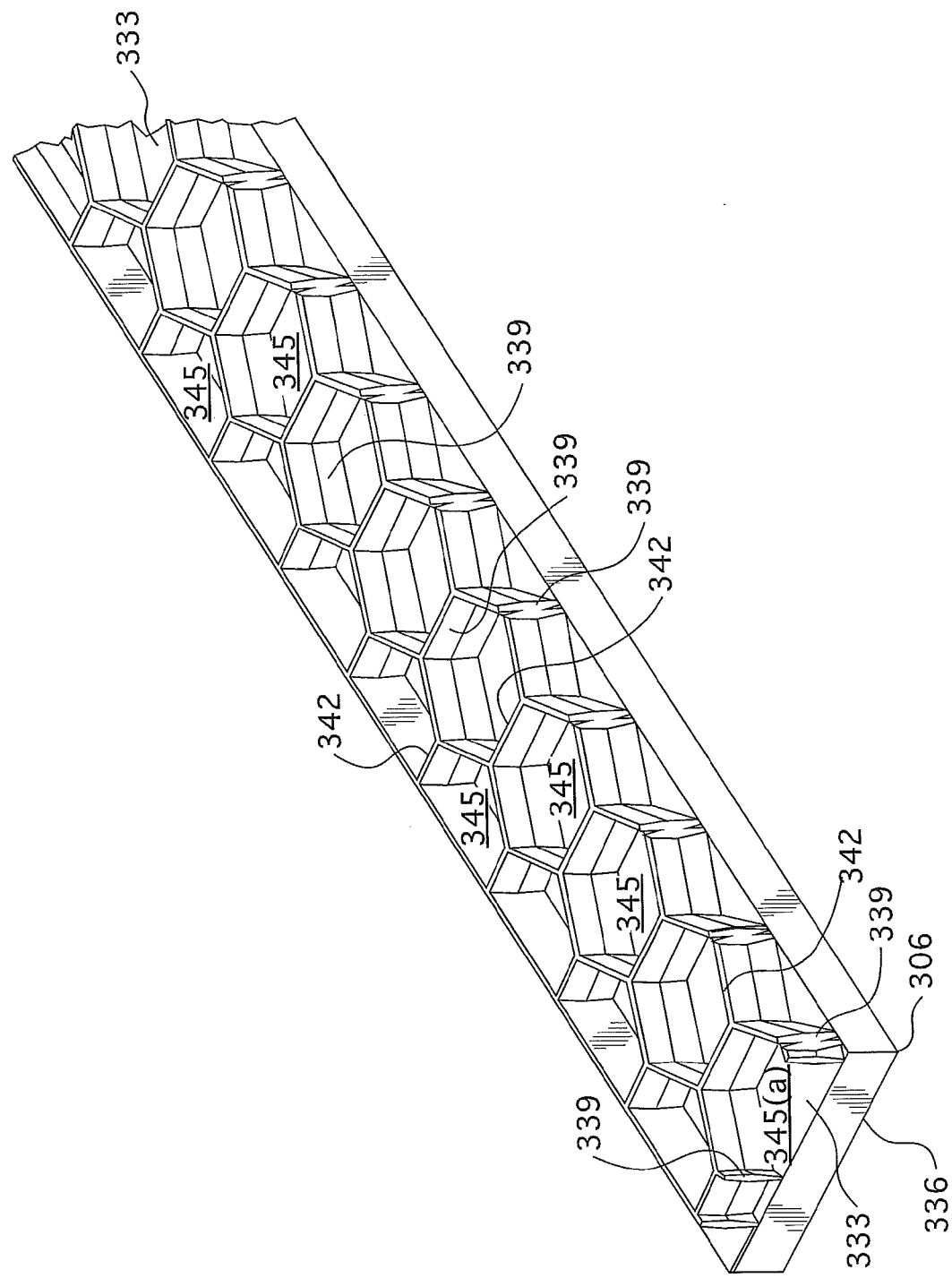
FIG. 19 is a representative perspective partial view of a second support of the load bearing assembly of the present invention.

With further reference to FIGS. 20 through 23 of the drawings, load bearing assembly 300 also includes second support 306. Second support 306 includes a first side 330 having an upper surface 333, a second side 336, and a plurality of extensions 339 extending outwardly (e.g., upwardly) from upper surface 333. More particularly, second support 306 may be described as having a base 307, which has an upper surface 333 and a second side 336, with extensions 339 extending outwardly/upwardly from base 307. Extensions 339 have terminal portions (or surfaces) 342 that together define first side 330 of second support 306. Extensions 339 define a plurality of apertures 345 (e.g., second support apertures 345). See, for example, FIG. 19. While some or all of the second support apertures 345 may extend from first side 330 to second side 336 of second support 306, apertures 345 more typically are open on first side 330 and closed at (or by) first surface 333.

At least some of extensions 339 of second support 306 are fittingly received within at least some of the second external portion recesses 98 of second external portion 20 of the molded panel (e.g., molded panel 1) thereby forming a second set of support interlocks 348. See, for example, FIGS. 21, 22 and 23. Second set of support interlocks 348 serve to attach (e.g., fixedly or reversibly) the molded panel (e.g., molded panel 1) and the second support 306 together.

Extensions 339 of second support 306 may have any suitable shape, provided they are dimensioned for receipt within at least some of second external portion recesses 98 of the second external portion 20 of the molded panel (or of the second free external portion of the molded panel assembly—discussed further herein). For example, extensions 339 of second support 306 may have (or form) shapes selected from circular shapes, oval shapes, polygonal shapes, irregular shapes and combinations thereof. Typically, extensions 339 of second support 306 have (or form) polygonal shapes, and in a particular embodiment hexagonal shapes (as depicted in the drawings, e.g., FIG. 19). In an embodiment, extensions 339 of second support 306 and second external portion recesses 98 have matching and mating shapes, and in particular matching and mating polygonal shapes. In a particular embodiment, the extensions of the second support are in the form of hexagonal extensions (e.g., 339), and the second external portion recesses (into which the extensions are received) are in the form of second external portion hexagonal slotted recesses (e.g., 98). See for example FIGS. 6, 19 and 20.

Second support 306 may also include further extensions extending outwardly from at least one surface other than upper surface 333 (e.g., from two or more surfaces of base 307 thereof). For example, in addition to extensions 339 extending outwardly from upper surface 333, second support 306 may also include further extensions extending outwardly from second side 336 and/or first terminal edge 371 (not shown in the drawing figures). Extensions extending outwardly from more than one surface of the base, allows the second support to be interlocked with more than one molded panel or molded panel assembly. For example, the second support may be in the form of an upright corner post of a structure, such as a dwelling, having extensions extending outwardly from two adjoining surfaces of its base portion that share a common corner (e.g., upper surface 333 and first terminal edge 371, with first terminal edge 371 having a width similar to that of upper surface 333—not shown).

First support apertures 324, which are defined by extensions 318, and second support apertures 345, which are defined by extensions 339, may each independently have any suitable shape. First support apertures 324 and second support apertures 345 may each independently have a shape selected from circles, ovals (e.g., elliptical shapes), polygonal shapes (e.g., triangles, rectangles, squares, pentagons, hexagons, heptagons, octagons, etc., and combinations thereof, irregular shapes and combinations thereof. In a particular embodiment of the present invention, first support apertures 324 and second support apertures 345 each have hexagonal shapes as depicted in the drawings.

The support apertures may be fully surrounded by the extensions, e.g., first support apertures 324 and second support apertures 345. Alternatively, or in addition thereto, some of the support apertures may be only partially surrounded by the extensions, e.g., first support apertures 324(a) and second support apertures 345(a). See, for example, FIGS. 18 and 19. As used herein and in the claims, the term "support apertures" and related terms, such as "first support apertures" and "second support apertures" refers to support apertures that are fully surrounded and/or partially surrounded by the associated extensions.

The first and second supports (e.g., first support 303 and/or second support 306) of the load bearing assembly may each be independently fabricated from any suitable rigid material, such as wood, metal, thermoplastic materials, thermoset plastic materials and combinations thereof. In an embodiment, the first and second supports are each independently fabricated from plastic material, and the plastic material in each case is independently selected from thermoplastic materials, thermoset plastic materials and combinations thereof. The thermoplastic and thermoset plastic materials from which the first and second supports may be fabricated, may be selected from those classes and examples as discussed in further detail herein.

In an embodiment, the second side of the molded panel, and more particularly the first and second external portions of the molded panel each include a first and a second elongated open channel, respectively, that together with aligned extension-free-portions of the respective first and second supports, together define a first and a second enclosed panel-support channel. At least one of the first and the second enclosed panel-support channels may further include an elongated support that serves to provide additional dimensional stability to the load bearing assembly.

More particularly with regard to the elongated open channels of the molded panel and with reference to FIG. 3, center portion 14 includes a first exterior edge 110, which is proximate to first external portion 17, and a second exterior edge 113, which is proximate to second external portion 20. First external portion 17 has an internal edge 116, which is opposed to first exterior edge 110 of center portion 14. First exterior edge 110 of center portion 14 and internal edge 116 of first external portion 17 together define first elongated open channel 119. More particularly, first exterior edge 110 of center portion 14, and internal edge 116 and a portion of second surface 46 of first external portion 17 together define first elongated open channel 119. First elongated channel 119 has an elongated open end 122 on second side 107 of molded panel 1.

With regard to defining the second elongated open channel of the molded panel, second external portion 20 may further include an internal edge 125, which is opposed to second exterior edge 113 of center portion 14. Second exterior edge 113 of center portion 14 and internal edge 125 of second external portion 20 together define second elongated open channel 128. More particularly, second exterior edge 113 of center portion 14, and internal edge 125 and a portion of second surface 76 of second external portion 20 together define second elongated open channel 128. Second elongated open channel 128 has an open end 131 on second side 107 of molded panel 1.

First elongated open channel 119 and second elongated open channel 128 may each independently have a cross-sectional shape selected from arcuate shapes (e.g., partial circles and/or partial ovals), polygonal shapes, irregular shapes and combinations thereof. In an embodiment of the present invention, first elongated open channel 119 and second elongated open channel 128 each independently have a cross-sectional shape selected from polygonal shapes, such as partial rectangular shapes (e.g., rectangular U-shapes), as depicted in the drawing figures.

First exterior edge 110 of center portion 14 and internal edge 116 of first external portion 17, which together define first elongated open channel 119, may each independently have a surface selected from a substantially closed and continuous surface and/or a surface having a plurality of apertures. With reference to FIG. 5, first exterior edge 110 of center portion 14 has a substantially closed and continuous surface. With further reference to FIG. 5, internal edge 116 of first external portion 17 has a plurality of apertures that are defined by sidewalls 52 of first reinforcing structures 49. Some of sidewalls 52 of first reinforcing structures 49 have truncated ends 134 that face first exterior edge 110, and which are aligned so as to form internal edge 116 of first external portion 17. Similarly, first exterior edge 110 of center portion 14 may be defined by truncated and aligned ends (not shown) of center reinforcing structures 31, in which case first exterior edge 110 would have a surface having a plurality of apertures.

Second exterior edge 113 of center portion 14, and internal edge 125 of second external portion 20, which together define second elongated open channel 128, may each independently have a substantially closed and continuous surface, and/or a surface having a plurality of apertures. With reference to FIG. 6, second exterior edge 113 of center portion 14 has a substantially closed and continuous surface. With further reference to FIG. 6, internal edge 125 of second external portion 20 has a plurality of apertures that are defined by sidewalls 82 of second reinforcing structures 79. Some of sidewalls 82 of second reinforcing structures 79 have truncated ends 137 that face second exterior edge 113, and which are aligned so as to form internal edge 125 of second external portion 20. Second exterior edge 113 of center portion 14 may similarly be defined by truncated and aligned ends (not shown) of center reinforcing structures 31, in which case second exterior edge 113 would have a surface having a plurality of apertures.

Figure 18:
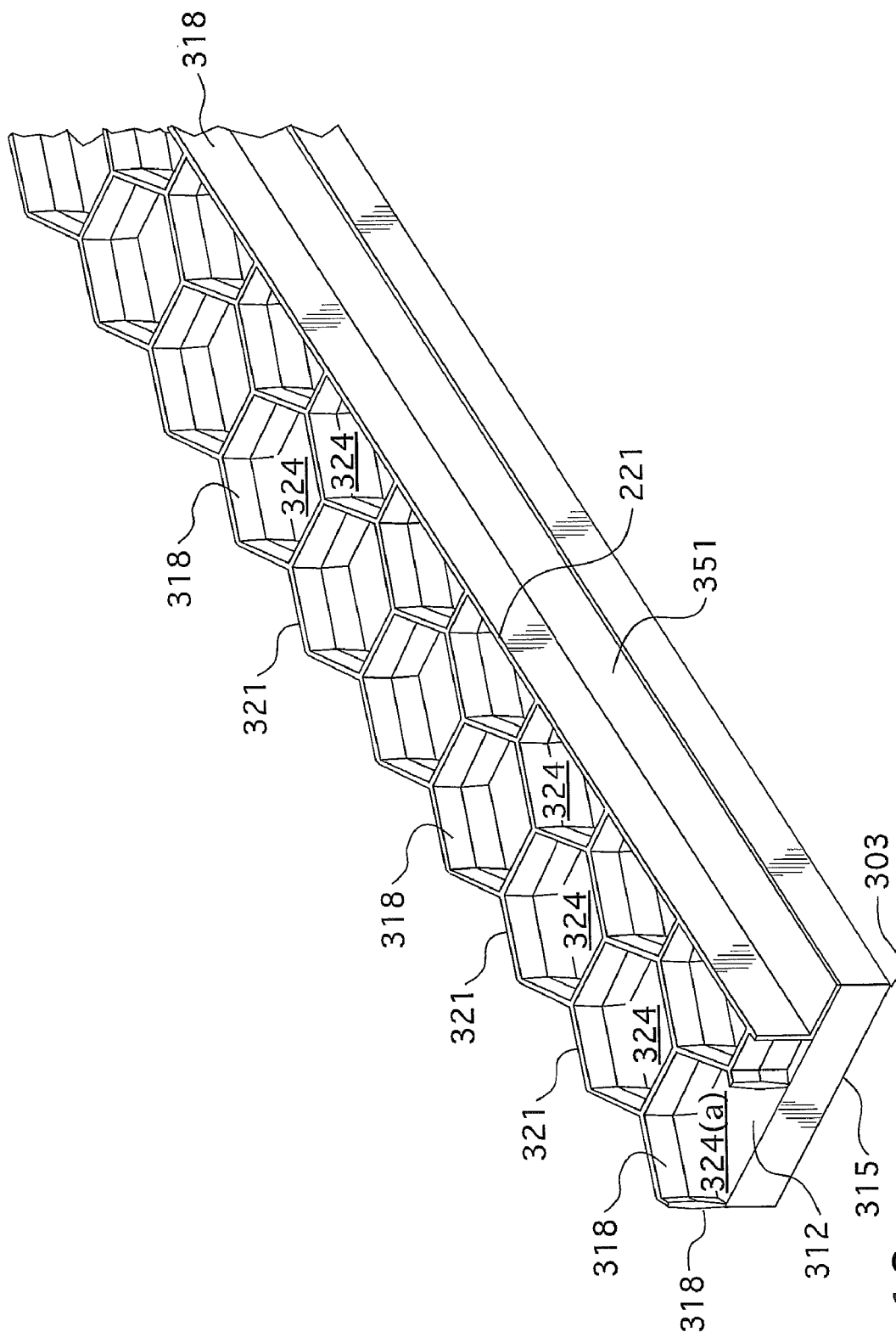
FIG. 18 is a representative perspective partial view of a first support of the load bearing assembly of the present invention.
Figure 21:
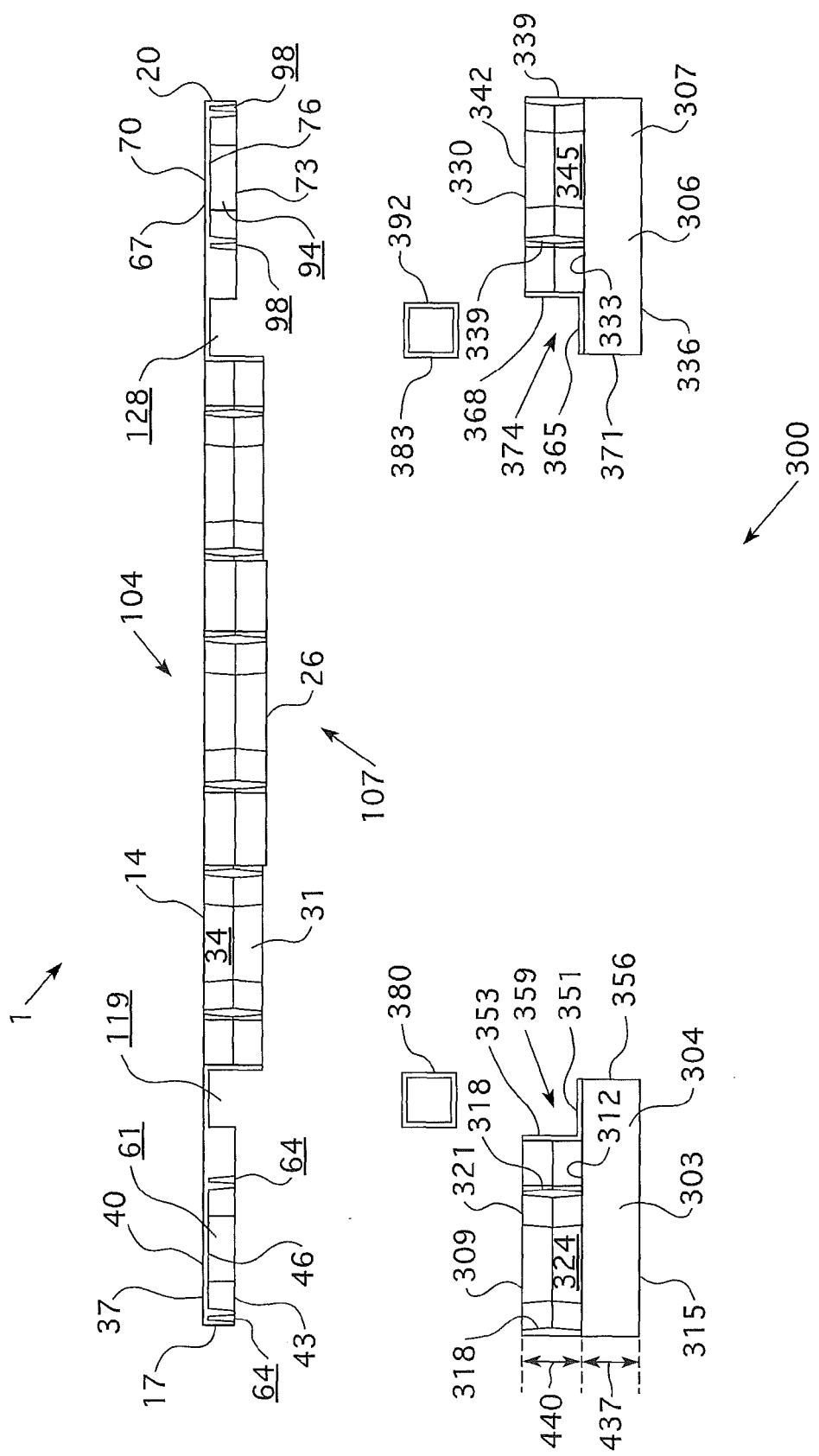
FIG. 21 is a representative exploded side elevational view of the load bearing assembly of FIG. 20, further including elongated supports.
Figure 22:
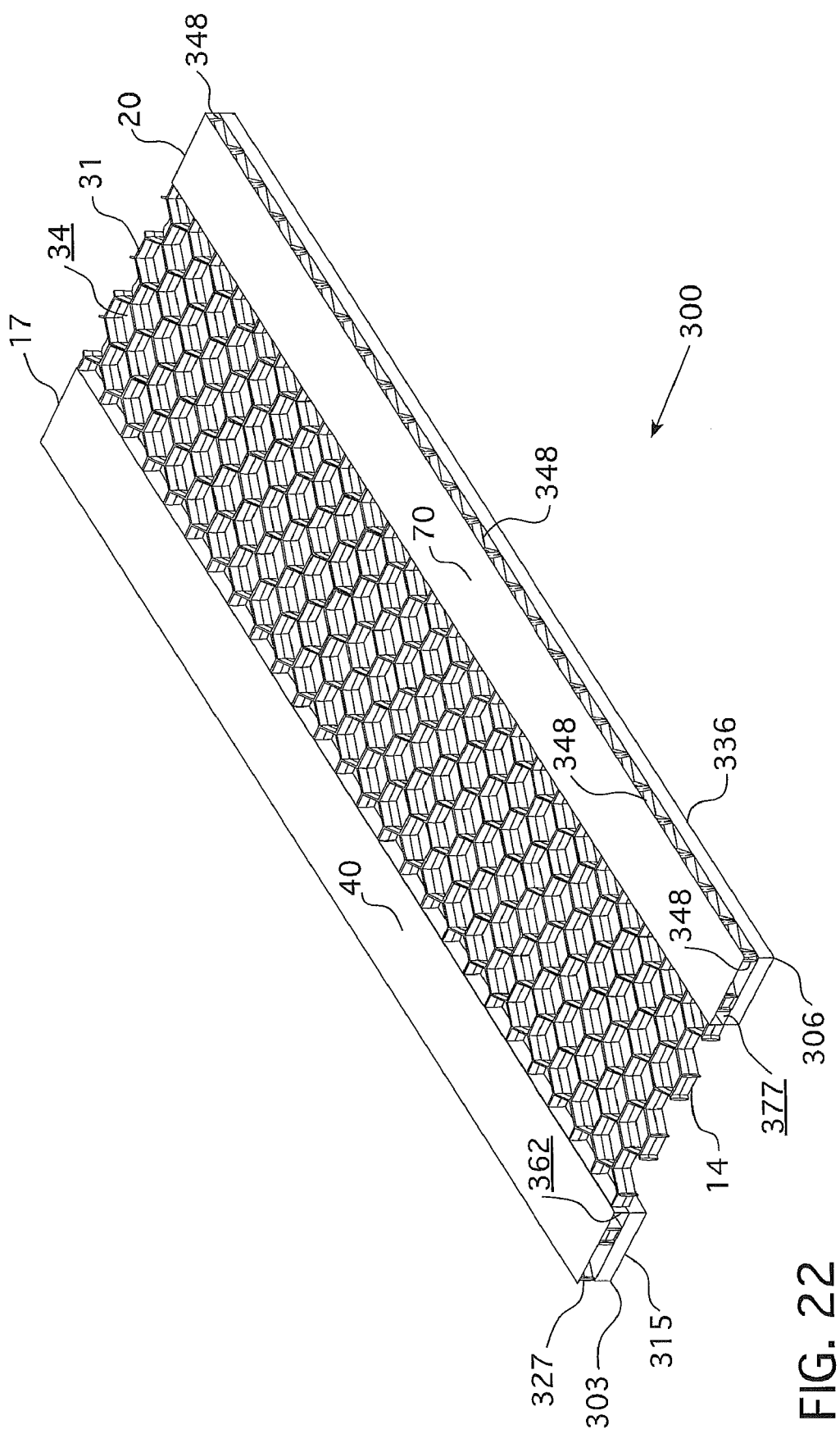
FIG. 22 is a representative non-exploded perspective view of the load bearing assembly of FIG. 20.
Figure 23:
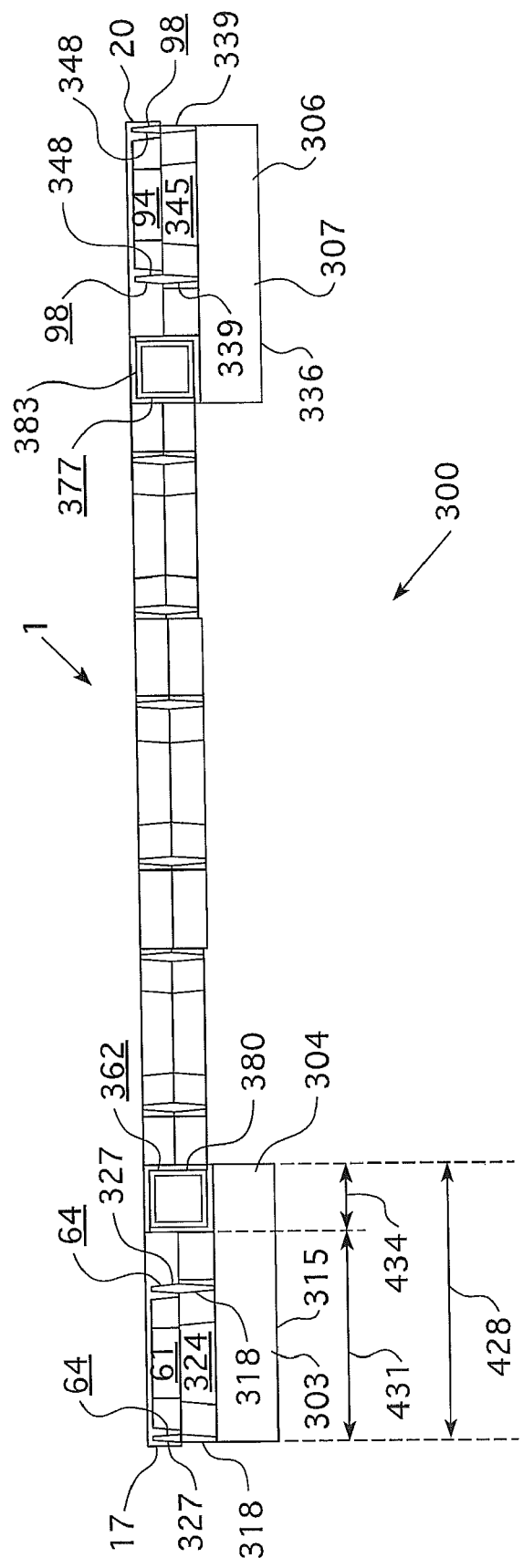
FIG. 23 is a representative non-exploded side elevational view of the load bearing assembly of FIG. 22, further including elongated supports.
Figure 24:
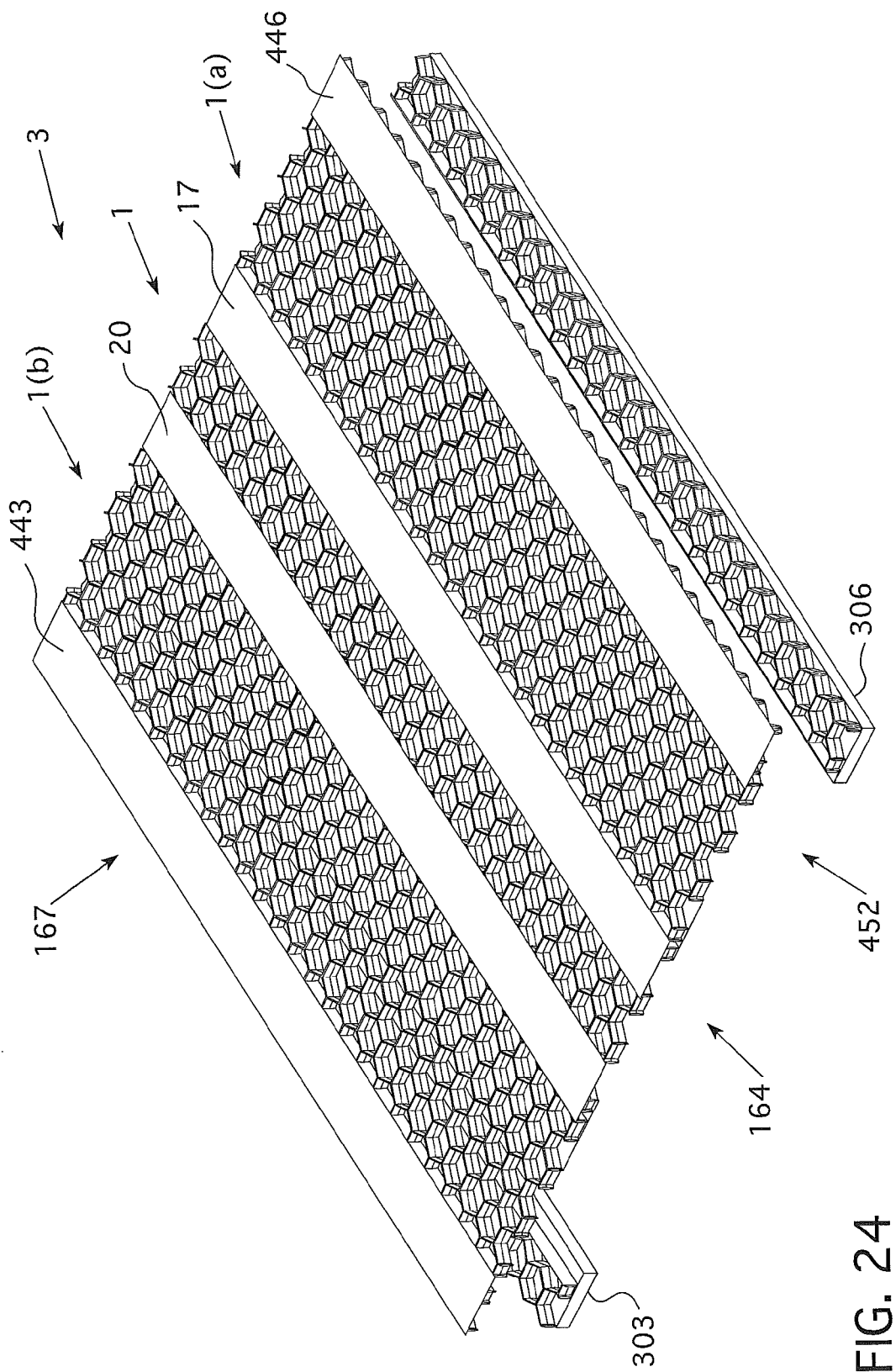
FIG. 24 is a representative exploded perspective view of a molded panel assembly of the load bearing assembly according to the present invention that includes a panel assembly comprising three molded and interlocked panels.

With reference to FIGS. 18 and 21, a portion 351 of upper surface 312 of first support 303 is free of extensions 318 (e.g., extension-free-portion 351). Extension-free-portion 351 may also be described as a first support ledge 359. First side 309 of first support 303 may optionally further include an internal edge 353 that is set back from first terminal edge 356 of the first support. Internal edge 353 and extension-free-portion 351 together define first support ledge 359. Extension-free-portion 351 (or first support ledge 359) of first support 303 and first elongated open channel 119 of molded panel 1 together form and define a first enclosed panel-support channel 362 (FIGS. 22 and 23).

With further reference to FIGS. 18 and 21, a portion 365 of upper surface 333 of second support 306 is free of extensions 339 (e.g., extension-free-portion 365). Extension-free-portion 365 may also be described as a second support ledge 374. First side 330 of second support 306 may optionally further include an internal edge 368 that is set back from first terminal edge 371 of the second support. Internal edge 368 and extension-free-portion 365 together define second support ledge 374. Extension-free-portion 365 (or second support ledge 374) of second support 306 and second elongated open channel 128 of molded panel 1 together form and define a second enclosed panel-support channel 377 (FIGS. 22 and 23).

First enclosed panel-support channel 362 and second enclosed panel-support channel 377 may each independently have a cross sectional shape selected from circles, ovals, polygons (e.g., triangles, squares, rectangles, pentagons, hexagons, heptagons, octagons, etc.), irregular shapes and combinations thereof. In an embodiment of the present invention, first enclosed panel-support channel 362 and second enclosed panel-support channel 377 each independently have a cross sectional polygonal shape, and in particular a cross sectional square shape as depicted in the drawings.

The load bearing assembly may further include an elongated support residing in the first enclosed panel-support channel and/or the second enclosed panel-support channel. With reference to FIGS. 21 and 23, first enclosed panel-support channel 362 has an elongated support 380 residing therein, and second enclosed panel-support channel 377 has an elongated support 383 residing therein. Elongated supports 380 and 383 may be solid, but are typically hollow for purposes of providing a combination of minimal weight gain coupled with improved dimensional stability of the load bearing assembly. The elongated supports typically have a cross sectional shape matching that of the enclosed panel-support channel in which it resides, such as circles, ovals, polygons (e.g., triangles, squares, rectangles, pentagons, hexagons, heptagons, octagons, etc.), irregular shapes and combinations thereof. As depicted in the drawings, elongated supports 380 and 383 each have a substantially cross sectional square shape. The elongated supports (e.g., 380 and 383) of the load bearing assembly may each be independently fabricated from any suitable rigid material, such as wood, metal, thermoplastic materials, thermoset plastic materials and combinations thereof. The thermoplastic and thermoset plastic materials may be selected from those known to the skilled artisan and/or those as discussed further herein.

Figure 28:
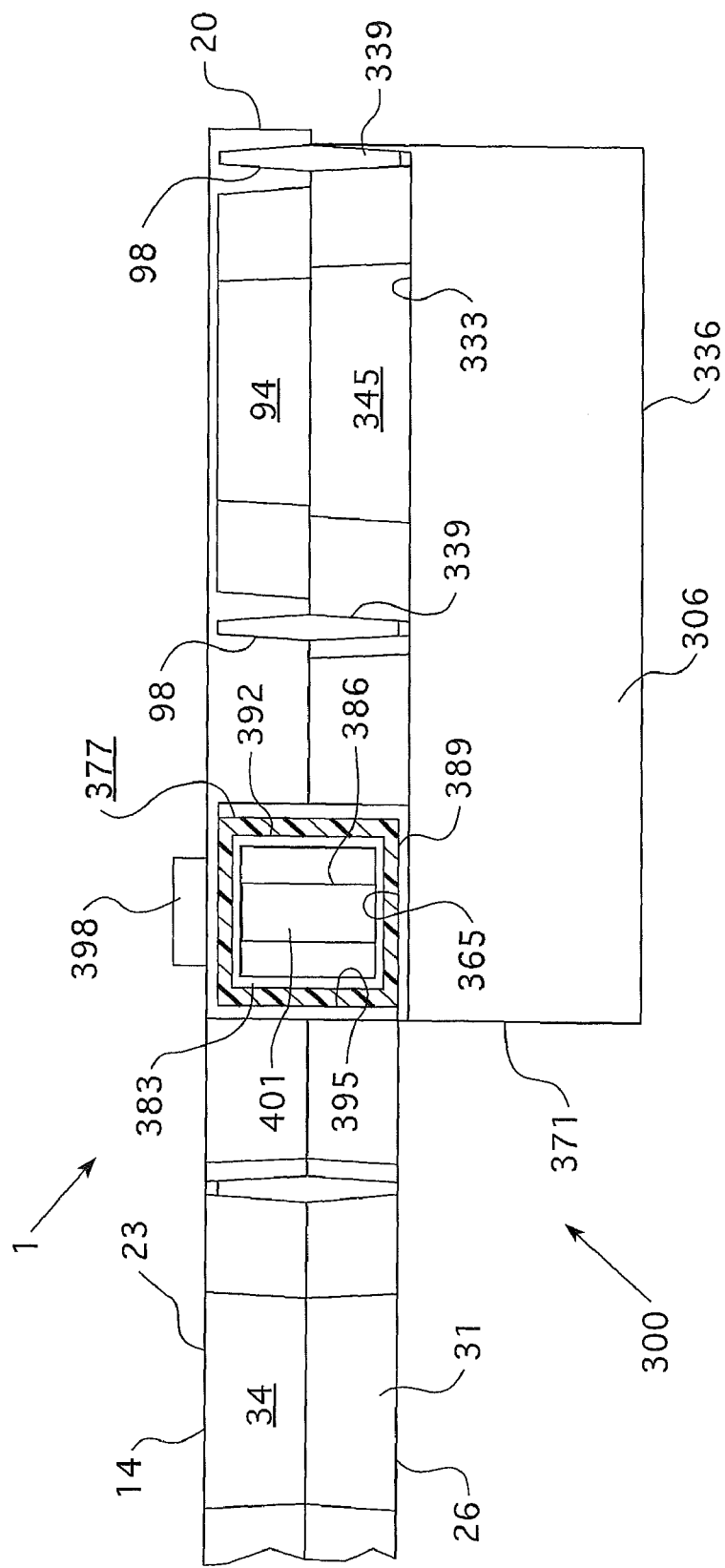
FIG. 28 is a representative side elevational view of a portion of a load bearing assembly according to the present invention focusing on the interlocking engagement of a support and a free external portion of a terminal molded panel, further including a fastener and an adhesive associated with the elongated support and enclosed panel-support channel.

The elongated supports may be retained within the enclosed panel-support channels by suitable means, such as, friction, snap connections, fasteners, adhesives, or any combination thereof. The presence of fastening means, such as snap connections, fasteners and/or adhesives serve to both retain the elongated support within the enclosed panel-support channel and further attach the molded panel and the first support and/or the second support together. If present, the adhesive is typically interposed between an external surface of the elongated support and an internal surface of the first enclosed panel-support channel and/or an internal surface of the second enclosed panel-support channel. For purposes of illustration and with reference to FIG. 28, elongated support 383 may be retained within second enclosed panel-support channel 377 by at least one fastener 386 extending through first panel 1, elongated support 383 and into second support 306. With further reference to FIG. 28, an adhesive 389 is interposed between at least a portion of the external surface 392 of elongated support 383 and at least a portion of an internal surface 395 of second enclosed panel-support channel 377. Fastener 386 includes a head 398 and a shaft 401, and may optionally further include a nut (not shown). The fastener (e.g., 386) may be selected from known fasteners, including, but not limited to: nut and bolt combinations; screws, such as sheet metal and/or wood screws; self-tapping screws; pins; rivets; and combinations thereof.

The adhesive (e.g., 389) may be selected from adhesives know to the skilled artisan. Adhesive 389 may be applied to a portion of the surfaces that define the elongated open channels and/or the extension-free-portion (or support ledge) of the support prior to interlocking the molded panel and support together and forming the enclosed panel-support channel(s). Alternatively or in addition thereto, the adhesive may be applied to the external surface of the elongated support before it is received within or the enclosed panel-support channel is formed there-around.

In an embodiment of the load bearing assembly of the present invention: (i) the first set of support interlocks (e.g., 327) further include an adhesive residing within the first external portion recesses (e.g., 64) of the first external portion (e.g., 17) of the molded panel (e.g., 1), and/or (ii) the second set of support interlocks (e.g., 348) further include an adhesive residing within the second external portion recesses (e.g., 98) of the second external portion (e.g., 20) of the molded panel (e.g., 1). For purposes of illustration, and with reference to FIG. 11, a portion of a sectional view of a first support interlock A (327) is depicted in which first external recess 64 includes an adhesive B that is interposed between first external recess 64 and extension C (e.g., 318) of first support 303

Figure 11:
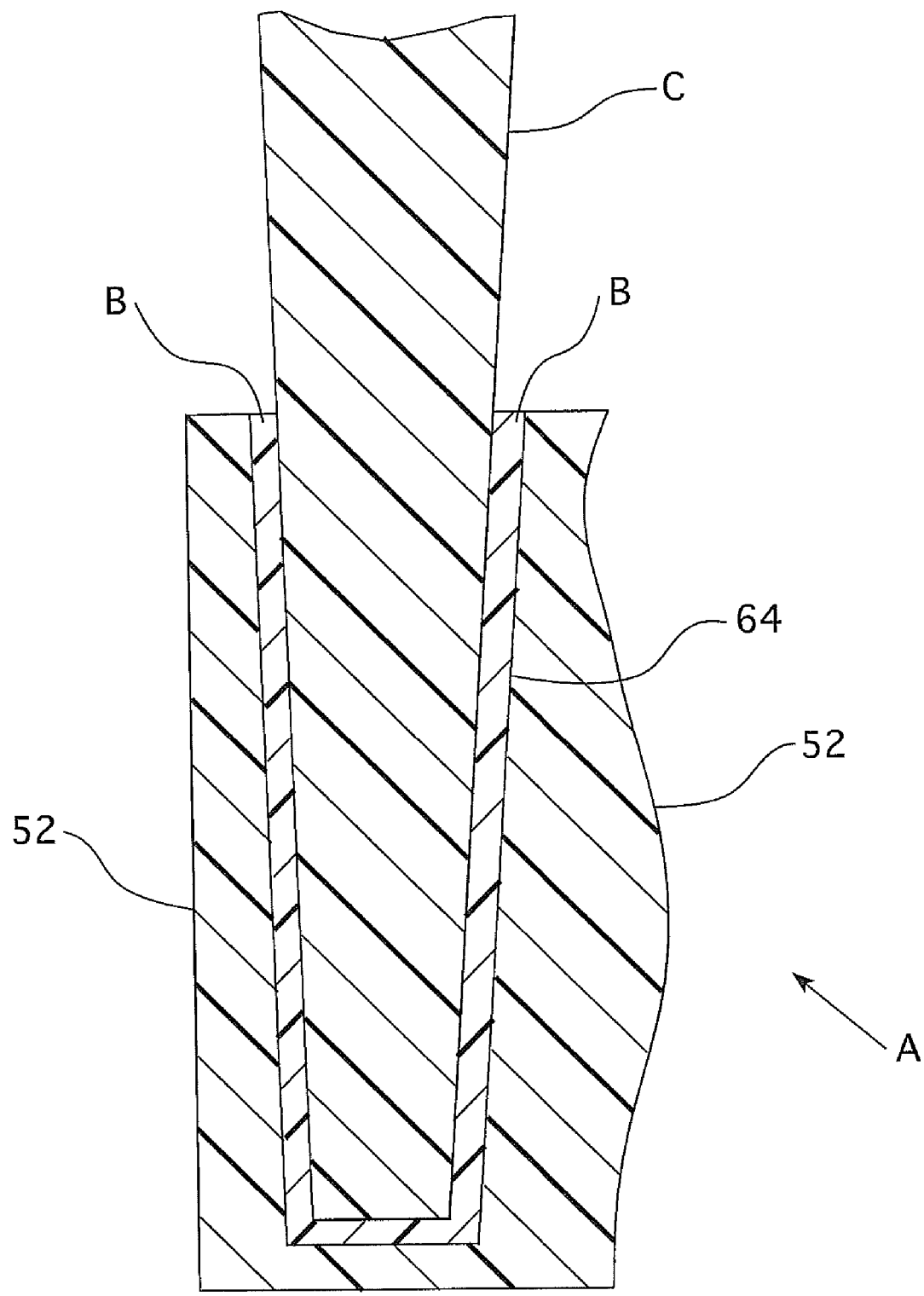
FIG. 11 is a generalized representative partial sectional view of a support interlock or a panel interlock that includes an adhesive.

(not shown in FIG. 11). Adhesive B serves to retain (e.g., fixedly) extension C (e.g., 318) of first support 303 within first external recess 64. Adhesive B may be selected from art-recognized adhesives. The depiction presented in FIG. 11 is equivalently applicable to the second set of support interlocks, in which case: (i) sidewalls 52 would be replaced with sidewalls 82; (ii) first external recess 64 would be replaced with second external portion recess 98; and (iii) extension C would be replaced with (or represent) extension 339 of second support 306.

The load bearing assembly (single panel and/or panel assembly embodiments) may further include a substructure, in which the substructure includes the first support and optionally the second support. The substructure typically provides further support for the first and second supports and accordingly the load bearing assembly of the present invention. The substructure may be a substantially unitary substructure (e.g., in the case of a sub-floor) or a substructure having a plurality of separate but connected elements (e.g., in the case of a substructure in the form of a lattice work or frame work). The first and second supports may each independently rest on, be attached to or be continuous with the substructure. Typically, if a substructure is present, the first and second supports are attached to the substructure, for example, by means of fasteners, snap connections and/or adhesives.

Figure 29:
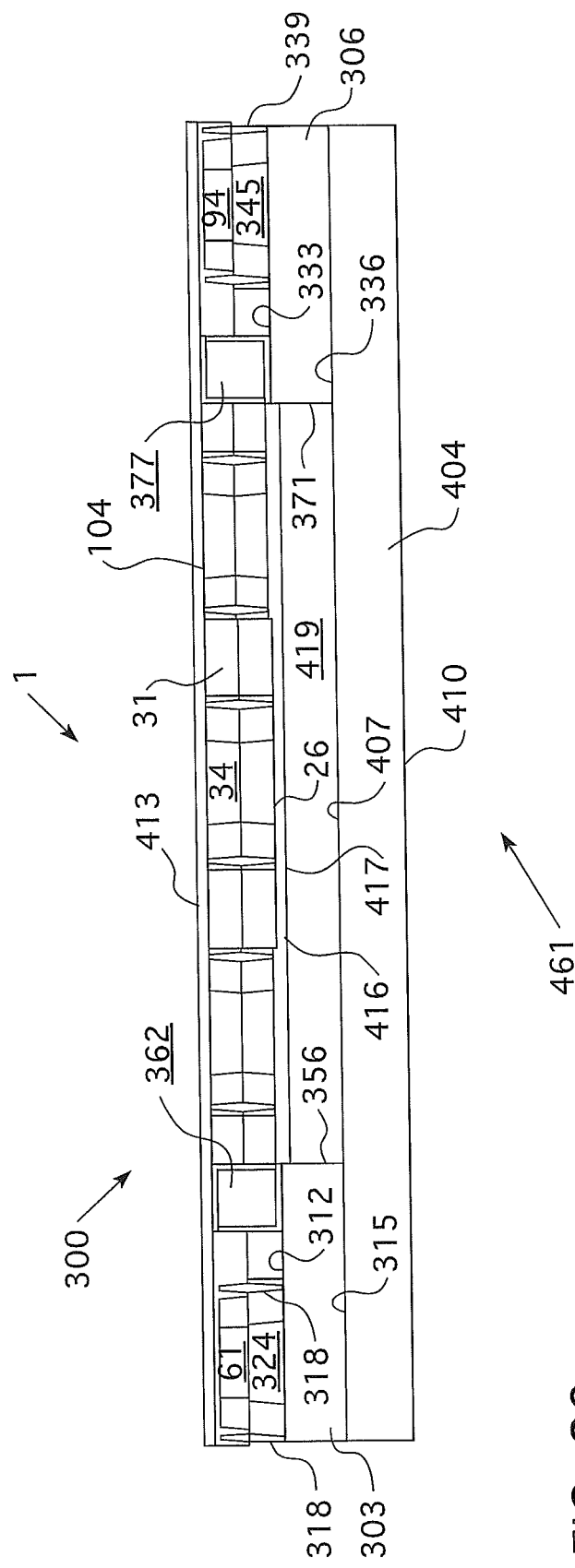
FIG. 29 is a representative side elevational view of the load bearing assembly of FIG. 22 further including first and second sheets attached to the first and second sides of the panel, and a substructure in conjunction with the first and second supports.

With reference to FIG. 29, load bearing assembly 461 (which includes load bearing assembly 300, which is based on a single panel embodiment) further includes a substructure 404 having a first (or upper) surface 407 and a second (or lower) surface 410. Second side 315 of first support 303 abuts a portion of first surface 407 of substructure 404, and second side 336 of second support 306 abuts a portion of first surface 407 of substructure 404. As depicted in FIG. 29, substructure 404 is a substantially unitary substructure, e.g., in the form of a sub-floor. In addition, as depicted in FIG. 29, first support 303 and second support 306 are not continuous with substructure 404. First support 303 and second support 306 may each independently be attached to substructure 404 by means of fasteners, snap connections and/or adhesives (none of which are shown in FIG. 29). Substructure 404, and more particularly second surface 410 of substructure 404, may rest on a further structure (not shown), such as earth (e.g., soil and/or rock), and/or a foundation (e.g., fabricated from wood, concrete and/or metal).

Figure 31:
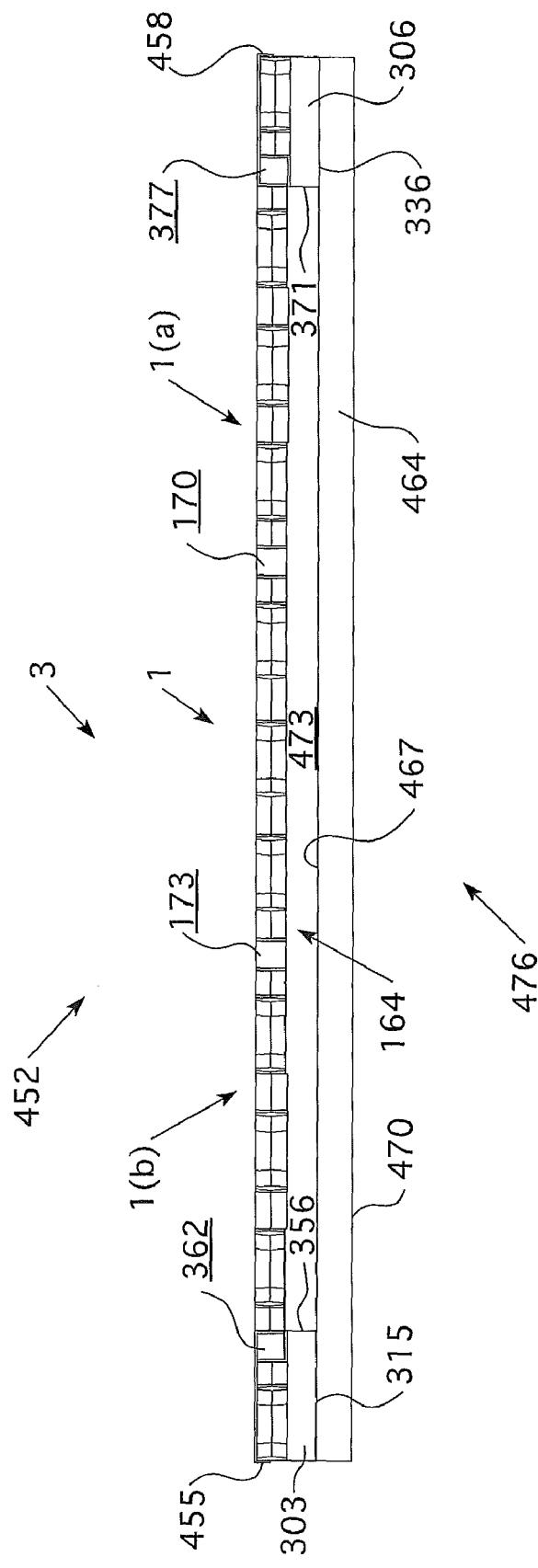
FIG. 31 is a representative side elevational view of the load bearing assembly of FIG. 27 further including a substructure in conjunction with the first and second supports.

With reference to FIG. 31, load bearing assembly 476 (which includes load bearing assembly 452, which is based on a panel assembly embodiment) further includes a substructure 464 having a first (or upper) surface 467 and a second (or lower) surface 470. Second side 315 of first support 303 abuts a portion of first surface 467 of substructure 464, and second side 336 of second support 306 abuts a portion of first surface 467 of substructure 464. As depicted in FIG. 31, substructure 464 is a substantially unitary substructure, e.g., in the form of a sub-floor. In addition, as depicted in FIG. 31, first support 303 and second support 306 are not continuous with substructure 464. First support 303 and second support 306 may each independently be attached to substructure 464 by means of fasteners, snap connections and/or adhesives (none of which are shown in FIG. 31). As with substructure 404 of FIG. 29, substructure 464, and more particularly second surface 470 of substructure 464, may rest on a further structure (not shown), such as earth (e.g., soil and/or rock), and/or a foundation (e.g., fabricated from wood, concrete and/or metal).

The load bearing assembly along with the substructure may together define an intermediate space positioned between a portion of the upper surface of the substructure and either the second side of the molded panel assembly or the second side of the center portion of the molded panel. The intermediate space may serve to provide ventilation (e.g., heating and/or cooling ventilation) beneath the molded panel of the load bearing assembly. Such ventilation may serve to heat, cool, and/or dry the load bearing assembly. For example, when the load bearing assembly forms part of a wall, passing heating ventilation through the intermediate space allows radiative heat to be emitted from the wall. With reference to FIG. 29, first terminal edge 356 of first support 303, first terminal edge 371 of second support 306, a portion of first surface 407 of substructure 410, and either lower surface 417 of second sheet 416 or second side 26 of center portion 14 of molded panel 1 together define intermediate space 419. With reference to FIG. 31, first terminal edge 356 of first support 303, first terminal edge 371 of second support 306, a portion of first surface 467 of substructure 464, and first side 164 of molded panel assembly 3 together define intermediate space 473. Alternatively, intermediate space 473 may be defined in part by the surface of a sheet (not shown in FIG. 31) applied to first side 164 of panel assembly 3 (e.g., first sheet 191 of FIG. 8).

The load bearing assembly may further include: (i) a first sheet fixedly attached to at least a portion of the first side of the molded panel; and/or (ii) a second sheet fixedly attached to at least a portion of the second side of the center portion of the molded panel. The first and second sheets may be present for purposes of providing the load bearing assembly with enhanced aesthetic and/or structural properties. With regard to enhanced aesthetic properties, the sheets may have indicia (e.g., alphanumeric characters and/or artistic depictions) thereon. With regard to enhanced structural properties, the sheets may: act as a physical barrier preventing materials (e.g., liquids and/or gasses) from passing through the load bearing assembly; and/or increase the stiffness of the load bearing assembly. The first and second sheets may each be independently fabricated from a rigid material selected from, for example, wood, metal, thermoset plastic material, thermoplastic material and combinations thereof.

With reference to FIG. 29, load bearing assembly 461 includes a first sheet 413 and a second sheet 416. First sheet 413 is fixedly attached to first side 104 of molded panel 1. Second sheet 416 is fixedly attached to second side 26 of center portion 14 of molded panel 1. First sheet 413 and second sheet 416 may each be independently fixedly attached to molded panel 1 by known means, including for example, fasteners and/or adhesives (not shown). In an embodiment, the apertures of the molded panel (e.g., the center apertures 34, first external portion apertures 61 and/or the second external portion apertures 94) may be at least partially filled with a polymeric foam material, in which case, the polymeric foam material may serve to fixedly attach the first and/or second sheets to the respective sides of the molded panel.

Figure 30:
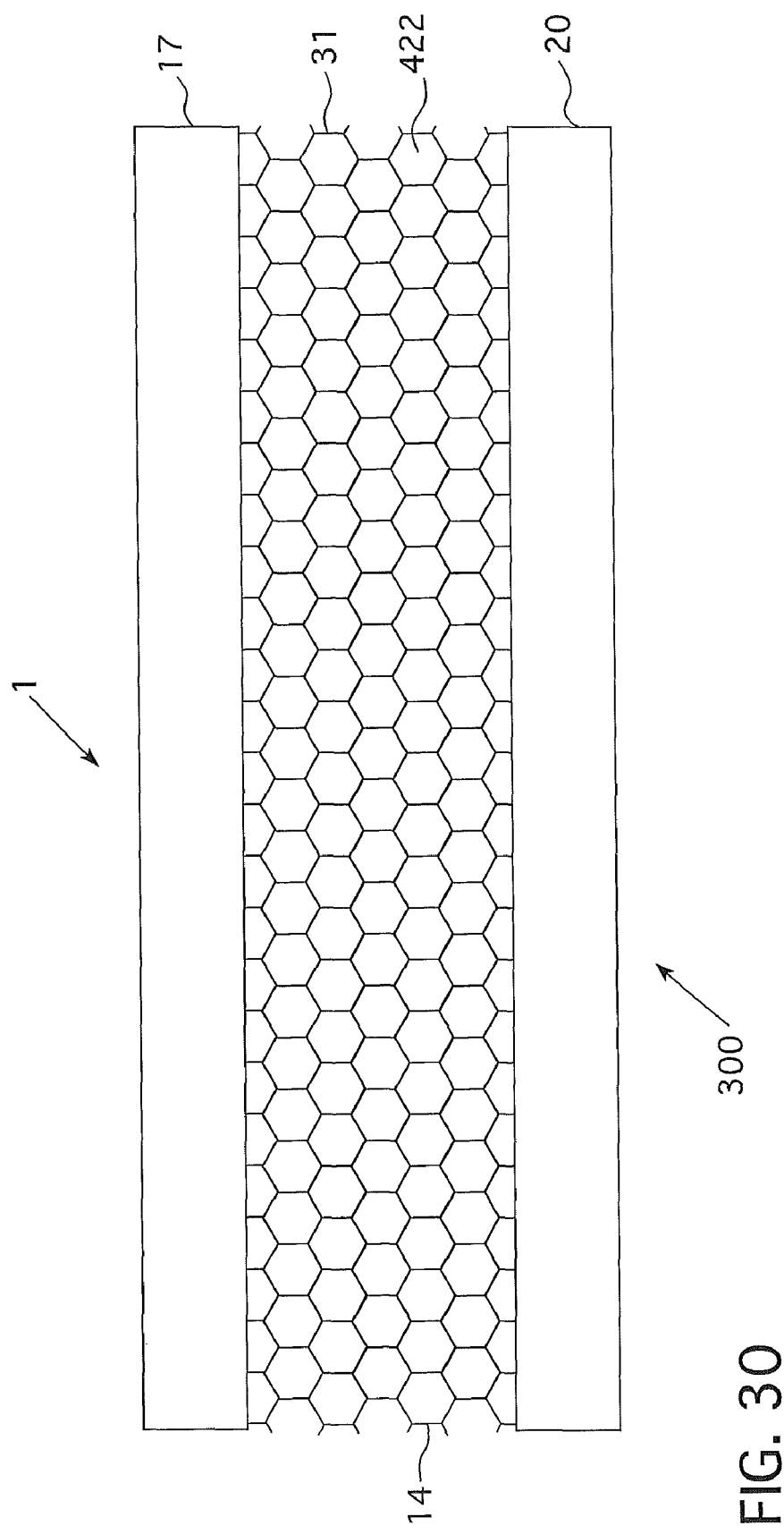
FIG. 30 is a representative top plan view of the load bearing assembly of FIG. 22, in which the center portion apertures of the molded panel include a polymeric foam material.

In addition to the first and/or second sheets, the various apertures (e.g., the center apertures 34, first external portion apertures 61 and/or the second external portion apertures 94) of the molded panel of the load bearing assembly may be at least partially filled with a polymeric foam material, in an embodiment of the present invention. The polymeric foam material may be included for reasons including, but not limited to: improving the dimensional stability (e.g., stiffness, flexibility and/or impact resistance) of the load bearing assembly; and/or providing the load bearing assembly with improved thermal insulation properties. With reference to FIG. 30, the center apertures 34 (defined by center reinforcing structures 31) of center section 14 of molded panel 1 of the load bearing assembly 300 include a polymeric foam material 422. Alternatively, or in addition to the apertures of the molded panel, the apertures (e.g., 324 and/or 345) of the first and/or second supports (e.g., 303 and/or 306) may be at least partially filled with a polymeric foam material. The polymeric foam material may be selected from art-recognized materials, such as polyurethane foams, polyolefin foams, and combinations thereof.

As discussed previously herein, the second side of the center portion of the molded panel of the load bearing assembly of the present invention extends beyond each of the second side of the first external portion and the second side of the second external portion. In an embodiment of the present invention, and more specifically with reference to FIG. 12, center portion 14 has a thickness 149, first external portion 17 has a thickness 152, and second external portion 20 has a thickness 155. Thickness 149 of center portion 14 is greater than thickness 152 of first external portion 17, and greater than thickness 155 of second external portion 20. As will be discussed in further detail herein with regard to the molded panel assembly of the present invention, the degree (or magnitude) to which the thickness of the center portion is greater than each of thicknesses of the first and second external portions is selected such that when two or more molded panels are joined together with external portions overlapping and interlocking with aligned center portions, the resulting panel assembly has substantially even first and second surfaces. In a particular embodiment of the present invention, thickness 149 of center portion 14 is twice (i.e., two times greater than) thickness 152 of first external portion 17, and twice (i.e., two times greater than) thickness 155 of second external portion 20. In addition, thickness 152 of first external portion 17 and thickness 155 of second external portion 20 are substantially equivalent.

Figure 4:
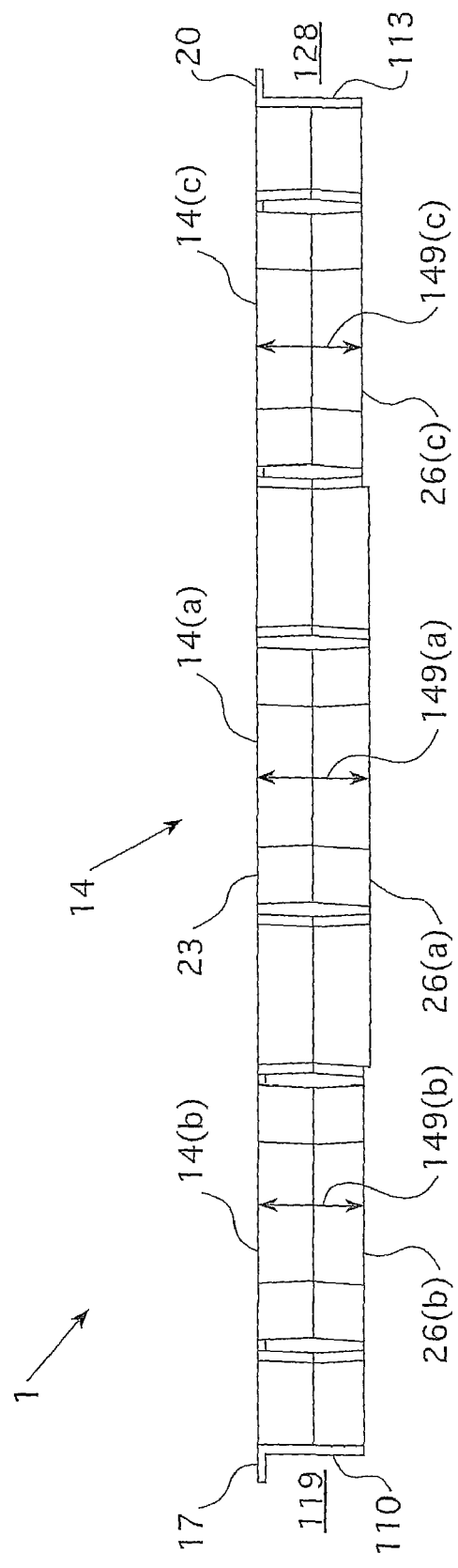
FIG. 4 is a magnified version of the side elevation view of FIG. 3 focusing on the center portion of the molded panel.

The center portion of the molded panel may have different thicknesses, such that a panel assembly according to the present invention has substantially even first and second sides, as will be discussed in further detail herein. With reference to FIG. 4, center portion 14 has a core center section 14(a) that is positioned between and continuous with a first center section 14(b) and a second center section 14(c). Each of core center section 14(a), first center section 14(b) and second center section 14(c) have center reinforcing structures 31 which define center portion apertures 34. Core center section 14(a) has a thickness 149(a) between first side 23 of center portion 14 and second side 26(a) of core center section 14(a). First center section 14(b) has a thickness 149(b) between first side 23 of center portion 14 and second side 26(b) of first center section 14(b). Second center section 14(c) has a thickness 149(c) between first side 23 of center portion 14 and second side 26(c) of second center section 14(c). Thickness 149(a) of core center section 14(a) is greater than: thickness 149(b) of first center section 14(b); and thickness 149(c) of second center section 14(c). Thickness 149(b) of first center section 14(b) and thickness 149(c) of second center section 14(c) are typically substantially equivalent.

The difference between thickness 149(a) of core center section 14(a) and thickness 149(b) of first center section 14(b) and thickness 149(c) of second center section 14(c) is typically selected such that when the second surface of the external portion of another molded panel according to the present invention overlaps and interlocks with first center section 14(b) or second center section 14(c), the first surface of the other molded panel forms a substantially even surface with second side 26(a) of core center section 14(a). Thickness 149(a) of core center section 14(a) may be 1 percent to 25 percent (e.g., 17%) greater than each of thickness 149(b) of first center section 14(b) and thickness 149(c) of second center section 14(c). Typically, thickness 149(a) is 2 percent to 15 percent greater than each of thickness 149(b) and thickness 149(c). More typically, thickness 149(a) is 3 percent to 10 percent greater than each of thickness 149(b) and thickness 149(c). In an embodiment of the present invention, thickness 149(a) of core center section 14(a) is 5 percent greater than each of thickness 149(b) of first center section 14(b) and thickness 149(c) of second center section 14(c).

Figure 12:
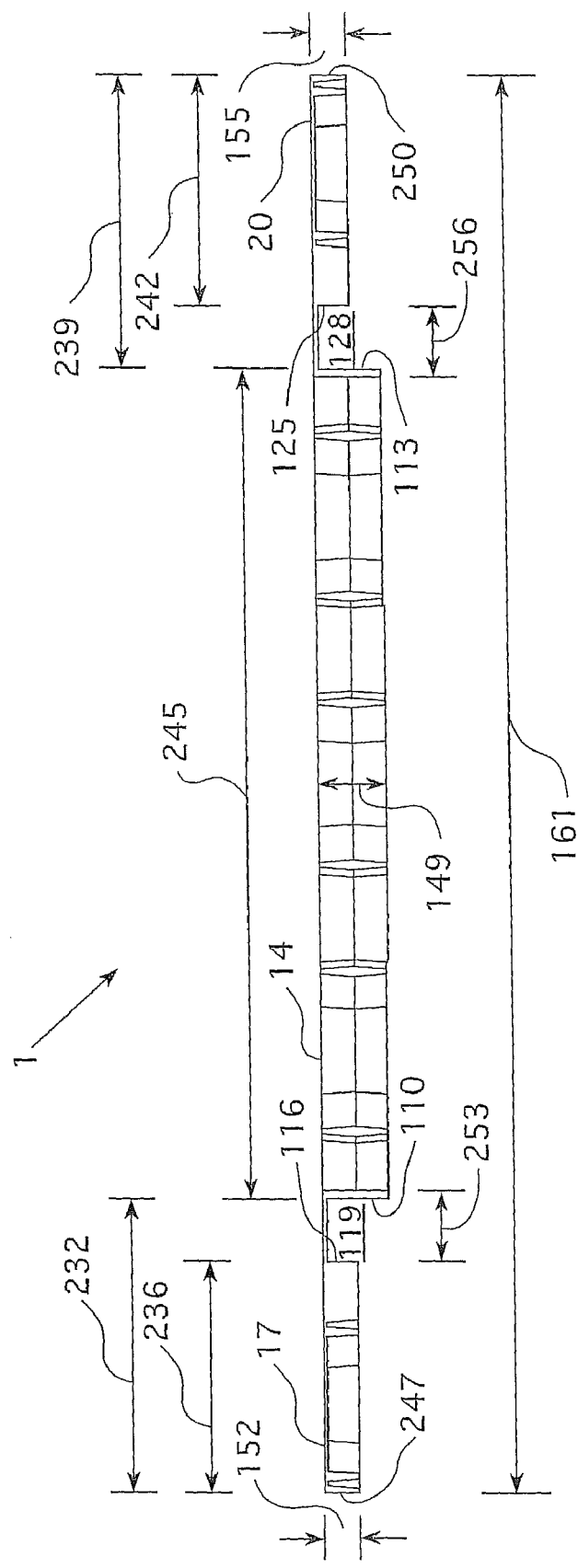
FIG. 12 is the same representative side elevation view of FIG. 3, which is provided for purposes of describing the dimensions of the various portions of the molded panel of the load bearing assembly of the present invention.

The thickness of any section of center portion 14 is greater than the thickness of each of first external portion 17 and second external portion 20 of the molded panel. For example, thickness 149(a) of core center section 14(a), thickness 149(b) of first center section 14(b) and thickness 149(c) of second center section 149(c) are each greater than each of thickness 152 of first external portion 17 and thickness 155 of second external portion 20 (FIG. 12).

Each molded panel of the load bearing assembly (or the panel assembly of load bearing assembly, as will be discussed further herein) may have a wide range of dimensions, which may depend, at least in part, on the particular application the load bearing assembly is used in. The width and length of the molded panel may be the same, in which case the panel is substantially square. Alternatively, the width and length of the molded panel may be different, in which case the panel is substantially rectangular. With further reference to FIG. 1, the molded panel typically has a length 158 of from 4 feet (1.2 meters) to 12 feet (3.7 meters), more typically from 5 feet (1.5 meters) to 11 feet (3.4 meters), and further typically from 6 feet (1.8 meters) to 10 feet (3.1 meters). With further reference to FIG. 1, the molded panel typically has a width 161 of from 2 feet (61 cm) to 7 feet (2.1 meters), more typically from 3 feet (91 cm) to 6 feet (1.8 meters), and further typically from 3 feet (91 cm) to 5 feet (1.5 meters). In an embodiment of the present invention, the molded panel has a length 158 of 8 feet (2.4 meters) and a width 161 of 4 feet (1.2 meters).

The ratio of the width to the length of the molded panel may vary widely. For example, the ratio of width (e.g., 161) to length (e.g., 158) of the molded panel may range from 1:1 to 1:6, or 1:2 to 1:4, or 1:2 to 1:3. In an embodiment of the present invention, the ratio of the width (e.g., 161) to the length (e.g., 158) of the molded panel is 1:2.

The first and second external portions of the molded panel may each be characterized as having a width that is inclusive or exclusive of the elongated open channel associated therewith. The width of an external portion that is exclusive of the associated elongated channel, typically includes only the reinforcing structures (e.g., first reinforcing structures 49 or second reinforcing structures 79).

With reference to FIG. 12, first external portion 17 of the molded panel typically has a width 232 (i.e., inclusive of elongated open channel 119) from first external portion outer edge 247 to center portion first exterior edge 110) of from 4 inches (10.2 cm) to 10 inches (25.4 cm), more typically from 5 inches (12.7 cm) to 9 inches (22.9 cm), and further typically from 6 (15.2 cm) to 8 inches (20.3 cm). First external portion 17 also typically has an exclusive width 236 (i.e., exclusive of elongated open channel 119; from outer edge 247 to internal edge 116 of the first external portion) of from 2 inches (5.1 cm) to 8 inches (20.3 cm), more typically from 3 inches (7.6 cm) to 7 inches (17.8 cm), and further typically from 4 inches (10.2 cm) to 6 inches (15.2 cm).

Second external portion 20 typically has a width 239 (i.e., inclusive of elongated open channel 128; from second external portion outer edge 250 to center portion second exterior edge 113) of from 4 inches (10.2 cm) to 10 inches (25.4 cm), more typically from 5 inches (12.7 cm) to 9 inches (22.9 cm), and further typically from 6 (15.2 cm) to 8 inches (20.3 cm).

Second external portion 20 also typically has an exclusive width 242 (i.e., exclusive of elongated open channel 128; from outer edge 250 to internal edge 125 of the second external portion) of from 2 inches (5.1 cm) to 8 inches (20.3 cm), more typically from 3 inches (7.6 cm) to 7 inches (17.8 cm), and further typically from 4 inches (10.2 cm) to 6 inches (15.2 cm).

In an embodiment of the present invention, first external portion 17 and second external portion 20 each have: a width (232, 239) of 7 inches (17.8 cm); and an exclusive width (236, 242) of 5 inches (12.7 cm).

Center portion 14 typically has a width 245 (from first exterior edge 110 to second exterior edge 113 of center portion 14) of from 1 foot, 2 inches (35 cm) to 4 feet, 0.5 inches (123 cm), more typically from 1 foot, 9 inches (53 cm) to 3 feet, 6 inches (106 cm), and further typically from 1 foot, 9 inches (53 cm) to 2 feet, 11 inches (89 cm). In an embodiment of the present invention, the center portion (14) of the molded panel has a width (245) of 2 feet, 4 inches (71 cm).

Each elongated open channel of the molded panel may be dimensioned to so as to: reduce the weight of the panel; dimensionally stiffen the panel; receive a separate article therein, such as an elongated support; receive a separate material therein, such as a polymeric foam; and combinations thereof. First elongated open channel 119 typically has a width 253 of from 1 inch (2.54 cm) to 4 inches (10.2 cm), more typically from 2 inches (5.1 cm) to 3.5 inches (8.9 cm), and further typically from 2 inches (5.1 cm) to 3 inches (7.6 cm). Second elongated open channel 128 typically has a width 256 of from 1 inch (2.54 cm) to 4 inches (10.16 cm), more typically from 2 inches (5.1 cm) to 3.5 inches (8.9 cm), and further typically from 2 inches (5.1 cm) to 3 inches (7.6 cm). In an embodiment of the present invention, each elongated open channel (e.g., 119 and/or 128) of the molded panel has a width (e.g., 253, 256) of 2.3 inches (5.8 cm).

With reference to FIG. 12, the center portion 14 of the molded panel of the present invention typically has a thickness 149 of from 0.5 inches (12.7 mm) to 6 inches (15.2 cm), more typically from 0.75 inches (19.1 mm) to 5 inches (12.7 cm), and further typically from 1 inch (2.54 cm) to 4 inches (10.2 cm). First external portion 17 typically has a thickness 152 of from 0.25 inches (6.4 mm) to 3 inches (76.2 mm), more typically from 0.5 inches (12.7 mm) to 2 inches (51 mm), and further typically from 0.75 inches (19.1 mm) to 1 inch (25.4 mm). Second external portion 20 typically has a thickness 155 of from 0.25 inches (6.4 mm) to 3 inches (76.2 mm), more typically from 0.5 inches (12.7 mm) to 2 inches (51 mm), and further typically from 0.75 inches (19.1 mm) to 1 inch (25.4 mm). In an embodiment of the present invention, center portion 14 has a thickness 149 of 1.75 inches (44.5 mm), first external portion 17 has a thickness 152 of ⅞ inch (22.3 mm), and second external portion 20 has a thickness 155 of ⅞ inch (22.3 mm).

As discussed previously herein, center portion 14 of the molded panel of the present invention may have sections having variable thickness, for example and with reference to FIG. 4, core center section 14(a), first center section 14(b) and second center section 14(c). With further reference to FIG. 4, core center section 14(a) of center portion 14, typically has a thickness 149(a) of from 0.5 inches (12.7 mm) to 6 inches (15.2 cm), more typically from 0.75 inches (19.1 mm) to 5 inches (12.7 cm), and further typically from 1 inch (25.4 mm) to 4 inches (10.2 cm). First center section 14(b) of center portion 14 typically has a thickness 149(b) of from 0.25 inches (6.4 mm) to 5.75 inches (14.6 cm), more typically from 0.5 inches (12.7 mm) to 4.75 inches (121 mm), and further typically from 0.75 inches (19.1 mm) to 3.75 inches (95 mm).

Second center section 14(c) of center portion 14 typically has a thickness 149(c) of from 0.25 inches (6.4 mm) to 5.75 inches (14.6 cm), more typically from 0.5 inches (12.7 mm) to 4.75 inches (121 mm), and further typically from 0.75 inches (19.1 mm) to 3.75 inches (95.3 mm). In an embodiment of the present invention, core center section 14(a) has a thickness 149(a) of 1.75 inches (44.5 mm), first center section 14(b) has a thickness 149(b) of 1.5 inches (38.1 mm), and second center section 14(c) has a thickness 149(c) of 1.5 inches (38.1 mm).

The center apertures (e.g., 34), first external portion apertures (e.g., 61) and the second external portion apertures (e.g., 94) of each molded panel may each independently have numerous shapes as discussed previously herein, and additionally a wide range of dimensions. The dimensions of the various portion apertures of the molded panel may be selected for reasons including, but not limited to: minimizing the weight of the panel, while at the same time maintaining a desirable degree of dimensional stability; and allowing for optimal interlock formation between center reinforcing structures (e.g., 31) and external portion recesses (e.g., 64) in the case of panel assemblies. In an embodiment of the present invention, the center apertures, first external portion apertures and the second external portion apertures are each hexagonal apertures, and, in particular, substantially symmetrical hexagonal apertures, independently having point to opposite point diameters typically from 0.5 inches (12.7 mm) to 8 inches (20.3 cm), more typically from 1 inch (25.4 mm) to 6 inches (15.2 cm), and further typically from 1.5 inches (38.1 mm) to 4 inches (10.2 cm). In an embodiment of the present invention, the center apertures, first external portion apertures and the second external portion apertures of each molded panel are each substantially symmetrical hexagonal apertures having a point to opposite point diameter of 2.5 inches (63.5 mm).

The first and second supports (e.g., 303 and 306) of the load bearing assembly may have a wide range of dimensions, which may depend, at least in part, on the particular application the load bearing assembly is used in. Typically, each support is longer than it is wide. The length of the first and second supports may be selected so as to be substantially equivalent to the length (e.g., 158) of the molded panel. The widths of the first and second supports are typically selected so as to be substantially equivalent to the width (e.g., 232 or 239) of the external portion (e.g., 17 or 20) of the molded panel with which it interlocks.

Figure 20:
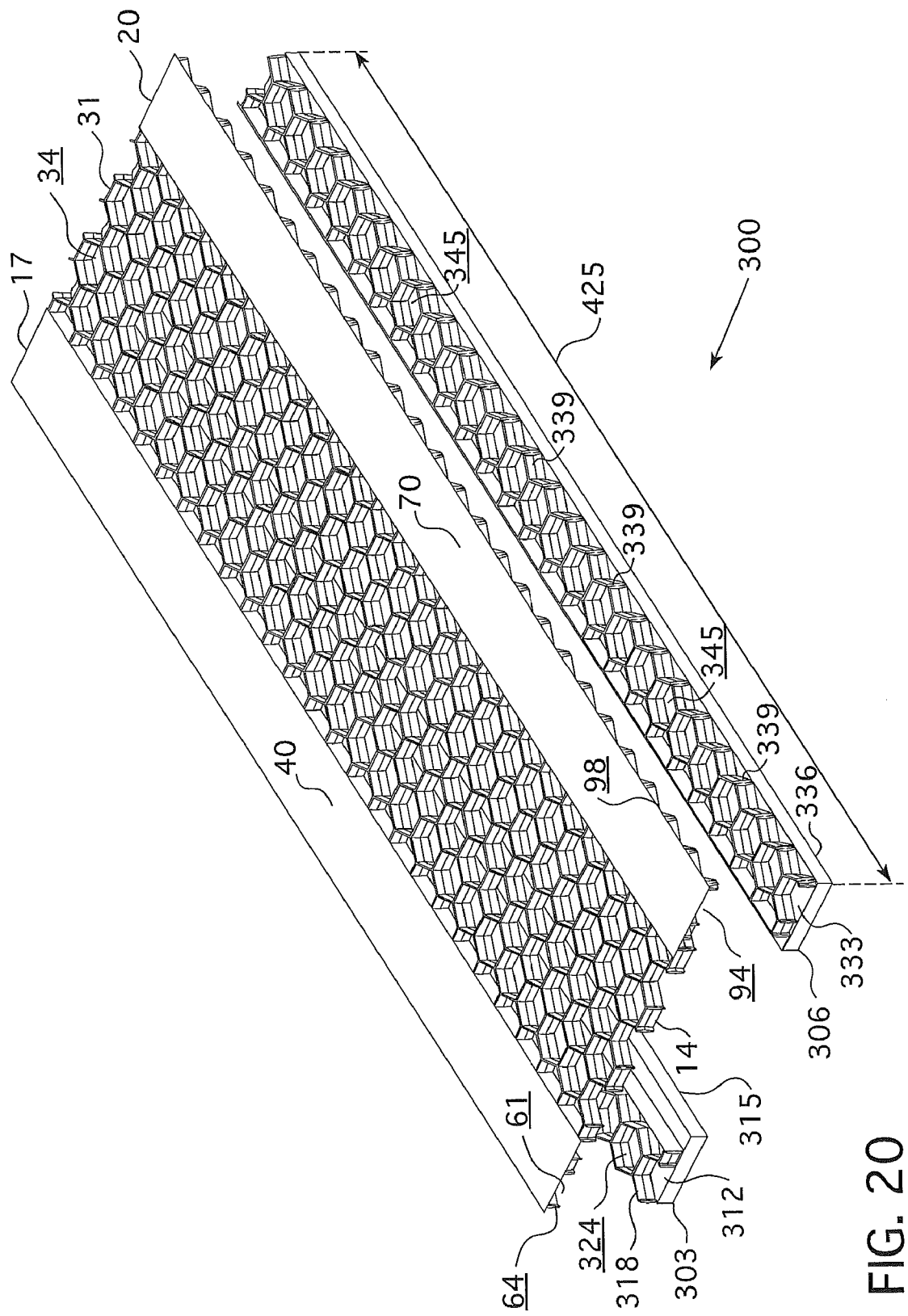
FIG. 20 is a representative exploded perspective view of a single panel embodiment of the load bearing assembly according to the present invention that includes a single molded panel.

With further reference to FIG. 20, the first support 303 and the second support 306 may each independently have a length, as represented by length 425 of second support 306, of from 4 feet (1.2 meters) to 12 feet (3.7 meters), more typically from 5 feet (1.5 meters) to 11 feet (3.4 meters), and further typically from 6 feet (1.8 meters) to 10 feet (3.1 meters). With reference to FIG. 23, the first support 303 and the second support 306 may each independently have a width (i.e., inclusive of the extension-free-portion, e.g., 351, or support ledge, e.g., 359) as represented by width 428 of first support 303, of from 4 inches (10.2 cm) to 10 inches (25.4 cm), more typically from 5 inches (12.7 cm) to 9 inches (22.9 cm), and further typically from 6 (15.2 cm) to 8 inches (20.3 cm). Dimension 428 may also be used to describe the width of the base portion of the supports (e.g., base 304 of first support 303). The first support and the second support may each independently have an exclusive width (i.e., exclusive of the extension-free-portion, e.g., 351, or support ledge, e.g., 359) as represented by width 431 of first support 303, of from 2 inches (5.1 cm) to 8 inches (20.3 cm), more typically from 3 inches (7.6 cm) to 7 inches (17.8 cm), and further typically from 4 inches (10.2 cm) to 6 inches (15.2 cm). In a particular embodiment, each support has: a length (e.g., 425) of 8 feet (2.4 m); a width (e.g., inclusive width 428) of 7 inches (17.8 cm); and an exclusive width (e.g., 431) of 5 inches (12.7 cm).

The extension-free-portion (or support ledge) of each support is typically selected so as to be substantially equivalent to the width of the elongated open channel of the external portion with which the support is aligned and interlockingly engaged. With further reference to FIG. 23, the extension-free-portion (or support ledge) of the first support 303 and the second support 306 may each independently have a width, as represented by width 434 of extension-free-portion 351 (first support ledge 359) of first support 306, of from 1 inch (2.54 cm) to 4 inches (10.2 cm), more typically from 2 inches (5.1 cm) to 3.5 inches (8.9 cm), and further typically from 2 inches (5.1 cm) to 3 inches (7.6 cm). In a particular embodiment, the extension-free-portion (or support ledge) of each support has a width (e.g., 434) of 2.3 inches (5.8 cm).

The base portion of each of the first and second supports may have any suitable height, provided that the base portion provides sufficient support for the extensions extending upwardly/outwardly from the upper surface of the base portion. Typically, the first and second supports each have a base portion (e.g., 304 or 307) having a height, as represented by height 437 of first support 303 (FIG. 21), of from 0.25 inches (6.4 mm) to 5.75 inches (14.6 cm), more typically from 0.5 inches (12.7 mm) to 4.75 inches (121 mm), and further typically from 0.75 inches (19.1 mm) to 3.75 inches (95 mm). In an embodiment, the height of the base portion of the first and second supports is in each case 1.5 inches (38.1 mm).

The base (e.g., 304, 307) of each support (e.g., 303, 306) is depicted in the drawings as being substantially in the form of a plank, in which the height (e.g., 437) thereof is less than the width (e.g., 428) thereof. The base of each support may have other configurations and may, for example, be in the form of a post, in which the height (e.g., 437) and width (e.g., 428) thereof have more equivalent dimensions. For example, the base of each support may each independently have a height (e.g., 437) of 4 inches (10.2 cm) or 6 inches (15.2 cm), and a width (e.g., 428) of 4 inches (10.2 cm) or 6 inches (15.2 cm), in which case the base would be in the form of a 4 inch by 4 inch (10.2 by 10.2 cm), a 6 inch by 6 inch (15.2 by 15.2 cm) or a 4 inch by 6 inch (10.2 by 15.2 cm) post.

The height of the extensions of the first and second supports have a height (extending up from the upper surface of the base portion) that is typically selected so as to provide sufficient interlocking receipt thereof within the external portion recesses (e.g., 64) of the external portion of the molded panel into which they are received. Generally, the extensions (e.g., 318 or 339) of the first and second supports each independently have a height, as represented by height 440 of first support 303 (FIG. 21), of from 0.25 inches (6.4 mm) to 5.75 inches (14.6 cm), more typically from 0.5 inches (12.7 mm) to 4.75 inches (121 mm), and further typically from 0.75 inches (19.1 mm) to 3.75 inches (95 mm). In an embodiment, the height of the extensions of the first and second supports is in each case 1.5 inches (38.1 mm).

In an embodiment of the present invention, the load bearing assembly, rather than including a single molded panel or plurality of single molded panels (e.g., as described previously with reference to FIGS. 20-23), includes at least one molded panel assembly. The molded panel assembly includes at least two molded panels that are connected together by overlapping and interlocking engagement of their external portions (e.g., 17) and their center portions (e.g., 14), as will be described in further detail. Each molded panel of the molded panel assembly is as described previously herein with regard to the molded panel (e.g., molded panel 1 of FIGS. 1-6 and 12). The molded panel assembly also includes a first terminal molded panel having a first free external portion, and a second terminal molded panel having a second free external portion. The first free external portion and the second free external portion are as described previously herein with regard to the respective first and second external portions (e.g., 17, 20) of the molded panel. The first and second free external portions of the molded panel assembly engage interlockingly and respectively with the first support and optionally the second support of the load bearing assembly.

The molded panel assembly of the load bearing assembly includes a plurality of molded panels, wherein each molded panel is as described previously herein (e.g., molded panel 1 of FIGS. 1-6 and 12). The plurality of molded panels of the panel assembly includes at last two molded panels (e.g., a first molded panel and a second molded panel), and may include as many panels as desired (e.g., 3, 4, 5, 6, 7, 8, 9 10, 15, 20, 25 or more panels).

Each molded panel of the panel assembly may independently have any suitable shape. For example, each molded panel may independently have a shape selected from, but not limited to, longitudinally arcuate shapes, transversely arcuate shapes, angular shapes (e.g., with the first external portion and/or the second external portion angled up and/or down relative to the center portion), and combinations thereof. Typically, for each panel of the panel assembly, the center portion, first external portion and second external portion together reside substantially within a common plane. With reference to FIG. 3, center portion 14, first external portion 17 and second external portion 20, of molded panel 1, together reside substantially within a common plane represented by lines 188.

With reference to FIGS. 7, 9, 10 and 17 there is depicted a molded panel assembly 3 according to the present invention that includes a first molded panel 1 and a second molded panel 1(a). Molded panel assembly 3 of FIG. 7 also includes a third molded panel 1(b), which will be discussed in further detail herein below. Molded panel assembly 3(a) of FIG. 17 includes only first molded panel 1 and second molded panel 1(a), and will be discussed in further detail herein with regard to the directions in which the first and second free external portions face.

The first 1, second 1(b) and third 1(c) molded panels of panel assembly 3 are substantially equivalent panels, having substantially equivalent dimensions and structural features. First panel 1 and second panel 1(a) are arranged such that: second side 43 of first external portion 17 of first panel 1 abuts and interlocks with a portion of second side 26 of center portion 14 of second panel 1(a); and at the same time second side 43 of first external portion 17 of second panel 1(a) abuts and interlocks with a portion of second side 26 of center portion 14 of first panel 1.

It should be noted that the scope of the present invention is also inclusive of alternate and equivalent arrangements of the panels, for example, in which: second side 43 of first external portion 17 of first panel 1 abuts and interlocks with a portion of second side 26 of center portion 14 of second panel 1(a); and at the same time second side 73 of second external portion 20 of second panel 1(a) abuts and interlocks with a portion of second side 26 of center portion 14 of first panel 1. For purposes of illustration, this alternate arrangement of the panels (which is not shown in the drawings) may be visualized with reference to FIG. 7, by rotating second panel 1(a) 180°, such that second side 73 of second external portion 20 of second panel 1(a) resides beneath a portion of second side 26 of center portion 14 of first panel 1.

Figure 7:
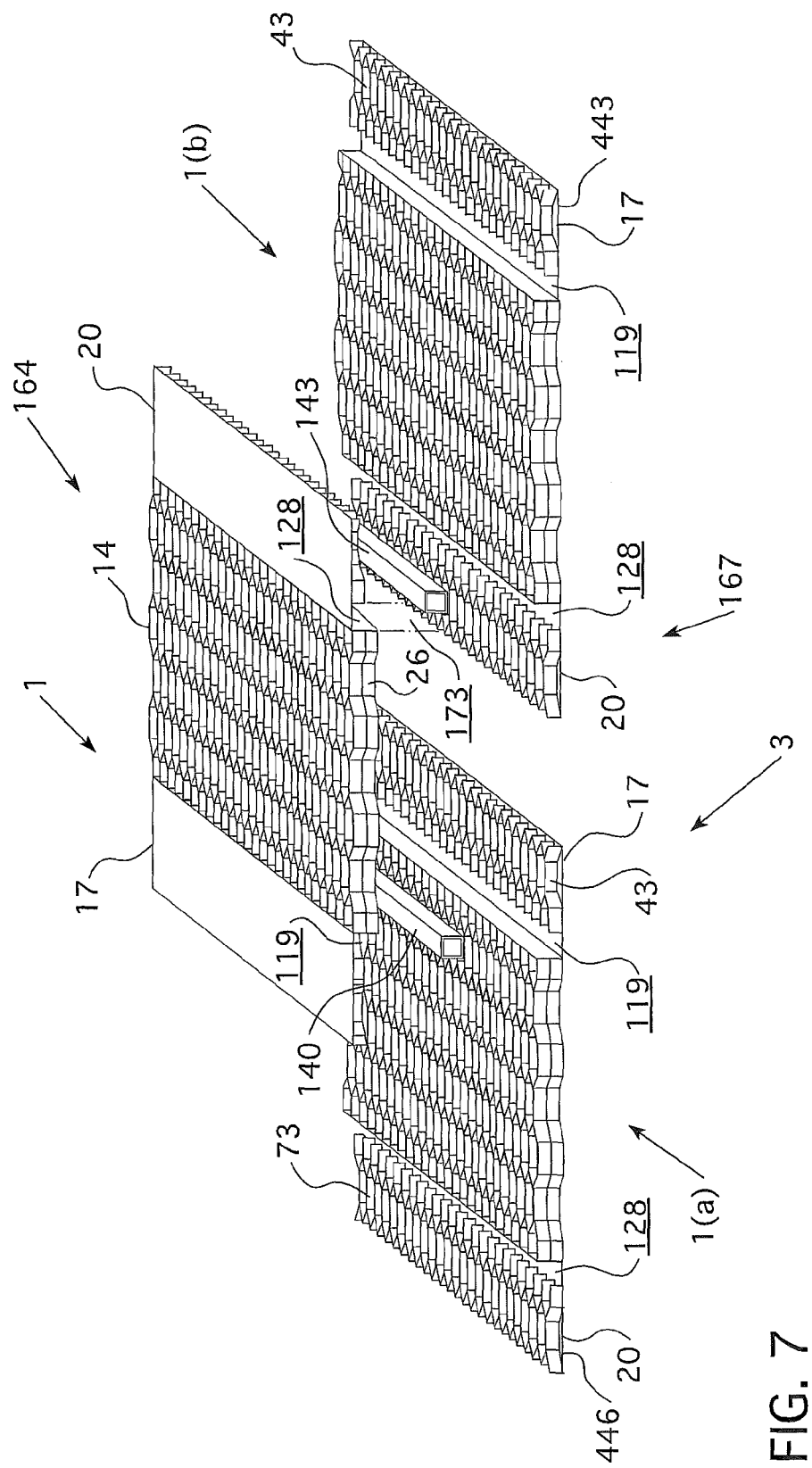
FIG. 7 is a representative exploded perspective view of a molded panel assembly of the load bearing assembly according to the present invention that includes three molded panels.
Figure 9:
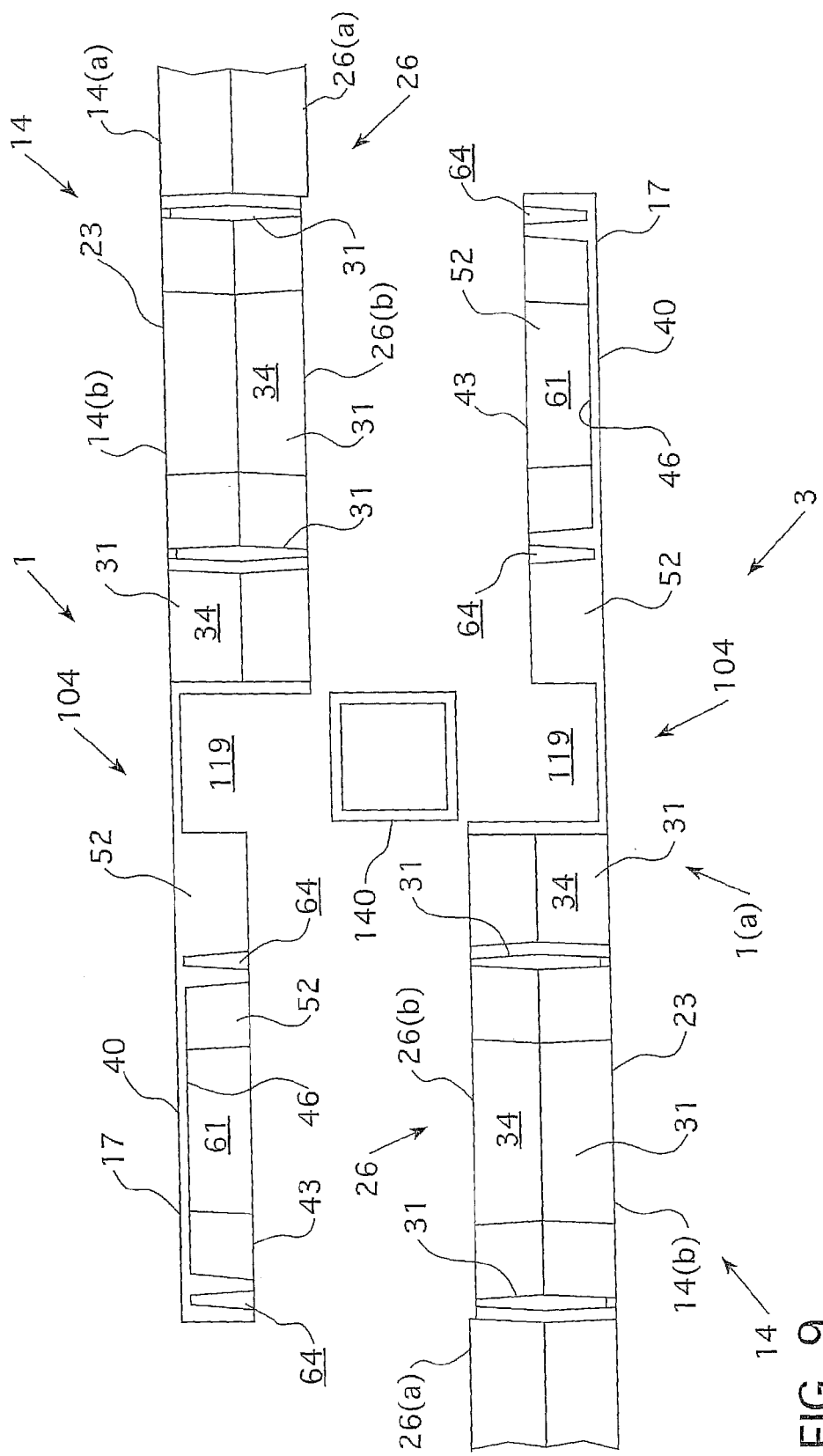
FIG. 9 is a representative exploded side elevation view of a portion of the molded panel assembly of FIG. 7.
Figure 10:
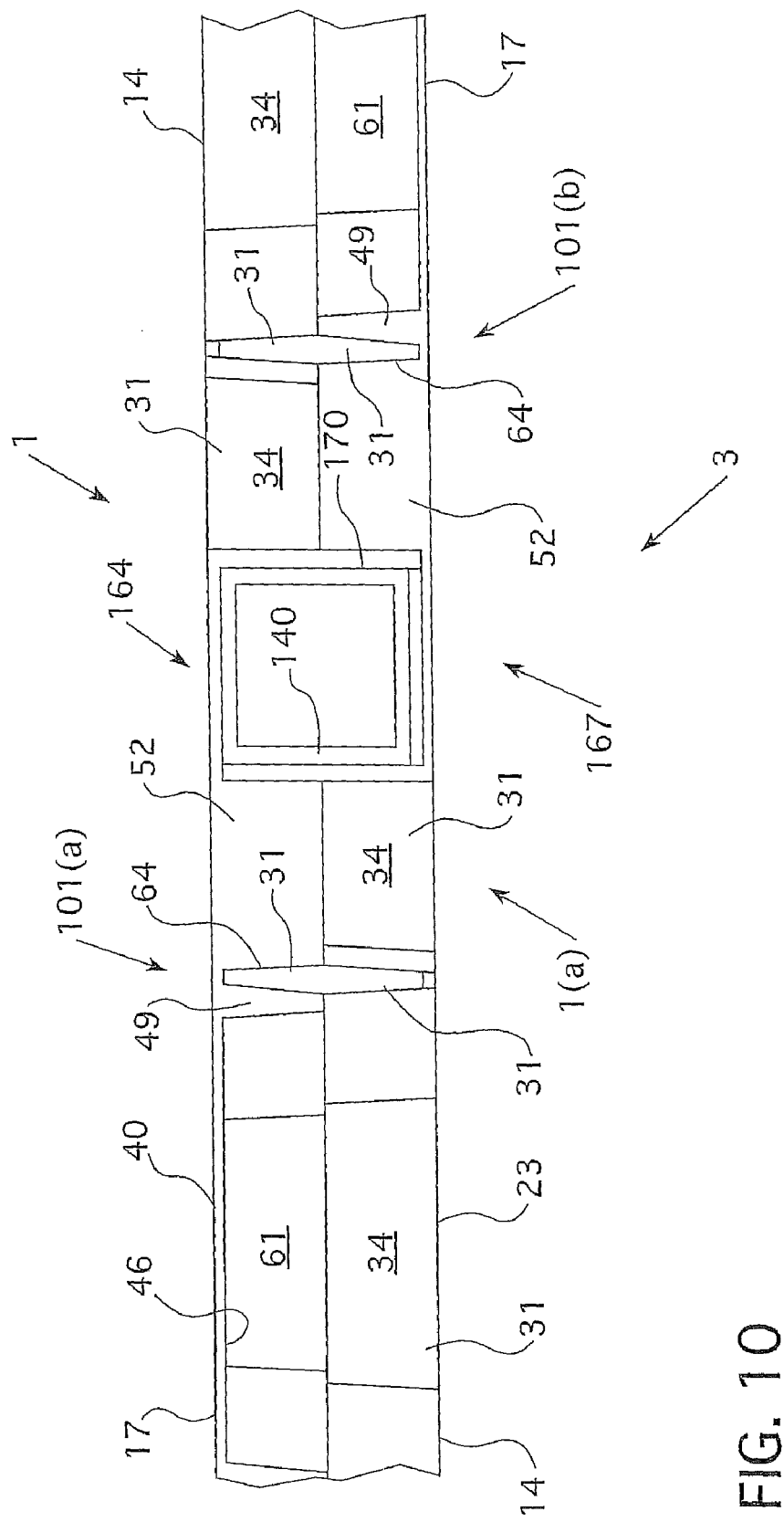
FIG. 10 is a representative non-exploded side elevation view of a portion of the molded panel assembly of FIG. 9.

More particularly, and with further reference to FIGS. 7, 9 and 10, as described above, in the panel assembly of the present invention, second side 43 of first external portion 17 of first panel 1 abuts a portion of second side 26 of center portion 14 of second panel 1(a). When so arranged, some of center plastic reinforcing structures 31 of second panel 1(a) are fittingly received within at least some of first external portion recesses 64 (e.g., first external portion hexagonal slotted recesses 64) of first panel 1, which together form a first set of panel interlocks 101(a). The first set of panel interlocks 101(a) serve to attach first panel 1 and second panel 1(a) together. See, for example, FIG. 10.

Substantially concurrent with the formation of the first set of panel interlocks 101(a), a second set of panel interlocks 101(b) are formed. In particular, second side 43 of first external portion 17 of second panel 1(a) abuts a portion of second side 26 of center portion 14 of first panel 1. When so arranged, some of center plastic reinforcing structures 31 of first panel 1 are fittingly received within at least some of first external portion recesses 64 of second panel 1(a), which together form the second set of panel interlocks 101(b). In addition to the first set of panel interlocks 101(a), the second set of panel interlocks 101(b) also serve to attach first panel 1 and second panel 1(a) together. See, for example, FIG. 10.

When the first and second panels of the panel assembly are so interlocked, as described above, the first side 104 (FIG. 3) of first panel 1 is substantially even with the second side 26 of center portion 14 of second panel 1(a). In addition to being substantially even, first side 104 of first panel 1 and second side 26 of center portion 14 of second panel 1(a) together define at least a portion of a first side 164 of molded panel assembly 3.

Interlocking of the first and second panels of the panel assembly also results in first side 104 of second panel 1(a) being substantially even with second side 26 of center portion 14 of first panel 1. First side 104 of second panel 1(a) and second side 26 of center portion 14 of first panel 1, in addition to being substantially even, also together define at least a portion of a second side 167 of molded panel assembly 3.

The first side 164 and the second side 167 of the molded panel assembly of the present invention are each typically structurally indistinguishable one from the other. If, for example, the first and second panels are fabricated from plastics having different colors, then the first and second sides of the panel assembly may be visually distinguishable from each other.

In an embodiment of the present invention, the center section 14 of the molded panel has three sections having variable thicknesses: core center section 14(a); first center section 14(b); and second center section 14(c), as discussed previously herein with reference to FIG. 4. With further reference to FIG. 9, first panel 1 and second panel 1(a) are more particularly arranged such that: second side 43 of first external portion 17 of first panel 1 abuts and interlocks with second side 26(b) of first center section 14(b) of second panel 1(a); and at the same time, second side 43 of first external portion 17 of second panel 1(a) abuts and interlocks with second side 26(b) of first center section 14(b) of first panel 1. The thickness 149(b) (FIG. 4) of first center section 14(b) being less than thickness 149(a) of core center section 14(a) of first panel 1, and the difference there-between are selected such that first side 104 of second panel 1(a) is substantially even (or flush) with second side 26(a) of core center section 14(a) of first panel 1, and thus together form at least a portion of second side 167 of panel assembly 3, when the panels are in interlocking engagement. Equivalently, the thickness 149(b) (FIG. 4) of first center section 14(b) being less than thickness 149(a) of core center section 14(a) of second panel 1(a), and the difference there-between are selected such that first side 104 of first panel 1 is substantially even (or flush) with second side 26(a) of core center section 14(a) of second panel 1(a), and thus together form at least a portion of first side 164 of panel assembly 3, when the panels are in interlocking engagement.

The second side 107 of each panel of the panel assembly may further include a first elongated open channel 119 having an elongated open end 122, and a second elongated open channel 128 having an elongated open end 131. See, for example, FIG. 3. As discussed previously herein for each panel, first elongated open channel 119 is defined by first exterior edge 110 of center section 14 and internal edge 116 (and a portion of second surface 46) of first external section 17 of each panel. Second elongated open channel 128 is defined, for each panel, by second exterior edge 113 of center section 14 and internal edge 125 (and a portion of second surface 76) of second external portion 20. First elongated open channel 119 has an elongated open end 122, and second elongated open channel 128 has an elongated open end 131, on second side 107 of the molded panel.

With the first and second panels of panel assembly 3 interlocked, first open channel 119 of first panel 1 and first open channel 119 of second panel 1(a) are aligned and together define a first enclosed panel-panel channel 170 (FIG. 10). Enclosed panel-panel channels may be present within the panel assembly of the present invention for reasons including, but not limited to: weight reduction; dimensional stiffening of the panel assembly; receipt of a separate article (such as an elongated support) therein; receipt of a separate material therein, such as a polymeric foam; and combinations thereof.

The first and second elongated open channels of each panel of the panel assembly are as described previously herein and may each independently have cross-sectional shapes selected from arcuate shapes, polygonal shapes, irregular shapes and combinations thereof. Accordingly, each enclosed panel-panel channel of the panel assembly of the present invention may have a cross-sectional shape selected from circles, ovals (e.g., ellipsoidal shapes), polygonal shapes (e.g., triangles, rectangles, squares, pentagons, hexagons, heptagons, octagons, etc.), irregular shapes and combinations thereof.

As discussed previously herein, the exterior edges of the center section and the internal edges of the external portion of the panel that define the first and second elongated open channels may each independently have a surface selected from substantially closed and continuous surfaces (e.g., internal edges center portion edges 110 and 113) and/or a surface having a plurality of apertures (e.g., exterior edge 116 of first external portion 17, and exterior edge 125 of second external portion 20). Correspondingly, the enclosed panel-panel channel(s) of the panel assembly (e.g., first enclosed panel-panel channel 170), may be defined by edges (e.g., internal center portion edges 110 and 113, and the associated external portion exterior edges 116 and 125) having surfaces selected from substantially closed and continuous surfaces and/or a surface having a plurality of apertures.

The molded panel assembly of the present invention may further include an elongated support residing within at least one enclosed channel (e.g., first enclosed panel-panel channel 170). Elongated supports may be included in the enclosed panel-panel channel(s) of the panel assembly of the present invention for reasons including, but not limited to: providing dimensional stability (e.g., stiffness, flexibility and/or impact resistance) to the panel assembly; and/or providing a further means of attaching the panel assembly, and correspondingly the load bearing assembly, to a separate structure, such as the frame of a dwelling or container. For example, fasteners, such as screws and/or bolts, may be passed through the elongated support into a separate structure to which the panel assembly is to be attached.

With reference to FIGS. 7, 9 and 10, panel assembly 3 includes an elongated support 140 that resides within first enclosed panel-panel channel 170. Panel assembly 3 also includes a further elongated support 143, which resides within the second enclosed panel-panel channel 173 formed by alignment of second elongated open channel 128 of first panel 1 and second elongated open channel 128 of third panel 1(c). In FIG. 7, second enclosed panel-panel channel 173 is depicted in exploded view, and is represented by the vertical dashed lines running between the second elongated open channels (128) of first panel 1 and third panel 1(c).

An elongated support (e.g., 140) may be retained within an enclosed panel-panel channel (e.g., enclosed panel-panel channel 170) of the panel assembly of the present invention by means including, but not limited to, fasteners (not shown), adhesives (not shown), snap fittings (not shown) and combinations thereof. In the case of snap fittings, the sidewalls of the elongated support may have depressions (not shown) for snap fitting receipt of: the truncated ends 134 of sidewalls 52 of first reinforcing structures 49; and/or the truncated ends 137 of sidewalls 82 of second reinforcing structures 79, depending on which enclosed panel-panel channel (170 or 173) the elongated support resides within.

Each elongated support of the panel assembly may have a cross-sectional shape selected from circles, ovals, polygonal shapes, irregular shapes and combinations thereof. In an embodiment of the present invention, each elongated support of the panel assembly is an elongated recta-tubular support having a hollow interior, as depicted, for example in FIG. 7. At least one terminal end of the elongated support may be open, for example, as depicted in FIGS. 7 and 9. Alternatively, at least one terminal end of the elongated support may be closed (not shown), for example, by a plug or cap, and/or material from which the elongated support itself is fabricated.

The elongated support of the panel assembly may be fabricated from known suitable self-supporting materials, such as thermoplastic materials, thermoset materials, metals (e.g., ferrous based metals, titanium and aluminum), cellulose based materials, such as wood, ceramics, glass, and combinations thereof. Plastic materials, such as, thermoplastic and/or thermoset materials, from which the elongated support of the panel assembly may be fabricated, may be selected from those classes and examples as described further herein with regard to the molded panel itself, and may optionally further include reinforcing materials (e.g., glass fibers) including those classes and examples, and in amounts as described further herein.

Figure 13:
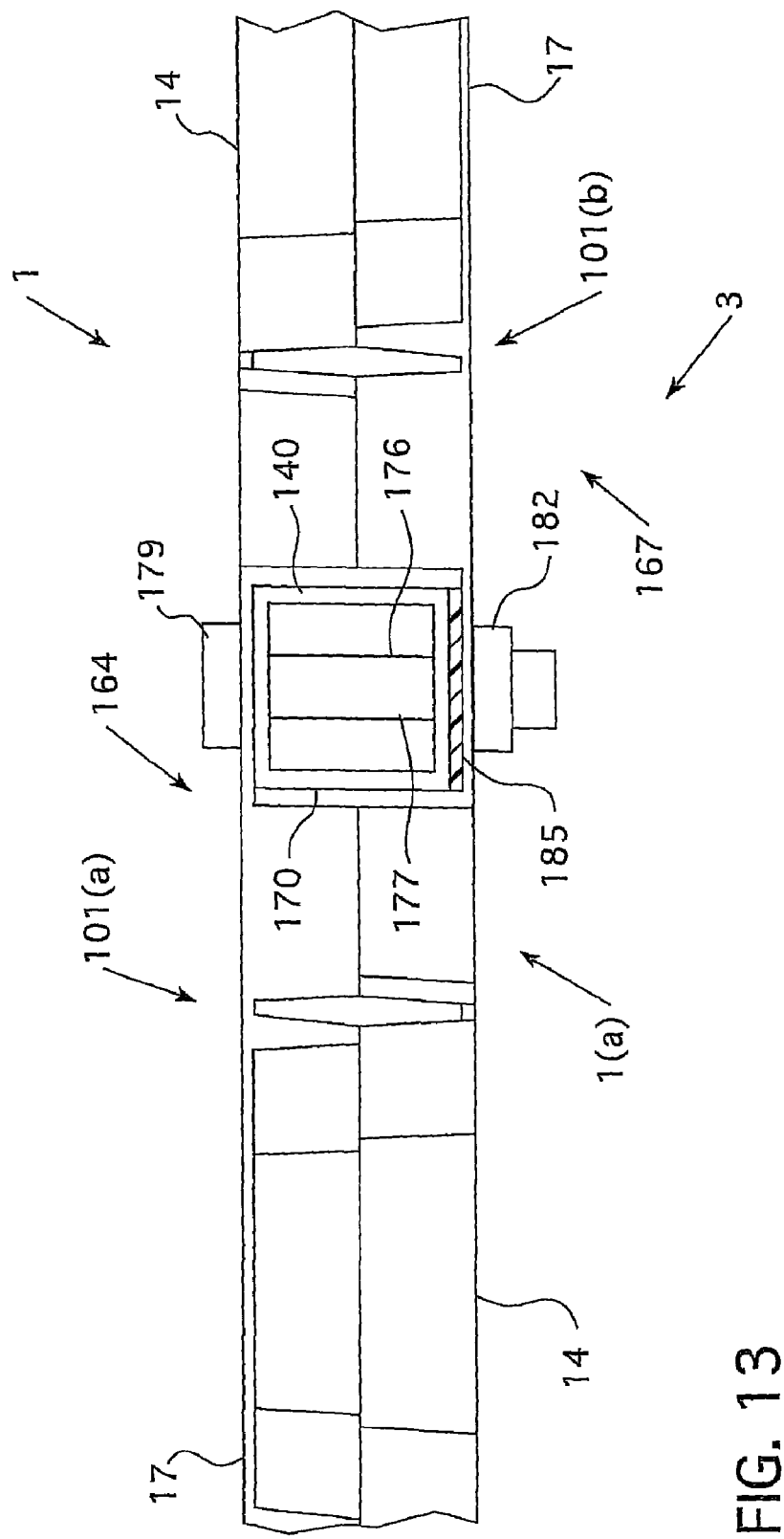
FIG. 13 is a representative side elevation view of the molded panel assembly of FIG. 10 further including a fastener and an adhesive associated with the elongated support and enclosed panel-panel channel.

In addition to the interlocks formed between the overlapping external and center portions of opposing panels, the panels (e.g., the first and second panels) of the molded panel assembly may be further attached together by means of at least one elongated support residing within at least one enclosed channel. For example, and with reference to FIG. 13, first panel 1 and second panel 1(a) of panel assembly 3 may be further attached together by: (i) at least one fastener 176 extending through first panel 1, elongated support 140 and second panel 1(a); and/or (ii) an adhesive 185 interposed between at least a portion of the external surface of elongated support 140 and at least a portion of an internal surface of enclosed panel-panel channel 170. Fastener 176 is in the form of a bolt having a head 179, a shaft 177 and a nut 182. Head 179 engages abuttingly with first (and exterior) surface 164 of panel assembly 3, shaft 177 passes through the plastic material of first panel 1, elongated support 140, optionally adhesive 185 (if present) and the plastic material of second panel 1(a). Shaft 176 engages threadingly (threads not shown) with nut 182, which engages abuttingly with second (and exterior) surface 167 of panel assembly 3. While depicted in FIG. 13 as a nut and bolt combination, the fastener may be selected from known fasteners, including, but not limited to: screws, such as sheet metal and/or wood screws; self-tapping screws; pins; rivets; and combinations thereof.

Adhesive 185 may be selected from adhesives known to the skilled artisan. Adhesive 185 may be applied to a portion of the surfaces that define the elongated open channels that are then aligned to define the enclosed channel. Alternatively, the adhesive may be applied to at least a portion of the interior surfaces of the enclosed channel after its formation (e.g., after the first and second panels have been interlockingly attached to each other). Further alternatively, the adhesive may be applied to at least a portion of the exterior surfaces of the elongated support prior to it being received within an elongated open channel and/or an enclosed channel.

Alternatively or in addition to an elongated support residing within an enclosed channel, the panel assembly may further include a further elongated support residing in at least one elongated open channel, for example: the second elongated open channel of the first panel; and/or the second elongated open channel of the second panel. A further elongated support residing in an elongated open channel may be present for purposes including, but not limited to: providing dimensional stability to the panel assembly; and/or providing a further means of attaching together the panel assembly and a first (303) or second (306) support (e.g., by means of fasteners passing through the elongated support). With reference to FIG. 7, second elongated support 143 is depicted as being associated with second enclosed panel-panel channel 173. When, however, third panel 1(c) is not present, then second elongated support 143 is a further elongated support that may reside within second elongated open channel 128 of first panel 1. The description of further elongated support 143 residing within second elongated open channel 128 of first panel 1, is substantially equivalently applicable to further elongated support 143 residing within second elongated open channel 128 of second panel 1(a) (not shown).

In an embodiment of the panel assembly, at least some of the panel interlocks, formed by receipt of center reinforcing structures within external portion recesses, further include an adhesive residing within at least some of the interlocks. In particular, the first set of panel interlocks may further include an adhesive residing within at least some of the first external portion recesses of the first panel. Alternatively, or in addition thereto, the second set of panel interlocks may further include an adhesive residing within at least some of the first external portion recesses of the second panel. For purposes of illustration, and with reference to FIG. 11, a portion of a sectional view of an interlock A (which for purposes of the present description is a panel interlock) is depicted in which first external recess 64 includes an adhesive B that is interposed between first external recess 64 and structure C (e.g., center reinforcing structure 31). Adhesive B serves to retain (e.g., fixedly) center reinforcing structure C/31 within first external recess 64. Adhesive B may be selected from art-recognized adhesives. The depiction presented in FIG. 11 is equivalently applicable to the second set of panel interlocks, in which case: (i) sidewalls 52 would be replaced with sidewalls 82; and (ii) first external recess 64 would be replaced with second external recess 98.

Figure 14:
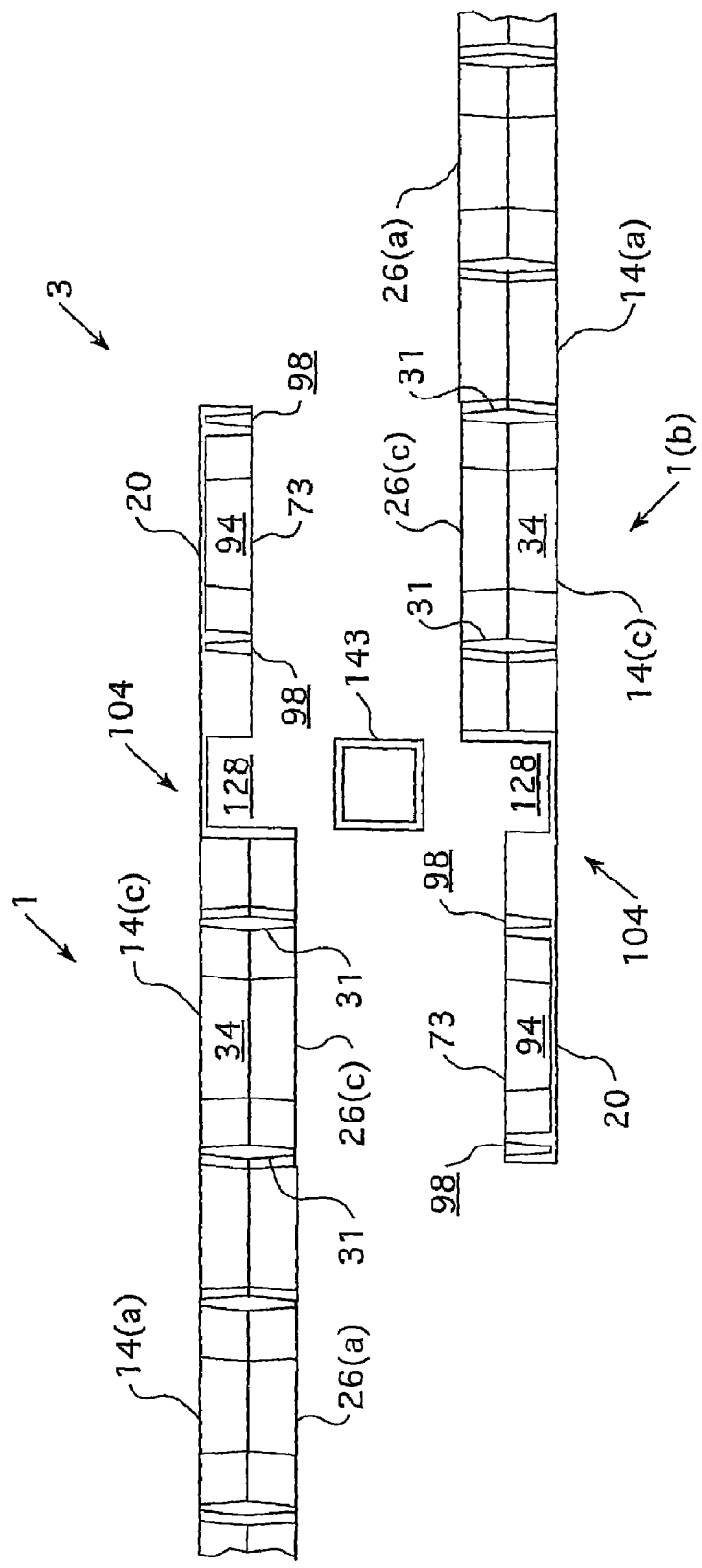
FIG. 14 is a representative exploded side elevation view of the panel assembly of FIG. 7 showing a portion of the first panel and third panel of the assembly.
Figure 15:
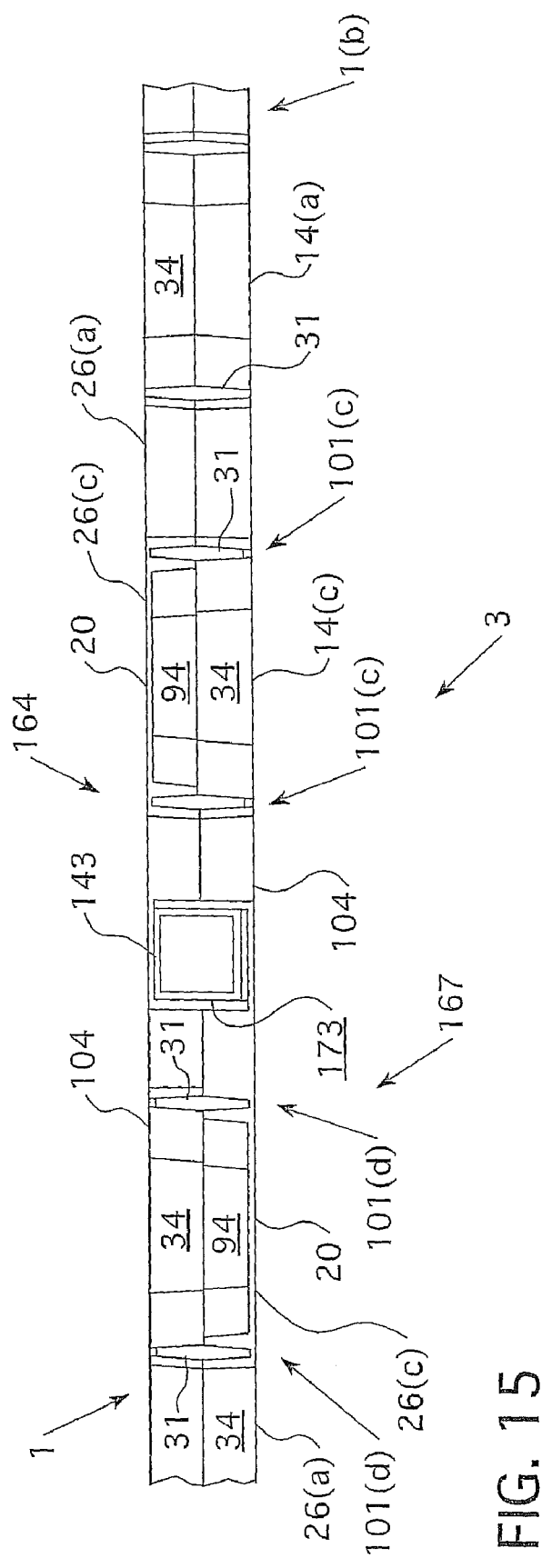
FIG. 15 is a representative non-exploded side elevation view of the panel assembly of FIGS. 7 and 14 showing a portion of the first panel and third panel of the assembly.

The plurality of panels of the molded panel assembly may further include a third molded panel. The third molded panel is as described previously herein with regard to the molded panel of the present invention, and the first and second molded panels of the panel assembly. With reference to FIGS. 7, 14 and 15, first panel 1 and third panel 1(b) are arranged such that: second side 73 of second external portion 20 of first panel 1 abuts and interlocks with a portion of second side 26 of center portion 14 of third panel 1(b); and at the same time second side 73 of second external portion 20 of third panel 1(b) abuts and interlocks with a portion of second side 26 of center portion 14 of first panel 1.

As discussed previously herein with regard to first panel 1 and second panel 1(a), the scope of the present invention is also inclusive of alternate and equivalent arrangements of the molded panels, for example, in which: second side 73 of second external portion 20 of first panel 1 abuts and interlocks with a portion of second side 26 of center portion 14 of third panel 1(b); and at the same time second side 43 of first external portion 17 of third panel 1(b) abuts and interlocks with a portion of second side 26 of center portion 14 of first panel 1. For purposes of illustration, this alternate arrangement of the panels (which is not shown in the drawings) may be visualized with reference to FIG. 7, by rotating third panel 1(b) 180°, such that first side 43 of first external portion 17 of third panel 1(b) resides beneath a portion second side 26 of center portion 14 of first panel 1.

More particularly, and with further reference to FIGS. 7, 14 and 15, in the panel assembly, second side 73 of second external portion 20 of first panel 1 abuts a portion of second side 26 of center portion 14 of third panel 1(b). When so arranged, some of center plastic reinforcing structures 31 of third panel 1(b) are fittingly received within at least some of second external portion recesses 98 of first panel 1, which together form a third set of panel interlocks 101(c). The third set of panel interlocks 101(c) serve to attach first panel 1 and third panel 1(b) together.

Substantially concurrent with the formation of the third set of panel interlocks 101(c), a fourth set of panel interlocks 101(d) are formed. In particular, second side 73 of second external portion 20 of third panel 1(b) abuts a portion of second side 26 of center portion 14 of first panel 1. When so arranged, some of center plastic reinforcing structures 31 of first panel 1 are fittingly received within at least some of second external portion recesses 98 of third panel 1(b), which together form the fourth set of panel interlocks 101(d). In addition to the third set of panel interlocks 101(c), the fourth set of panel interlocks 101(d) also serve to attach first panel 1 and third panel 1(b) together.

When the first and third panels of the panel assembly are so interlocked, as described above, the first side 104 of first panel 1 is substantially even with the second side 26 of center portion 14 of third panel 1(b). In addition to being substantially even, first side 104 of first panel 1 and second side 26 of center portion 14 of third panel 1(b) together define at least a portion of a first side 164 of molded panel assembly 3.

Interlocking of the first and third panels of the panel assembly also results in first side 104 of third panel 1(b) being substantially even with second side 26 of center portion 14 of first panel 1. First side 104 of third panel 1(b) and second side 26 of center portion 14 of first panel 1, in addition to being substantially even, also together define at least a portion of a second side 167 of molded panel assembly 3.

As discussed previously herein, the center section of the molded panel has three sections having variable thicknesses: core center section 14(a); first center section 14(b); and second center section 14(c). See, for example, FIG. 4. With further reference to FIG. 14, first panel 1 and third panel 1(b) are more particularly arranged such that: second side 73 of second external portion 20 of first panel 1 abuts and interlocks with second side 26(c) of second center section 14(c) of third panel 1(b); and at the same time, second side 73 of second external portion 20 of third panel 1(b) abuts and interlocks with second side 26(c) of second center section 14(c) of first panel 1. The thickness 149(c) (FIG. 4) of second center section 14(c) being less than thickness 149(a) of core center section 14(a) of first panel 1, and the difference there-between are selected such that first side 104 of third panel 1(b) is substantially even (or flush) with second side 26(a) of core center section 14(a) of first panel 1, and thus together form at least a portion of second side 167 of panel assembly 3, when the panels are in interlocking engagement. Equivalently, the thickness 149(c) (FIG. 4) of second center section 14(c) being less than thickness 149(a) of core center section 14(a) of third panel 1(b), and the difference there-between are selected such that first side 104 of first panel 1 is substantially even (or flush) with second side 26(a) of core center section 14(a) of third panel 1(b), and thus together form at least a portion of first side 164 of panel assembly 3, when the panels are in interlocking engagement.

Second elongated channel 128 of first panel 1 and second elongated channel 128 of third panel 1(c) are substantially aligned and together form and define second enclosed panel-panel channel 173, when first panel 1 and third panel 1(c) are interlockingly attached to each other, as described above. Further elongated support 143 resides within second enclosed panel-panel channel 173.

As with the single molded panel, for each molded panel of the molded panel assembly, the second side of the center portion of each molded panel extends beyond each of the second side of the first external portion and the second side of the second external portion. With reference to FIG. 12, center portion 14 has a thickness 149, first external portion 17 has a thickness 152, and second external portion 20 has a thickness 155. Thickness 149 of center portion 14 is greater than thickness 152 of first external portion 17, and greater than thickness 155 of second external portion 20. The degree (or magnitude) to which the thickness of the center portion is greater than each of thicknesses of the first and second external portions, is selected such that when two or more molded panels are joined together with external portions overlapping and interlocking with aligned center portions, the resulting panel assembly has substantially even first and second surfaces. In a particular embodiment of the present invention, for each panel of the panel assembly, thickness 149 of center portion 14 is twice (i.e., two times greater than) thickness 152 of first external portion 17, and twice (i.e., two times greater than) thickness 155 of second external portion 20. In addition, for each panel of the panel assembly, thickness 152 of first external portion 17 and thickness 155 of second external portion 20 are substantially equivalent.

In addition to the center portion of each panel of the panel assembly having a thickness that is greater than the thicknesses of the first and second external portions, the center portion of each panel may itself have different thicknesses, as discussed previously herein with reference to FIG. 4. Providing the center portion of each panel with different thicknesses facilitates providing the panel assembly of the present invention with substantially even first and second surfaces, as discussed previously herein above with reference to the interlocking engagement of first panel 1 with second panel 1(a) and third panel 1(b) of panel assembly 3.

For each panel of the panel assembly: the center portion apertures 34 are defined by the center reinforcing structures 31; the first external portion apertures 61 are defined by the interior surfaces 55 of the sidewalls 52 of the first reinforcing structures 49; and the second external portion apertures 94 are defined by the interior surfaces 85 of the sidewalls 82 of the second reinforcing structures 79. The plurality of center apertures, the plurality of first external portion apertures, and the plurality of second external portion apertures, of each panel of the panel assembly, may each independently have shapes selected from circles, ovals, polygons, irregular shapes and combinations thereof. In an embodiment of the present invention, for each panel of the panel assembly, the plurality of first external portion apertures, and the plurality of second external portion apertures, of each panel of the panel assembly, may each independently have hexagonal shapes.

The first side 23 of center portion 14, the first side 37 of first external portion 17, and the first side 67 of the second external portion 20 of each molded panel of the panel assembly may independently have a substantially closed and continuous surface or an open (or non-continuous) surface, as discussed previously herein with regard to the molded panel. If the first side of a particular section of the panel is an open surface, then at least some of the apertures associated with that section extend from the first side to the second side of that section. Alternatively, if the first side of a particular section of the panel is a substantially closed and continuous surface, then the apertures associated with that section are only open to the second side of that section. In an embodiment of the present invention, for each panel of the panel assembly: the plurality of center apertures (e.g., 34) each extend from the first side (e.g., 23) to the second side (e.g., 26) of the center section (e.g., 14); first surface (e.g., 40) of the first side (e.g., 37) of the first external portion (e.g., 17) is a substantially closed surface; and the first surface (e.g., 70) of the first side (e.g., 67) of the second external portion (e.g., 20) is a substantially closed surface.

The plastic material of the center portion, the first external portion and the second external portion of each molded panel of the panel assembly are each independently selected from thermoset plastic materials, thermoplastic materials and combinations thereof. The thermoset plastic materials and thermoplastic materials may each be selected from those classes and examples as described and recited further herein.

The plastic material of at least one of the center portion, the first external portion and the second external portion of each molded panel of the panel assembly may include a reinforcing material (e.g., glass fiber). The reinforcing material may be selected from those classes and examples and be present in amounts as described and recited further herein.

Figure 17:
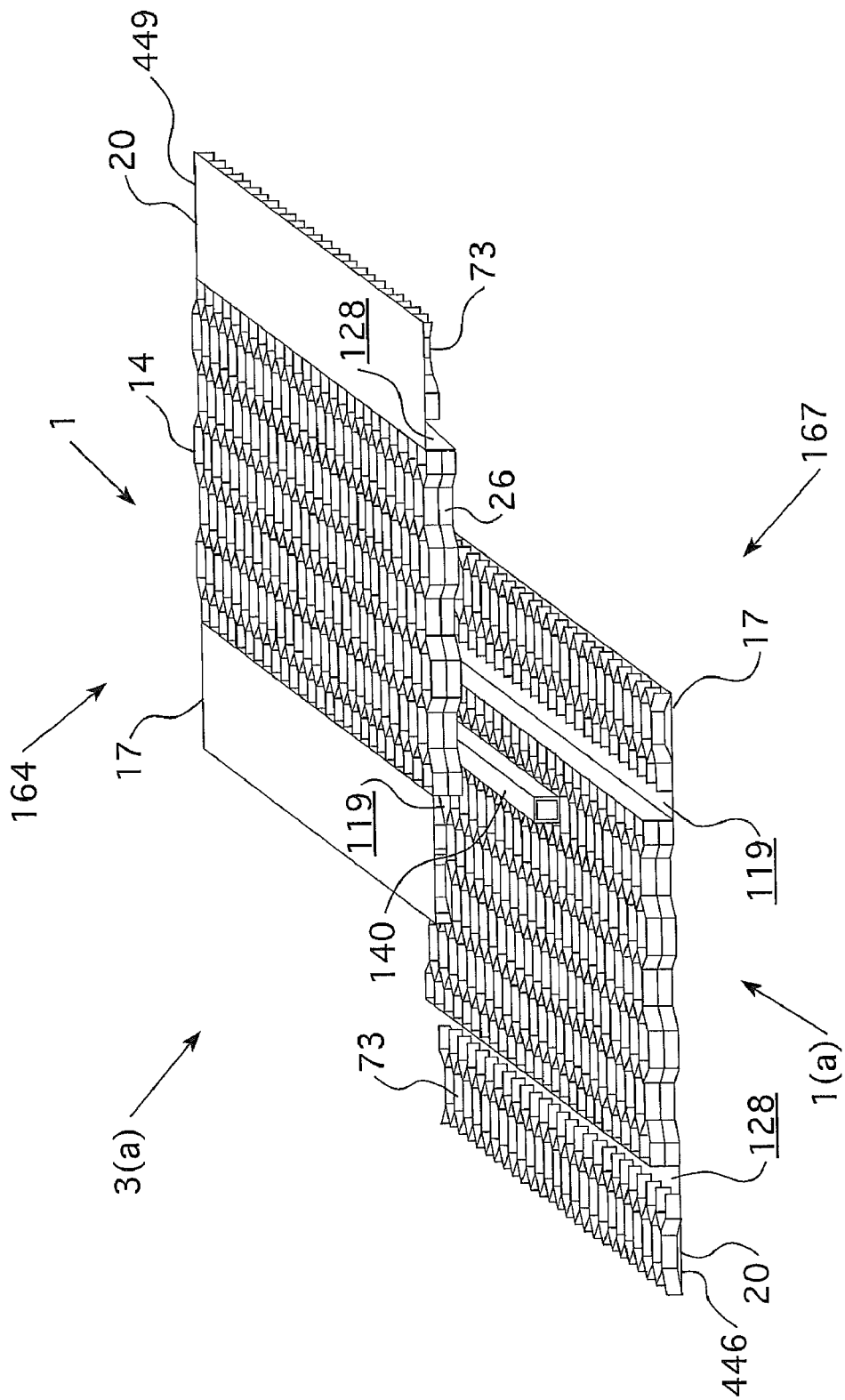
FIG. 17 is a representative exploded perspective view of a molded panel assembly of the load bearing assembly according to the present invention, similar to that of FIG. 7, but including two molded panels.

The molded panel assembly of the load bearing assembly of the present invention may be further described as including a first terminal molded panel having a first free external portion, and a second terminal molded panel having a second free external portion. The terminal molded panels are located at the terminal points or ends of the molded panel assembly, and each terminal molded panel has a free external portion that is not interlocked with the center section of a neighboring molded panel. With reference to FIG. 7, panel assembly 3 (which is composed of 3 interlocking molded panels) has a first terminal molded panel 1(b) and a second terminal molded panel 1(a). Equivalently, panel assembly 3 may be described as having a first terminal molded panel 1(a) and a second molded panel 1(b). Panel 1 of molded panel assembly 3 may be described as an internal molded panel, in which the first (17) and second (20) external portions thereof are in interlocking engagement with neighboring panels 1(a) and 1(b). Molded panel assembly 3(a) of FIG. 17 is composed of 2 interlocking panels, and has a first terminal molded panel 1 and a second terminal molded panel 1(a). Equivalently, molded panel assembly 3(a) of FIG. 17 may be described as having a first terminal molded panel 1(a) and a second molded panel 1.

Each terminal molded panel of the molded panel assembly also has a free external portion that is not interlocked with the center section of a neighboring molded panel. Each free external portion is as described previously herein with regard to the first and second external portions (e.g., 17, 20) of the molded panel (e.g., molded panel 1). With reference to molded panel assembly 3 of FIGS. 7 and 24-27, first terminal molded panel 1(b) has a first free external portion 443, and second terminal molded panel 1(a) has a second free external portion 446. First free external portion 443 is equivalent and as previously described with regard to first external portion 17 of molded panel 1, and second free external portion 446 is equivalent and as previously described with regard to second external portion 20, in each case of molded panel 1.

With reference to FIG. 17, molded panel assembly 3(a) includes a first free external portion 449, and a second free external portion 446. First free external portion 449 is equivalent and as previously described with regard to first external portion 17 of molded panel 1, and second free external portion 446 is equivalent and as previously described with regard to second external portion 20, in each case of molded panel 1.

When the molded panel assembly of the load bearing assembly of the present invention includes an even number of overlapping and interlocking molded panels (e.g., 2, 4, 6, 8, etc.) the second sides of the first and second free external portions face in opposite directions (e.g., are positioned on opposite sides of the molded panel assembly). Conversely, when the molded panel assembly includes an odd number of overlapping and interlocking molded panels (e.g., 3, 5, 7, 9, etc.) the second sides of the first and second free external portions face the same direction (e.g., are positioned on the same side of the molded panel assembly). With molded panel assembly 3(a) of FIG. 17, which is composed of two overlapping and interlocking molded panels 1 and 1(a): second side 73 of first free external portion 449 of first terminal molded panel 1 is positioned on second side 167 of molded panel assembly 3(a); and second side 73 of second free external portion 446 of second terminal molded panel 1(a) is positioned on first side 164 of molded panel assembly 3(a). With molded panel assembly 3 of FIG. 7, which is composed of three overlapping and interlocking molded panels 1, 1(a) and 1(b): second side 43 of first free external portion 443 of first terminal molded panel 1(b) is positioned on first side 164 of molded panel assembly 3; and second side 73 of second free external portion 446 of second terminal molded panel 1(a) is also positioned on first side 164 of molded panel assembly 3.

The molded panel assembly embodiment of the load bearing assembly of the present invention includes: a molded panel assembly (e.g., 3); a first support (e.g., 303); and optionally a second support (e.g., 306). The first and second supports of the load bearing assembly are as described previously herein with regard to first support 303 and second support 306, and each have a plurality of extensions (e.g., 318, 339) that form support interlocks with the external portion recesses (e.g., 64, 98) of the first and/or second free external portions (e.g., 443, 446) of the molded panel assembly (e.g., 3). While the second support is optional, the load bearing assembly of the present invention typically includes both the first and second supports.

The interlocking engagement between the free external portions (e.g., 443 and 446) of the molded panel assembly and the first and second supports is substantially as described previously herein with regard to first external portion 17 and second external portion 20 of molded panel 1, and first support 303 and second support 306, respectively. With reference to FIGS. 24-27, load bearing assembly 452 includes molded panel assembly 3, first support 303 and second support 306. Molded panel assembly 3 has first free external portion 443 and second free external portion 446. First free external portion 443 is as previously described with regard to first external portion 17 of molded panel 1 and includes, a plurality of first reinforcing structures 49, having sidewalls 52 that define first external portion apertures 61 and first external portion recesses 64, as previously described in further detail with reference to FIG. 5. Second free external portion 446 is as previously described with regard to second external portion 20 of molded panel 1 and includes, a plurality of second reinforcing structures 79, having sidewalls 82 that define second external portion apertures 94 and second external portion recesses 98, as previously described in further detail with reference to FIG. 6.

With further reference to FIGS. 24-27, at least some of extensions 318 of first support 303 are fittingly received within at least some of the first external portion recesses 64 of first free external portion 443 of the molded panel assembly 3, thereby forming a first set of support interlocks 455. See, for example, FIGS. 25 and 27. First set of support interlocks 455 serve to attach (e.g., fixedly or reversibly) the molded panel assembly (e.g., molded panel assembly 3) and the first support 303 together. At least some of extensions 339 of second support 306 are fittingly received within at least some of the second external portion recesses 98 of second free external portion 446 of the molded panel assembly 3 thereby forming a second set of support interlocks 458. See, for example, FIGS. 25, 26 and 27. Second set of support interlocks 458 serve to attach (e.g., fixedly or reversibly) the molded panel assembly (e.g., molded panel assembly 3) and the second support 306 together.

With the molded panel assembly embodiment of the load bearing assembly of the present invention: (i) the first set of support interlocks (e.g., 455) further include an adhesive residing within the first external portion recesses (e.g., 64) of the first free external portion (e.g., 443) of the molded panel assembly (e.g., 3); and/or (ii) the second set of support interlocks (e.g., 458) further includes an adhesive residing within the second external portion recesses (e.g., 98) of the second free external portion (e.g., 446) of the molded panel assembly (e.g., 3). For purposes of illustration, and with reference to FIG. 11, a portion of a sectional view of a first support interlock A (455) is depicted in which first external recess 64 (of the first free external portion 443, not shown) includes an adhesive B that is interposed between first external recess 64 and extension C (e.g., 318) of first support 303 (not shown in FIG. 11). Adhesive B serves to retain (e.g., fixedly) extension C (e.g., 318) of first support 303 within first external recess 64. Adhesive B may be selected from art-recognized adhesives. The depiction presented in FIG. 11 is equivalently applicable to the second set of support interlocks (e.g., 458), in which case: (i) sidewalls 52 would be replaced with sidewalls 82; (ii) first external recess 64 would be replaced with second external portion recess 98 (of the second free external portion 446, not shown); and (iii) extension C would be replaced with extension 339 of second support 306.

The molded panel assembly embodiment of the load bearing assembly (e.g., 452) may include a combination of enclosed panel-support channels (e.g., first enclosed panel-support channel 362 and second enclosed panel-support channel 377) and enclosed panel-panel channels (e.g., first enclosed panel-panel channel 170 and second enclosed panel-panel channel 173). See, for example, FIGS. 26 and 27.

The enclosed panel-panel channels (e.g., 170 and 173) are formed and defined by the aligned elongated open channels (e.g., aligned elongated open channels 119-119 in the case of enclosed panel-panel channel 170; and aligned elongated open channels 128-128 in the case of enclosed panel-panel channel 173) of the external portions (e.g., 17-17 and 20-20) of the molded panels of the molded panel assembly, as described previously herein with reference to FIGS. 7, 9, 14 and 15.

Figure 25:
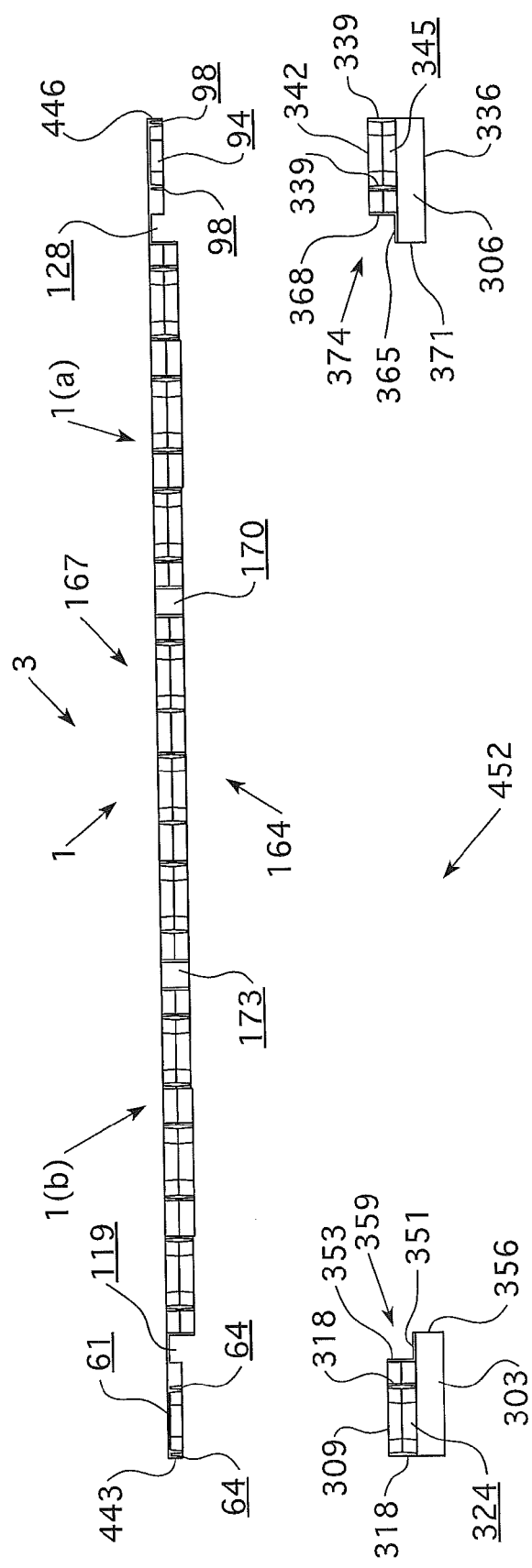
FIG. 25 is a representative exploded side elevational view of the load bearing assembly of FIG. 24.
Figure 26:
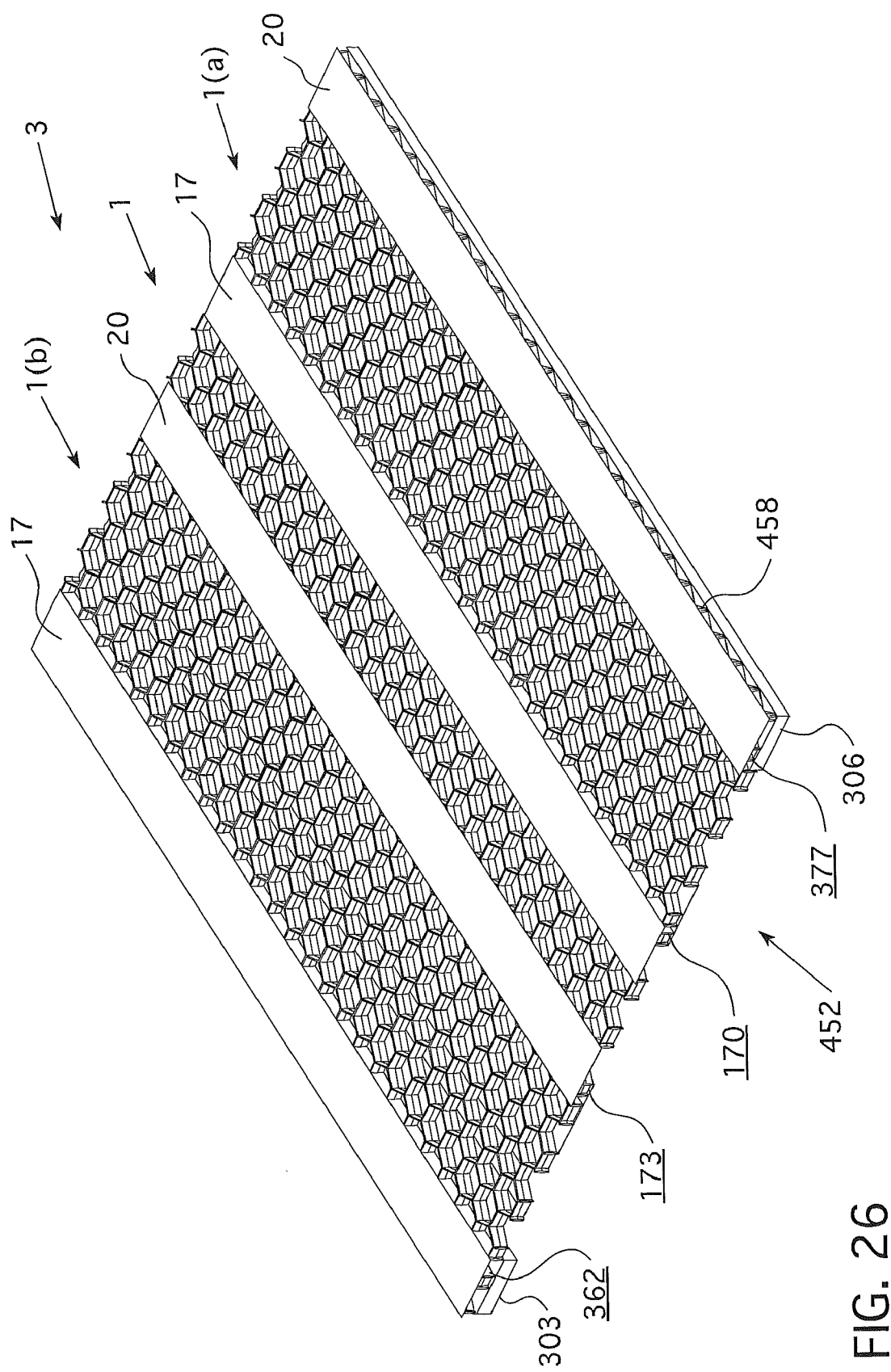
FIG. 26 is a representative non-exploded perspective view of the load bearing assembly of FIG. 24.
Figure 27:
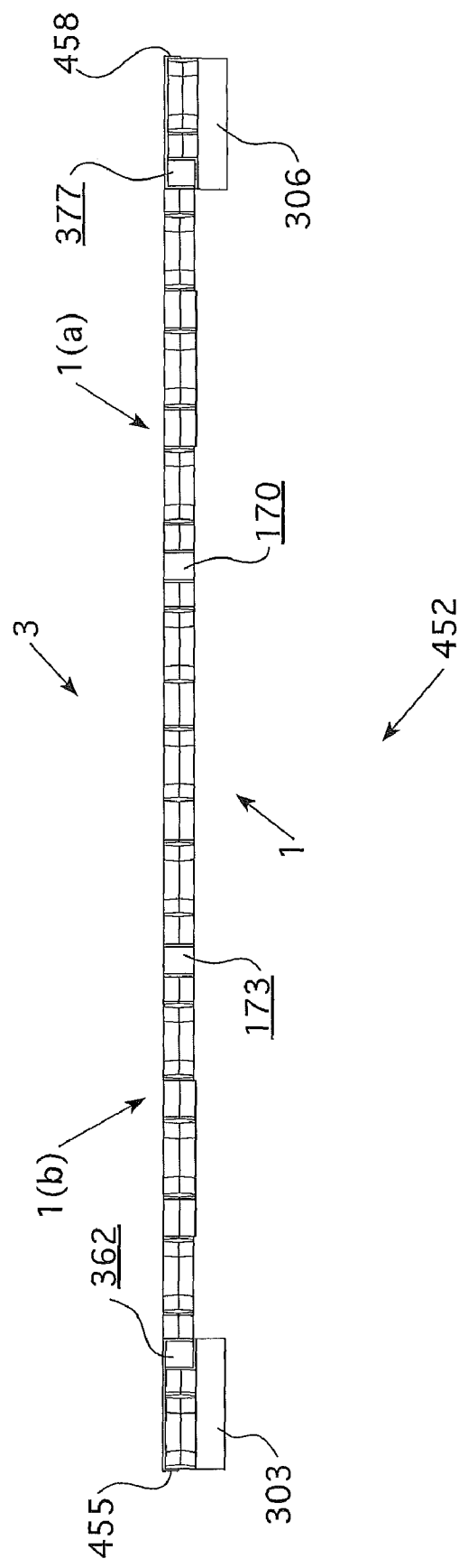
FIG. 27 is a representative non-exploded side elevational view of the load bearing assembly of FIG. 26.

The enclosed panel-support channels of the molded panel assembly embodiment of the load bearing article are as substantially described previously herein with regard to the single molded panel embodiment of the load bearing article. See, for example, FIGS. 21-23. More particularly and with reference to FIGS. 25-27, extension-free-portion 351 (or first support ledge 359) of first support 303 and first free elongated open channel 119 of first free external portion 443 of first terminal molded panel 1(*b*) together form and define first enclosed panel-support channel 362. With further reference to FIGS. 25-27, extension-free-portion 365 (or second support ledge 374) of second support 306 and second free elongated open channel 128 of second free external portion 446 of second terminal molded panel 1(*a*) together form and define a second enclosed panel-support channel 377.

The enclosed panel-panel channels (e.g., 170, 173) and the enclosed panel-support channels (e.g., 362, 377) of the molded panel assembly embodiment of the load bearing assembly may each independently have an elongated support residing therein. The elongated supports are as described previously herein. For example, the enclosed panel-panel channels (e.g., 170, 173) each may independently have an elongated support (140, 143) residing therein. See, for example, FIGS. 7, 9, 10, 14 and 15. The enclosed panel-support channels (e.g., 362, 377) may each independently have an elongated support (e.g., 380, 383) residing therein. See, for example, FIGS. 21 and 23, with regard to the single molded panel embodiment of the load bearing article. The representations of the panel assembly embodiments of the load bearing article (452) of the present invention as shown in FIGS. 24-27 are not depicted as including elongated supports in the enclosed panel-panel channels or the enclosed panel-support channels.

Figure 8:
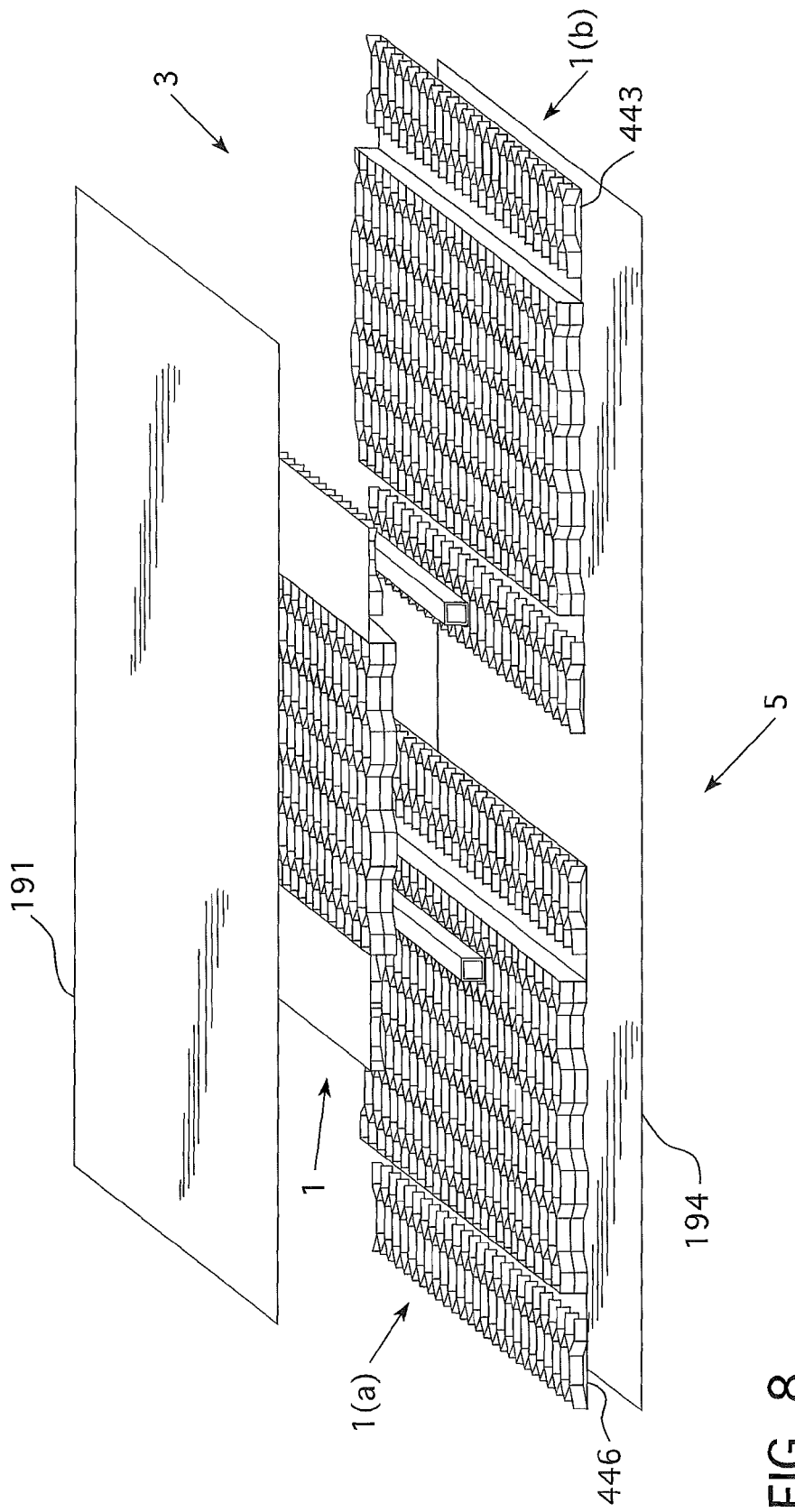
FIG. 8 is a representative exploded perspective view of the molded panel assembly of FIG. 7 that further includes first and second external sheets.

As with the single molded panel embodiment, the molded panel assembly embodiment of the load bearing assembly of the present invention may optionally include: a first sheet fixedly attached to at least a portion of the first side of the molded panel assembly; and/or a second sheet fixedly attached to at least a portion of the second side of the molded panel assembly. Including a sheet fixedly attached to the first and/or second side of the panel assembly may be undertaken for reasons, including, but not limited to: providing additional dimensional stability to the panel assembly and correspondingly the load bearing assembly; and/or altering the aesthetic appearance of the panel assembly and correspondingly the load bearing assembly. With reference to FIG. 8, panel assembly 5 includes: a first sheet 191 fixedly attached to at least a portion of first side 164 of molded panel assembly 3; and/or a second sheet 194 fixedly attached to at least a portion of second surface 167 of molded panel assembly 3.

The first and/or second sheets may optionally further include indicia (e.g., letters, numbers, symbols, bar codes, artistic renderings and/or pictures) on an exterior surface thereof. The indicia may be applied to the exterior surface of the first and/or second sheets (e.g., 413, 416; or 191, 194) before or after they are fixedly attached to the molded panel (e.g., 1) or molded panel assembly (e.g., 3). When fabricated from plastic material (e.g., thermoset and/or thermoplastic materials) the indicia may be applied to the exterior surface of the first and second sheets by in-mold decoration methods. With in-mold decoration methods, typically a film including indicia is placed on the internal surface of a mold, and plastic material is injected into the mold and against the film, thereby forming a sheet having indicia integrally molded to a portion of a surface thereof. The film that is placed in the mold may have indicia on the first surface (i.e., the surface that is contacted with the interior mold surface) and/or the second surface (i.e., the surface that faces the open interior of the mold) of the film.

Each sheet (e.g., 191 and/or 194) may be attached to the panel assembly by means, including, but not limited to, fasteners (not shown), adhesives (not shown), snap fittings (not shown) and combinations thereof. In the case of snap fittings, the interior surface of a sheet may be provided with extensions (not shown) that are snap fittingly received within aligned apertures, for example, within some of the center apertures (e.g., 34) of the panels of the panel assembly. Adhesives may be applied to the interior surface and/or the first and/or second side of the panel assembly, followed by pressing the sheet(s) and panel assembly together with optional heating. Fasteners, such as screws or nut and bolt combinations may be passed through a sheet and into the plastic material of an underlying panel, and optionally into (or through) an elongated support within the panel assembly.

The first and second sheets may each be independently fabricated from suitable rigid materials. For example, the first and second sheets may each be independently fabricated from a material selected from wood, metal (e.g., ferrous based metals, and aluminum), thermoset plastic material, thermoplastic material and combinations thereof. Plastic materials, such as, thermoplastic and/or thermoset materials, from which the first and second sheets of the panel assembly may be fabricated, may be selected from those classes and examples as described further herein with regard to the molded panel, and may optionally further include reinforcing materials (e.g., glass fibers) including those classes and examples, and in amounts as described further herein.

The first and second sheets may have a wide range of dimensions. Generally, the length and width of second sheet 194 is selected so as to substantially cover the underlying side (e.g., second side 167) of the panel assembly to which it is attached. First sheet 191 has dimensions that are selected so as to avoid covering or otherwise obstructing the second sides (e.g., 43, 73) of the free external portions (e.g., first 443 and second 446) of the molded panel assembly (e.g., 3), thereby allowing the free external portions to interlockingly engage with the respective first or second supports (303, 306). The thickness of each sheet of the load bearing article is generally selected so as to provide the molded panel (e.g., 1, FIG. 29) or the molded panel assembly (e.g., 3, 5, FIG. 8) with improved dimensional stability (e.g., stiffness and/or impact resistance). Typically, each sheet (e.g., 413, 416, 191 and 194) of the load bearing assembly independently has a thickness of from 1/16 inch (1.6 mm) to 0.25 inches (6.4 mm), and more typically from 1/16 inch (1.6 mm) to 3/16 inch (4.8 mm). In an embodiment of the present invention each sheet of the molded panel assembly have a thickness of 1/8 inch (3.2 mm).

Figure 16:
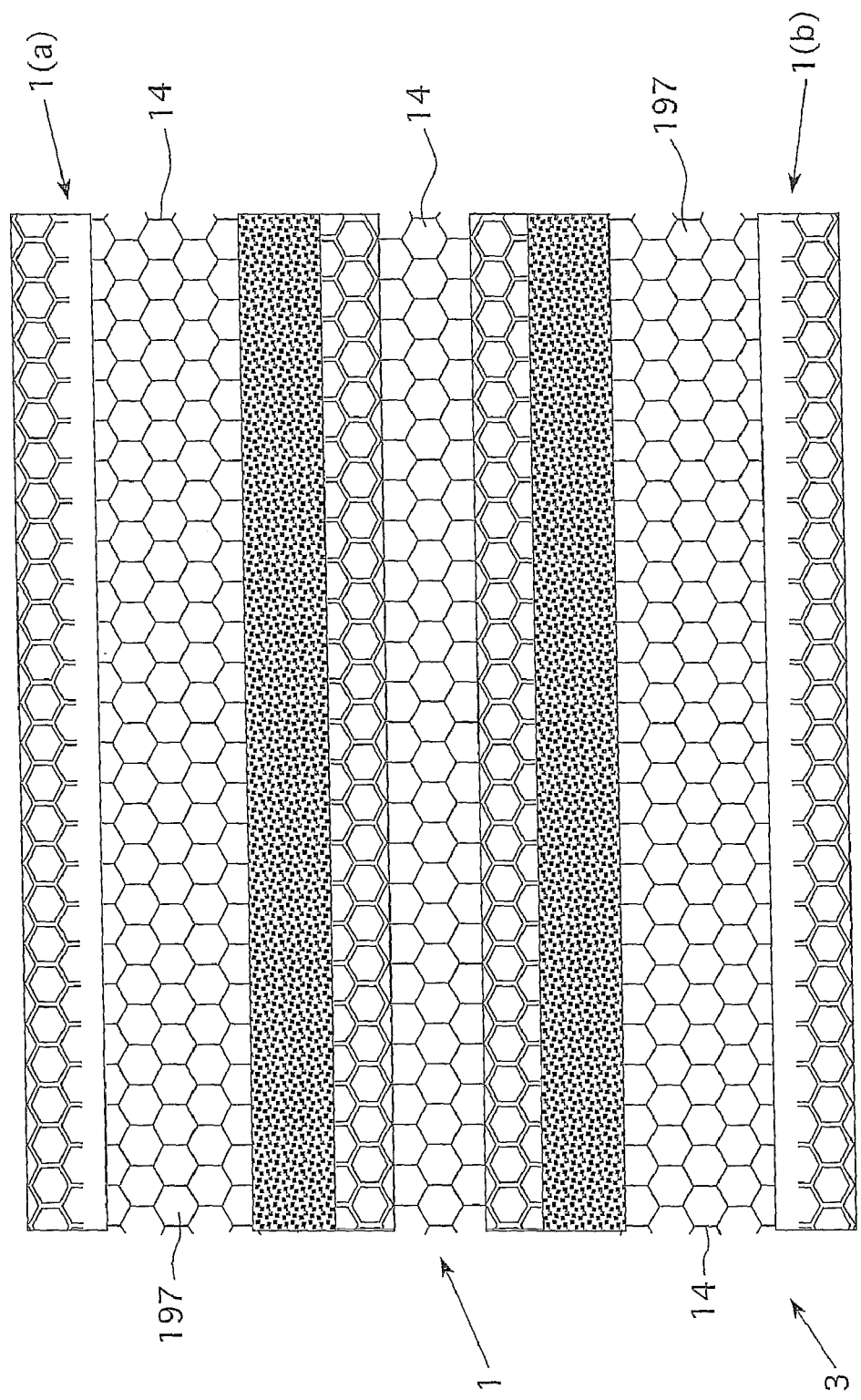
FIG. 16 is a top plan view of the panel assembly of FIG. 8 without the upper external sheet.

In addition to including first sheet 191 and/or second sheet 194, the plurality of center apertures, the plurality of first external portion apertures, and/or the plurality of second external portion apertures, of each panel of the panel assembly, may optionally be at least partially filled with a polymeric foam material. The polymeric foam material may be included for reasons including, but not limited to: improving the dimensional stability (e.g., stiffness, flexibility and/or impact resistance) of the panel assembly; and/or providing the panel assembly with improved thermal insulation properties. With reference to FIG. 16, the center apertures 34 (defined by center reinforcing structures 31) of the center sections 14 of second molded panel 1(a) and third molded panel 1(b) each include a polymeric foam material 197. The polymeric foam material may be selected from art-recognized materials, such as polyurethane foams, polyolefin foams, and combinations thereof.

The polymeric foam material is typically introduced (e.g., by spraying or pouring) into the apertures of the panels or panel portions of the panel or panel assembly, and then the exterior sheets (e.g., sheets 413, 416; or sheets 191, 194) are attached to the panel or panel assembly as the introduced foam expands. During expansion of the foam within the apertures, the exterior sheets may be held in place against the panel or panel assembly with a clamping pressure, so as to prevent the expanding foam from pushing the sheets or portions thereof away from the panel or panel assembly. Since the polymeric foam expands and contacts and adheres to the interior surface of the first and/or second sheets, the polymeric foam may also act as an adhesive holding the first and/or second sheets in place against molded panel or molded panel assembly of the load bearing assembly.

The molded panel assembly of the load bearing assembly of the present invention may have a wide range of dimensions depending in part on the dimensions of the individual panels and the number of panels used to form the panel assembly. In the absence of exterior sheets (e.g., 191, 194), the molded panel assembly generally has a thickness that is substantially equivalent to that of the panel center portion (e.g., 149, FIG. 12) or more particularly the panel core center section (e.g., 149(a), FIG. 4). Typically, the molded panel assembly, excluding exterior sheets, has a thickness of from 0.5 inches (12.7 mm) to 6 inches (15.2 cm), more typically from 0.75 inches (19.1 mm) to 5 inches (12.7 cm), and further typically from 1 inch (25.4 mm) to 4 inches (10.2 cm). In an embodiment of the present invention, the panel assembly of the load bearing assembly, excluding exterior sheets, has a thickness of 1.75 inches (44.5 mm).

When one or both exterior sheets are present, the thickness of the molded panel assembly is increased accordingly. For example, when including exterior sheets 191 and 194, each having a sheet thickness of 1/8 inch (3.2 mm), the molded panel assembly typically has a thickness of from 0.75 inch (19 mm) to 6.25 inch (15.9 cm), more typically from 1 inch (25.4 mm) to 5.25 inches (13.3 cm), and further typically from 1.25 inch (31.8 mm) to 4.25 inch (10.8 cm). In an embodiment of the present invention, the panel assembly of the load bearing article, when including two exterior sheets each having a thickness of 1/8 inch (3.2 mm), has a thickness of 2 inches (50.8 mm).

When the center apertures (e.g., 34), the first external portion apertures (e.g., 61) and/or the second external portion apertures (e.g., 94) are at least partially filled with a polymeric foam material (e.g., a polyurethane foam) the thickness of the panel assembly may increase, for example, by 1/16 inch (1.6 mm) to 1/8 inch (3.2 mm). The increase in thickness may be due to the polymeric foam itself expanding and correspondingly extending out beyond the apertures. When one or two external sheets (e.g., 191 and/or 194) are present, the expanding polymeric foam may push the sheets outward slightly, thus increasing the thickness of the panel assembly.

The width of the molded panel assembly of the load bearing article of the present invention is generally equal to the length of an individual panel thereof (e.g., as discussed previously herein with regard to panel length 158). Typically, the width of a molded panel assembly is from 4 feet (1.2 meters) to 12 feet (3.7 meters), more typically from 5 feet (1.5 meters) to 11 feet (3.4 meters), and further typically from 6 feet (1.8 meters) to 10 feet (3.1 meters). In an embodiment of the present invention, the molded panel assembly of the load bearing article has a width of 8 feet (2.4 meters).

The length of the molded panel assembly generally depends on the number of panels that form the assembly. The length of a panel assembly may be determined by adding the widths (e.g., panel width 161) of each panel in the assembly, and subtracting the linear overlap between each pair of joined/interlocked panels. The linear overlap between a pair of joined panels is typically equal to the exclusive width (e.g., 236 or 242, FIG. 12) of the external portion the panels (i.e., the width of the external portion that is exclusive of the elongated open channel associated therewith, if present). As discussed previously herein, at least two molded panels (e.g., 1, 1a) are positioned such that one external portion (e.g., 17) of each panel overlaps with a portion of the center portion (14) of the other panel, and some of the center reinforcing structures (31) are received within at least some of the external portion recesses (e.g., 64) aligned therewith, and together form a plurality of interlocks (e.g., 101a, 101b) that together attach the panels together. For example, with reference to FIGS. 12, 14 and 15, if panels 1 and 1(b) each have a width 161 of 4 feet (122 cm) and an external portion (e.g., 20) exclusive width (e.g., 242) of 5 inches (12.7 cm), then the molded panel assembly resulting from abutting overlap and joinder of just panels 1 and 1(b) has a length of 7 feet, 7 inches (2.3 meters).

When, for example, formed from two panels, the molded panel assembly typically has a length of from 3 feet, 7 inches (1.1 meters) to 13 feet, 7 inches (4.1 meters), more typically from 5 feet, 7 inches (1.7 meters) to 11 feet, 7 inches (3.5 meters), and further typically from 5 feet, 7 inches (1.7 meters) to 9 feet, 7 inches (2.9 meters). In a particular embodiment of the present invention, when formed from two panels, the panel assembly has a length of 7 feet, 7 inches (2.3 meters). When, for example, formed from three panels, the panel assembly typically has a length of from 5 feet, 2 inches (1.6 meters) to 20 feet, 2 inches (6.2 meters), more typically from 8 feet, 2 inches (2.5 meters) to 17 feet, 2 inches (5.2 meters), and further typically from 8 feet, 2 inches (2.5 meters) to 14 feet, 2 inches (4.3 meters). In a particular embodiment of the present invention, when formed from three panels, the panel assembly has a length of 11 feet, 2 inches (3.4 meters).

The various components of the load bearing assembly, such as the first support (e.g., 303), the second support (e.g., 306), the molded panels (e.g., 1, 1a, 1b), the molded panel assemblies (e.g., 3 and 3a), the elongated supports (e.g., 173, 176, 380, 383), the first sheets (e.g., 191, 413) and the second sheets (e.g., 194, 416) may each individually be fabricated from a plastic material selected from thermoplastic and/or thermoset plastic materials. With regard to the molded panel, the center portion (e.g., 14), first external portion (e.g., 17) and the second external portion (e.g., 20) thereof may each independently be fabricated from the same or different plastic materials.

As used herein and in the claims the term "thermoset plastic material" and similar terms, such as "thermosetting or thermosettable plastic materials" means plastic materials having or that form a three dimensional crosslinked network resulting from the formation of covalent bonds between chemically reactive groups, e.g., active hydrogen groups and free isocyanate groups, or between unsaturated groups. Thermoset plastic materials from which the various components of the load bearing assembly may be fabricated include those known to the skilled artisan, e.g., crosslinked polyurethanes, crosslinked polyepoxides, crosslinked polyesters (such as sheet molding compound compositions) and crosslinked polyunsaturated polymers. The use of thermosetting plastic materials typically involves the art-recognized process of reaction injection molding. Reaction injection molding typically involves, as is known to the skilled artisan, injecting separately, and preferably simultaneously, into a mold, for example: (i) an active hydrogen functional component (e.g., a polyol and/or polyamine); and (ii) an isocyanate functional component (e.g., a diisocyanate such as toluene diisocyanate, and/or dimers and trimers of a diisocyanate such as toluene diisocyanate). The filled mold may optionally be heated to ensure and/or hasten complete reaction of the injected components.

As used herein and in the claims, the term "thermoplastic material" and similar terms, means a plastic material that has a softening or melting point, and is substantially free of a three dimensional crosslinked network resulting from the formation of covalent bonds between chemically reactive groups, e.g., active hydrogen groups and free isocyanate groups. Examples of thermoplastic materials from which the various components of the load bearing assembly may be fabricated include, but are not limited to, thermoplastic polyurethane, thermoplastic polyurea, thermoplastic polyimide, thermoplastic polyamide, thermoplastic polyamideimide, thermoplastic polyester, thermoplastic polycarbonate, thermoplastic polysulfone, thermoplastic polyketone, thermoplastic polyolefins, thermoplastic (meth)acrylates, thermoplastic acrylonitrile-butadiene-styrene, thermoplastic styrene-acrylonitrile, thermoplastic acrylonitrile-stryene-acrylate and combinations thereof (e.g., blends and/or alloys of at least two thereof).

In an embodiment of the present invention, the thermoplastic material from which each of the various components of the load bearing assembly may be fabricated is independently selected from thermoplastic polyolefins. As used herein and in the claims, the term "polyolefin" and similar terms, such as "polyalkylene" and "thermoplastic polyolefin," means polyolefin homopolymers, polyolefin copolymers, homogeneous polyolefins and/or heterogeneous polyolefins. For purposes of illustration, examples of a polyolefin copolymers include those prepared from ethylene and one or more $C_3$-$C_{12}$ alpha-olefins, such as 1-butene, 1-hexene and/or 1-octene.

The polyolefins, from which the thermoplastic material of the various components of the load bearing assembly may in each case be independently selected, include heterogeneous polyolefins, homogeneous polyolefins, or combinations thereof. The term "heterogeneous polyolefin" and similar terms means polyolefins having a relatively wide variation in: (i) molecular weight amongst individual polymer chains (i.e., a polydispersity index of greater than or equal to 3); and (ii) monomer residue distribution (in the case of copolymers) amongst individual polymer chains. The term "polydispersity index" (PDI) means the ratio of $M_w/M_n$, where $M_w$ means weight average molecular weight, and $M_n$ means number average molecular weight, each being determined by means of gel permeation chromatography (GPC) using appropriate standards, such as polyethylene standards. Heterogeneous polyolefins are typically prepared by means of Ziegler-Natta type catalysis in heterogeneous phase.

The term "homogeneous polyolefin" and similar terms means polyolefins having a relatively narrow variation in: (i) molecular weight amongst individual polymer chains (i.e., a polydispersity index of less than 3); and (ii) monomer residue distribution (in the case of copolymers) amongst individual polymer chains. As such, in contrast to heterogeneous polyolefins, homogeneous polyolefins have similar chain lengths amongst individual polymer chains, a relatively even distribution of monomer residues along polymer chain backbones, and a relatively similar distribution of monomer residues amongst individual polymer chain backbones. Homogeneous polyolefins are typically prepared by means of single-site, metallocene or constrained-geometry catalysis. The monomer residue distribution of homogeneous polyolefin copolymers may be characterized by composition distribution breadth index (CDBI) values, which are defined as the weight percent of polymer molecules having a comonomer residue content within 50 percent of the median total molar comonomer content. As such, a polyolefin homopolymer has a CDBI value of 100 percent. For example, homogenous polyethylene/alpha-olefin copolymers typically have CDBI values of greater than 60 percent or greater than 70 percent. Composition distribution breadth index values may be determined by art recognized methods, for example, temperature rising elution fractionation (TREF), as described by Wild et al, Journal of Polymer Science, Poly. Phys. Ed., Vol. 20, p. 441 (1982), or in U.S. Pat. No. 4,798,081, or in U.S. Pat. No. 5,089,321. An example of homogeneous ethylene/alpha-olefin copolymers are SURPASS polyethylenes, commercially available from NOVA Chemicals Inc.

The plastic materials of the various components of the load bearing assembly may in each case independently and optionally include a reinforcing material selected, for example, from glass fibers, glass beads, carbon fibers, metal flakes, metal fibers, polyamide fibers (e.g., KEVLAR polyamide fibers), cellulosic fibers, nanoparticulate clays, talc and mixtures thereof. If present, the reinforcing material is typically present in a reinforcing amount, e.g., in an amount of from 5 percent by weight to 60 or 70 percent by weight, based on the total weight of the component (i.e., the sum of the weight of the plastic material and the reinforcing material). The reinforcing fibers, and the glass fibers in particular, may have sizings on their surfaces to improve miscibility and/or adhesion to the plastic materials into which they are incorporated, as is known to the skilled artisan.

In an embodiment of the invention, the reinforcing material is in the form of fibers (e.g., glass fibers, carbon fibers, metal fibers, polyamide fibers, cellulosic fibers and combinations of two or more thereof). The fibers typically have lengths (e.g., average lengths) of from 0.5 inches to 4 inches (1.27 cm to 10.16 cm). The various components of the load bearing assembly may each independently include fibers having lengths that are at least 50 or 85 percent of the lengths of the fibers that are present in the feed materials from which the molded panel is (or portions thereof are) prepared, such as from 0.25 inches to 2 or 4 inches (0.64 cm to 5.08 or 10.16 cm). The average length of fibers present in a plastic component of the load bearing assembly (e.g., the first and second supports, the molded panels, etc.) may be determined in accordance with art recognized methods. For example, the plastic component may be pyrolyzed to remove the plastic material, and the remaining or residual fibers microscopically analyzed to determine their average lengths, as is known to the skilled artisan.

Fibers are typically present in the plastic components of the load bearing assembly in amounts independently from 5 to 70 percent by weight, 10 to 60 percent by weight, or 30 to 50 percent by weight (e.g., 40 percent by weight), based on the total weight of the plastic component (i.e., the weight of the plastic material, the fiber and any additives). Accordingly, the plastic components of the load bearing assembly may each independently include fibers in amounts of from 5 to 70 percent by weight, 10 to 60 percent by weight, or 30 to 50 percent by weight (e.g., 40 percent by weight), based on the total weight of the particular component.

The fibers may have a wide range of diameters. Typically, the fibers have diameters of from 1 to 20 micrometers, or more typically from 1 to 9 micrometers. Generally each fiber comprises a bundle of individual filaments (or monofilaments). Typically, each fiber is composed of a bundle of 10,000 to 20,000 individual filaments.

Typically, the fibers are uniformly distributed throughout the plastic material. During mixing of the fibers and the plastic material, the fibers generally form bundles of fibers typically comprising at least 5 fibers per fiber bundle, and preferably less than 10 fibers per fiber bundle. While not intending to be bound by theory, it is believed, based on the evidence at hand, that fiber bundles containing 10 or more fibers may result in a plastic component (e.g., a molded panel) having undesirably reduced structural integrity. The level of fiber bundles containing 10 or more fibers per bundle, may be quantified by determining the Degree of Combing present within a molded article. The number of fiber bundles containing 10 or more fibers per bundle is typically determined by microscopic evaluation of a cross section of the molded article, relative to the total number of microscopically observable fibers (which is typically at least 1000). The Degree of Combing is calculated using the following equation: 100× ((number of bundles containing 10 or more fibers)/(total number of observed fibers)). Generally, molded plastic components of the load bearing assembly according to the present invention have a Degree of Combing of less than or equal to 60 percent, and typically less than or equal to 35 percent.

In addition or alternatively to reinforcing material(s), the plastic components of the load bearing assembly may in each case independently and optionally further include one or more additives. Additives that may be present in the plastic components include, but are not limited to, antioxidants, colorants, e.g., pigments and/or dyes, mold release agents, fillers, e.g., calcium carbonate, ultraviolet light absorbers, fire retardants and mixtures thereof. Additives may be present in the plastic material of each plastic component in functionally sufficient amounts, e.g., in amounts independently from 0.1 percent by weight to 10 percent by weight, based on the total weight of the particular plastic component.

The molded plastic components (e.g., the molded panels, molded panel assemblies and the first and second supports) of the load bearing assembly of the present invention may be prepared by art-recognized methods, including, but not limited to, injection molding, reaction injection molding and compression molding. The plastic components may be fabricated by a compression molding process that includes: providing a compression mold comprising a lower mold portion and an upper mold portion; forming (e.g., in an extruder) a molten composition comprising plastic material and optionally reinforcing material, such as fibers; introducing, by action of gravity, the molten composition into the lower mold portion; compressively contacting the molten composition introduced into the lower mold portion with the interior surface of the upper mold portion; and removing the molded component from the mold. The lower mold portion may be supported on a trolley that is reversibly moveable between: (i) a first station where the molten composition is introduced therein; and (ii) a second station where the upper mold portion is compressively contacted with the molten composition introduced into the lower mold portion.

The lower mold portion may be moved concurrently in time and space (e.g., in x-, y- and/or z-directions, relative to a plane in which the lower mold resides) as the molten composition is gravitationally introduced therein. Such dynamic movement of the lower mold portion provides a means of controlling, for example, the distribution, pattern and/or thickness of the molten composition that is gravitationally introduced into the lower mold portion. Alternatively, or in addition to movement of the lower mold portion in time and space, the rate at which the molten composition is introduced into the lower mold portion may also be controlled. When the molten composition is formed in an extruder, the extruder may be fitted with a terminal dynamic die having one or more reversibly positionable gates through which the molten composition flows before dropping into the lower mold portion. The rate at which the molten composition is gravitationally deposited into the lower mold portion may be controlled by adjusting the gates of the dynamic die.

If different plastic compositions are used to form the center portion, first external portion and/or second external portion of the molded panel, the different plastic compositions may be introduced sequentially or concurrently into a particular portion of the lower mold that corresponds to a particular portion of the panel. For example, a first molten plastic composition may be introduced into the center portion of the lower mold at a first station, followed by moving the trolley and lower mold to a second station where a second molten plastic composition is introduced into the first external portion of the lower mold, and then moving the trolley to a third station where a third molten plastic composition is introduced into the second external portion of the lower mold. The lower mold, so sequentially filled with first, second and third molten plastic compositions, is then moved, via the trolley, to a forth station where the upper mold portion is compressively contacted with the plastic materials within the lower mold. Alternatively, the first, second and third molten plastic compositions may be introduced substantially concurrently into the center, first external and second external portions of the lower mold, for example by moving the lower mold beneath the terminal ports of three separate extruders.

The compressive force applied to the molten plastic composition introduced into the lower mold portion is generally less than or equal to 1000 psi (70.3 Kg/cm$^2$), typically from 25 psi to 550 psi (1.8 to 38.7 Kg/cm$^2$), more typically from 50 psi to 400 psi (3.5 to 28.1 Kg/cm$^2$), and further typically from 100 psi to 300 psi (7.0 to 21.1 Kg/cm$^2$). The compressive force applied to the molten plastic material may be constant or non-constant. For example, the compressive force applied to the molten plastic material may initially be ramped up at a controlled rate to a predetermined level, followed by a hold for a given amount of time, then followed by a ramp down to ambient pressure at a controlled rate. In addition, one or more plateaus or holds may be incorporated into the ramp up and/or ramp down during compression of the molten plastic material. The molded plastic components of the load bearing assembly of the present invention may, for example, each be independently prepared in accordance with the methods and apparatuses described in U.S. Pat. Nos. 6,719,551; 6,869,558; 6,900,547; and 7,208,219.

In an embodiment of the present invention, at least one of the plastic components (e.g., the molded panel, the first support and/or the second support) of the load bearing assembly is formed from a molten composition comprising fibers (e.g., glass fibers, carbon fibers, metal fibers, polyamide fibers and/or cellulosic fibers). The molten composition is formed from plastic material and feed fibers. The molten composition may be formed by introducing the plastic material and feed fibers sequentially or concurrently into, and optionally at multiple points along the length of, an extruder. The feed fibers have a length of 1.27 cm (0.5 inches) to 10.16 cm (4 inches). The fibers are present in the molded plastic component in an amount of from 5 percent by weight to 70 percent by weight, based on the total weight of the molded plastic component. The fibers of the molded plastic component have lengths (e.g., average lengths) that are at least 60% of the lengths (e.g., average lengths) of the feed fibers. In addition, less than 20 percent of the fibers of the molded plastic component are oriented in the same direction (i.e., concurrently relative to the x, y and z directions of the molded plastic component).

The present invention also relates to a structure that includes at least one load bearing assembly of the present invention, which may optionally further include at least one exterior sheet (e.g., sheets 413 and/or 416, or sheets 191 and/or 194). Structures that may include the load bearing assembly of the present invention include, but are not limited to, walkways, docks, runways (e.g., for aircraft), floors, ground coverings (e.g., temporary ground coverings), walls, bulkheads, roofs, ceilings, shelves and combinations thereof. More broadly, further structures that may include the load bearing assembly of the present invention include, but are not limited to, dwellings, buildings, containers, sport backboards, signage and seating structures (e.g., benches, bleachers, chair/seat backs and chair/seat bottoms). Load bearing assemblies according to the present invention are particularly suited for use in structures, due, in part, to their light weight and high strength, which makes them both easy to assemble (e.g., at a point of use), and resistant to deformation when subjected to static and/or dynamic loads in the assembled structure.

Dwellings that may include the load bearing assembly of the present invention include, for example, permanent houses and temporary houses. Temporary houses may be used to house displaced and homeless people after natural disasters, such as hurricanes. Using the load bearing assemblies of the present invention (e.g., to form the roof, sidewalls and/or floors), a temporary housing unit may be assembled at a remote location and then shipped to a point of use (e.g., the disaster area), or it may be assembled at the point of use.

As used herein and the claims, the term "building(s)" is distinguished from dwelling(s), in that a building is not intended for use in providing a living space for people, while a dwelling is. Examples of buildings that may include the load bearing assembly of the present invention include, but are not limited to, warehouses, factories, kennels and storage sheds.

Containers that may include the load bearing assembly of the present invention include, for example, freight containers, such as air-freight containers and ocean-freight containers (e.g., ISO containers) and storage bins. Walls that may include the load bearing assembly of the present invention include, for example, exterior load bearing walls of dwellings and buildings, bulkheads and dividers (e.g., office dividers, cubicle walls and non-load bearing walls within dwellings and buildings). In addition, sport enclosures, such as hockey (ice, roller and deck hockey) arena walls, may include the load bearing assembly of the present invention.

Sport backboards that may include the load bearing assembly of the present invention include, but are not limited to: basketball backboards; backboards used with swimming pool games, such as water basketball; and backboards for dart boards. Examples of signage that may include the load bearing assembly include, but are not limited to: billboards; advertising displays, e.g., used in stores, such as grocery stores or book stores, or used at conventions; street signs; and highway signs. The sport backboards and signage may each optionally include first and/or second sheets (e.g., sheets 191 and/or 194), which may further optionally include indicia on an exterior surface thereof. The indicia may be provided on the exterior surfaces of the sheet(s) in accordance with those methods as discussed previously herein, such as, after formation of the panel assembly, and/or during formation thereof (e.g., by means of in-mold decoration methods).

Seating structures may include the load bearing assembly of the present invention. Examples of seating structures include, but are not limited to, benches, bleachers, seat backs and/or seat bottoms. When used as part of a seating structure, the load bearing assembly typically further includes the first and/or second exterior sheets (e.g., 191, 194, or 413, 416). In an embodiment, the load bearing assembly of the present invention may be used as part of temperature controlled seating structure (e.g., a temperature controlled bench). As discussed previously herein, when the load bearing assembly includes a substructure, the combination thereof may serve to define an intermediate space (e.g., 419 or 473) positioned between a portion of the upper surface (e.g., 407 or 467) of the substructure (e.g., 404 or 464) and either the first side of the molded panel assembly or the second side of the center portion of the molded panel (or a surface of a sheet, e.g., 416 or 191, if present). For purposes of illustration and with reference to FIG. 29, load bearing assembly 461 includes intermediate space 419 through which temperature controlled air (e.g., heated, cooled, humidified and/or de-humidified air) may be passed, as discussed previously herein. When load bearing assembly 461 is used as part of a seating structure, such as a bench, the passage of temperature controlled air through intermediate space 419 serves to render the seating structure a temperature controlled seating structure (e.g., a heated bench for use at an outdoor winter sporting event).

The present invention has been described with reference to specific details of particular embodiments thereof. It is not intended that such details be regarded as limitations upon the scope of the invention except insofar as and to the extent that they are included in the accompanying claims.

What is claimed is:
1. A load bearing assembly comprising:
   a. at least one molded panel comprising,
      i. a center portion of plastic material having a first side and a second side, said second side of said center portion comprising a plurality of plastic center reinforcing structures defining a plurality of center portion apertures;
      ii. a first external portion of plastic material having a first side having a first surface and a second side having a second surface, said second side of said first external portion comprising a plurality of plastic first reinforcing structures having sidewalls having interior surfaces and exterior surfaces, the interior surfaces of at least some of said sidewalls defining a plurality of first external portion apertures, the exterior surfaces of the sidewalls of each first reinforcing structure together with the exterior surfaces of the sidewalls of at least one neighboring first reinforcing structure defining a plurality of first external portion recesses; and
      iii. a second external portion of plastic material having a first side having a first surface and a second side having a second surface, said second side of said second external portion comprising a plurality of plastic second reinforcing structures having sidewalls having interior and exterior surfaces, the interior surfaces of at least some of said sidewalls defining a plurality of second external portion apertures, the exterior surfaces of the sidewalls of each second reinforcing structure together with the exterior surfaces of at least one neighboring second reinforcing structure defining a plurality of second external portion recesses;
      iv. wherein, said center portion residing between and being continuous with each of said first external portion and said second external portion, and said center portion, said first external portion and said second external portion together defining a continuous unitary structure,
      v. said first side of said center portion, said first side of said first external portion and said first side of said second external portion together defining a first side of said panel, said first side of said panel being a substantially even surface, and
      vi. said second side of said center portion extends beyond each of the second side of said first external portion and the second side of said second external portion, said second side of said center portion, said second side of said first external portion and said second side of said second external portion together defining a second side of said panel, said second side of said panel being an uneven surface;
   b. a first support comprising a first side having an upper surface, said first side comprising a plurality of extensions defining a plurality of apertures, at least a portion of said first side of said first support abutting said second side of said first external portion, and at least some of said extensions of said first support being fittingly received within at least some of said first external portion recesses of said first external portion and forming a first set of support interlocks, said first set of support interlocks attaching said molded panel and said first support together; and
   c. optionally a second support comprising a first side having an upper surface, said first side comprising a plurality of extensions defining a plurality of apertures, at least a portion of said first side of said second support abutting said second side of said second external portion, and at least some of said extensions of said second support being fittingly received within at least some of said second external portion recesses of said second external portion and forming a second set of support interlocks, said second set of support interlocks attaching said molded panel and said second support together.

2. The load bearing assembly of claim 1 wherein said center portion, said first external portion and said second external portion each reside substantially within a common plane.

3. The load bearing assembly of claim 1 wherein, said plurality of center apertures each extend from said first side to said second side of said center section, said first surface of said first external portion is a substantially closed surface, and said first surface of said second external portion is a substantially closed surface.

4. The load bearing assembly of claim 1 wherein said plurality of center apertures, said plurality of first external portion apertures, and said plurality of second external portion apertures each independently have shapes selected from the group consisting of circles, ovals, polygons, irregular shapes and combinations thereof.

5. The load bearing assembly of claim 1 wherein, said center portion further comprises a first exterior edge and a second exterior edge, said first external portion further comprises an internal edge which is opposed to the first exterior edge of said center portion, said first exterior edge of said center portion and said internal edge of said first external portion together defining a first elongated open channel having an elongated open end on said second side of said panel, said second external portion further comprises an internal edge which is opposed to the second exterior edge of said center portion, said second exterior edge of said center portion and said internal edge of said second external portion together defining a second elongated open channel having an elongated open end on said second side of said panel, a portion of said upper surface of said first support is free of said extensions and forms with said first elongated open channel a first enclosed panel-support channel, and a portion of said upper surface of said second support is free of said extensions and forms with said second elongated open channel a second enclosed panel-support channel.

6. The load bearing assembly of claim 5 wherein said first enclosed panel-support channel and said second enclosed panel-support channel each independently have a cross-sectional shape selected from the group consisting of circles, ovals, polygonal shapes, irregular shapes and combinations thereof.

7. The load bearing assembly of claim 5 wherein, said first exterior edge of said center portion and said internal edge of said first external portion, which together define said first elongated open channel, each independently have a surface selected from the group consisting of a substantially closed and continuous surface, a surface having a plurality of apertures and combinations thereof, and said second exterior edge of said center portion and said internal edge of said second external portion, which together define said second elongated open channel, each independently have a surface selected from the group consisting of a substantially closed and continuous surface, a surface having a plurality of apertures and combinations thereof.

8. The load bearing assembly of claim 5 further comprising an elongated support residing in at least one of said first enclosed panel-support channel and said second enclosed panel-support channel.

9. The load bearing assembly of claim 8 wherein each elongated support has a cross sectional shape selected independently from the group consisting of circles, ovals, polygonal shapes, irregular shapes and combinations thereof.

10. The load bearing assembly of claim 8 wherein said elongated support is fabricated from a material selected from the group consisting of thermoset plastic materials, thermoplastic materials, metals and combinations thereof.

11. The load bearing assembly of claim 8 further comprising at least one of, a. at least one fastener extending through said molded panel, said elongated support and into at least one of said first support and said second support, and
b. an adhesive interposed between an external surface of said elongated support and at least one of an internal surface of said first enclosed panel-support channel and an internal surface of said second enclosed panel-support channel;
c. thereby further attaching said molded panel and at least one of said first support and said second support together.

12. The load bearing assembly of claim 1 wherein at least one of, said first set of support interlocks further comprises an adhesive residing within said first external portion recesses of said first external portion of said molded panel, and said second set of support interlocks further comprises an adhesive residing within said second external portion recesses of said second external portion of said molded panel.

13. The load bearing assembly of claim 1 wherein for each molded panel, said center portion has a thickness, said first external portion has a thickness, and said second external portion has a thickness, further wherein the thickness of said center portion is twice the thickness of said first external portion, and twice the thickness of said second external portion, and the thickness of said first external portion and the thickness of said second external portion are substantially equivalent.

14. The load bearing assembly of claim 1 wherein said first support and said second support are each independently fabricated from plastic material, the plastic material of said first support, said second support, said center portion, said first external portion and said second external portion is in each case independently selected from the group consisting of thermoset plastic materials, thermoplastic materials and combinations thereof.

15. The load bearing assembly of claim 14 wherein the plastic material of at least one of said first support, said second support, said center portion, said first external portion and said second external portion is reinforced with a material selected from the group consisting of glass fibers, glass beads, carbon fibers, metal flakes, metal fibers, polyamide fibers, cellulosic fibers, nanoparticulate clays, talc and mixtures thereof.

16. The load bearing assembly of claim 1 further comprising a substructure, said substructure comprising said first support and optionally said second support.

* * * * *